US008033455B2

(12) United States Patent
Graef et al.

(10) Patent No.: US 8,033,455 B2
(45) Date of Patent: Oct. 11, 2011

(54) AUTOMATED BANKING MACHINE CURRENCY PRESENTER ARRANGEMENT

(75) Inventors: H. Thomas Graef, Bolivar, OH (US); Michael J. Harty, North Canton, OH (US); Kenneth C. Kontor, Chesterland, OH (US); Eric S. VanKeulen, North Canton, OH (US); William D. Beskitt, Canton, OH (US); Michael S. Johnson, Clinton, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 0 days.

(21) Appl. No.: 12/803,607

(22) Filed: Jun. 30, 2010

(65) Prior Publication Data

US 2010/0288831 A1 Nov. 18, 2010

Related U.S. Application Data

(60) Continuation of application No. 11/522,747, filed on Sep. 18, 2006, now Pat. No. 7,780,073, which is a continuation-in-part of application No. 10/790,633, filed on Feb. 27, 2004, now Pat. No. 7,121,461, which is a division of application No. 10/750,571, filed on Dec. 30, 2003, now Pat. No. 6,935,558, said application No. 11/522,747 is a continuation-in-part of application No. 10/797,331, filed on Mar. 9, 2004, now Pat. No. 7,249,761.

(60) Provisional application No. 60/819,697, filed on Jul. 10, 2006, provisional application No. 60/451,086, filed on Feb. 28, 2003, provisional application No. 60/437,636, filed on Dec. 31, 2002, provisional application No. 60/437,637, filed on Dec. 31, 2002, provisional application No. 60/453,609, filed on Mar. 10, 2003.

(51) Int. Cl.
*G06Q 40/00* (2006.01)

(52) U.S. Cl. ........................................................ 235/379

(58) Field of Classification Search .................. 235/379, 235/441; 902/30, 31

See application file for complete search history.

(56) References Cited

U.S. PATENT DOCUMENTS

| | | | |
|---|---|---|---|
| 3,667,825 | A | 6/1972 | Pagel |
| 4,275,667 | A | 6/1981 | Hilton |
| 4,350,332 | A | 9/1982 | Knight |
| 4,462,509 | A | 7/1984 | Adelberger |
| 4,529,119 | A | 7/1985 | Granzow et al. |
| 4,530,081 | A | 7/1985 | Sakurai et al. |
| 4,570,548 | A | 2/1986 | Martin et al. |
| 4,655,391 | A | 4/1987 | Granzow et al. |
| 4,659,008 | A | 4/1987 | Howett et al. |

(Continued)

*Primary Examiner* — Ahshik Kim

(74) *Attorney, Agent, or Firm* — Ralph E. Jocke; Daniel D. Wasil; Walker & Jocke

(57) ABSTRACT

A banking system includes an automated banking machine controlled by data bearing records. The machine compares indicia from a bearer record with computer information regarding the bearer. The machine operates to reallocate credit among various accounts responsive to computer determined correspondence among stored user identification data, read card data, and read biometric data. The machine also includes a note presenter and a currency cassette. A gate of the presenter is located at a note dispensing outlet of the machine. The gate is opened by actuating a lever linked with an arm connected to the gate. The currency cassette includes a one-piece polymer body attached to a one-piece polymer lid. A one-piece tambour door is movable along guide tracks integrally formed with body side walls.

20 Claims, 64 Drawing Sheets

U.S. PATENT DOCUMENTS 4,747,493 A * 5/1988 Nakanishi .................... 209/534
4,764,821 A 8/1988 Aoki et al.
4,787,617 A 11/1988 Ebihara
4,928,944 A 5/1990 Golicz
4,992,648 A 2/1991 Hutchison
5,006,940 A 4/1991 Hamachi et al.
5,065,955 A 11/1991 Fujii
5,071,032 A 12/1991 Thornton et al.
5,172,643 A 12/1992 Koshida et al.
5,177,730 A 1/1993 Utsugi
5,234,209 A 8/1993 Weigel et al.
5,342,165 A 8/1994 Graef et al.
5,422,773 A 6/1995 Ozaki et al.
5,497,334 A 3/1996 Russell et al.
5,541,795 A 7/1996 Hirabayashi et al.
5,695,038 A 12/1997 Keith, III et al.
5,709,381 A 1/1998 Hourtash et al.
5,719,383 A * 2/1998 Forrest .......................... 235/379
5,797,599 A 8/1998 Meyer et al.
6,160,678 A 12/2000 Meikle et al.
6,273,413 B1 8/2001 Graef
6,276,678 B1 8/2001 Nottelmann et al.
6,398,108 B1 6/2002 Swinton et al.
6,398,168 B1 6/2002 O Tae
6,494,342 B1 12/2002 Wittern, III et al.
6,845,905 B2 1/2005 Blad et al.
6,976,634 B2 12/2005 Washington et al.
7,070,111 B2 7/2006 Washington et al.
7,143,933 B2 12/2006 Uematsu et al.
7,249,761 B2 7/2007 Graef et al.
7,322,528 B2 * 1/2008 Lee et al. ...................... 235/483
7,494,049 B2 * 2/2009 Ahn et al. ..................... 235/379
2002/0060400 A1 5/2002 Kobayashi et al.
2002/0071200 A1 6/2002 Sawai
2003/0080495 A1 5/2003 Abe et al.
2004/0206811 A1 10/2004 Enright et al.
2004/0207151 A1 10/2004 Beskitt et al.
2005/0140084 A1 6/2005 Lee
2005/0258236 A1 * 11/2005 Boyes et al. .................. 235/379

* cited by examiner

AUTOMATED BANKING MACHINE CURRENCY PRESENTER ARRANGEMENT

CROSS REFERENCE TO RELATED APPLICATIONS

This application is a continuation of U.S. application Ser. No. 11/522,747 filed Sep. 18, 2006, which claims the benefit of U.S. Provisional Application 60/819,697 filed Jul. 10, 2006; and application Ser. No. 11/522,747 is a continuation-in-part of U.S. application Ser. No. 10/790,633 filed Feb. 27, 2004, now U.S. Pat. No. 7,121,461, which claims the benefit of U.S. Provisional Application 60/451,086 filed Feb. 28, 2003, and is also a divisional of U.S. application Ser. No. 10/750,571 filed Dec. 30, 2003, now U.S. Pat. No. 6,935,558, which claims the benefits of U.S. Provisional Applications 60/437,636 and 60/437,637 filed Dec. 31, 2002; and application Ser. No. 11/522,747 is a continuation-in-part of U.S. application Ser. No. 10/797,331 filed Mar. 9, 2004, now U.S. Pat. No. 7,249,761, which claims the benefit of U.S. Provisional Application 60/453,609 filed Mar. 10, 2003; and the disclosure of each aforementioned Application is herein incorporated by reference.

TECHNICAL FIELD

This invention relates to automated transaction machines.

BACKGROUND ART

Automated transaction machines include automated banking machines. A common type of automated banking machine is an automated teller machine ("ATM"). ATMs may be used to perform transactions such as dispensing cash, accepting deposits, making account balance inquiries, paying bills, and transferring funds between accounts. ATMs and other types of automated banking machines may be used to dispense media or documents such as currency, tickets, scrip, vouchers, checks, gaming materials, receipts, or other media. While many types of automated banking machines, including ATMs, are operated by consumers, other types of automated banking machines may be operated by service providers. Such automated banking machines may be used by service providers to provide cash or other types of sheets or documents when performing transactions. For purposes of this disclosure, an automated banking machine shall be construed as any machine that is capable of carrying out transactions which include transfers of value.

A popular brand of automated banking machine is manufactured by Diebold, Incorporated, the assignee of the present invention. Such automated banking machines are capable of selectively dispensing media, such as in the form of sheets, to users of the machine. A sheet dispensing mechanism used in such machines includes a picking mechanism which delivers or "picks" sheets generally one at a time from a stack of sheets stored within the machine. Media, such as a stack of sheets, can be housed in a specialized container such as a cassette or canister. Media cassettes can be designed to operate in conjunction with the particular media removal mechanism of the machine. A media cassette can be an integral part of the media dispensing system. Cassettes can be loaded or filled with media at locations away from the machine and under secure conditions. Cassettes can be transported to the automated banking machine. Cassettes present the advantage of allowing large amounts of media to be loaded into machines quickly. The interchangeability of cassettes between machines which have the same type of media removal mechanism may also be permitted. An example of a cassette adapted for use in an automated banking machine is disclosed in U.S. Pat. No. 4,113,140, the disclosure of which is incorporated herein by reference.

Picked sheets can be transported through one or more transports within the machine and eventually delivered to a user. A picking mechanism used in some Diebold automated banking machines is described in U.S. Pat. No. 5,577,720, the disclosure of which is incorporated herein by reference. The picking mechanism includes a rotating picking member that comprises a plurality of cylindrical portions disposed along a shaft. Each cylindrical portion includes a high friction segment along a portion of the circumference. These high friction segments are sized and positioned such that upon each rotation of the picking member, an end note bounding an end of the stack is exposed to the moving high friction segment. Such exposure causes the end note to be moved away from the stack in engagement with the moving cylindrical portions of the picking member.

Disposed adjacent to each of the cylindrical portions of the picking member and in the direction of rotation of the picking member relative to the stack when picking the notes, are a plurality of stripping members. A stripping member is disposed in generally abutting relation with each of the cylindrical portions of the picking member. Each stripping member is generally circular and does not rotate during rotation of the picking member in a note picking direction. The stripping member generally operates to prevent all but the end note from moving out of the stack upon rotation of the picking member. The stripping member operates to prevent generally all but the end note from being delivered from the stack because the force applied by the picking member directly on the end note exceeds the resistance force applied by the stripping member to the end note. However the resistance force of the stripping member acting on notes in the stack other than the end note, because such notes are not directly engaged with the picking member, generally prevents the other notes from moving from the stack.

Stripping members may each be supported through one-way clutch mechanisms. These one-way clutch mechanisms prevent the stripping members from turning responsive to the force applied to the stripping members as the picking member moves to pick a note. However the one-way clutch in connection with each stripping member enables each stripping member to rotate in a direction opposite to that which the stripping member is urged to move during picking. This is useful in situations where a doubles detector senses that more than one note has moved past the stripping member. In such circumstances a controller operating in the banking machine may operate to cause the picking member to rotate in an opposed direction, which is the opposite of the direction in which the picking member normally moves when picking a note. As the picking member moves in this opposed direction, the stripping member rotates so as to facilitate the movement of the multiple sheets back toward the stack. Once the multiple sheets have been moved back toward the stack and beyond the stripping member, the controller may operate to cause the picking mechanism to again try to pick a single note from the stack.

In many existing automated banking machines produced by the assignee of the present invention, notes that are picked from the dispenser are moved through a transport of the type shown in U.S. Pat. No. 5,342,165, the disclosure of which is incorporated herein by reference. Such transports include a plurality of generally parallel and transversely disposed belt flights which move the notes in engagement therewith. Disposed between each adjacent pair of belt flights is a projecting member. The projecting member generally extends to at least the level of the sheet engaging surfaces of the adjacent belt flight. As a result sheets are captured in sandwiched relation between the projecting members and the belt flight. This sandwiching of the sheets causes the sheets to move with the moving belt flights to selected locations in the machine. For example as shown in the incorporated disclosure, the sheets are moved in engagement with the belt flight into a stack. Once the stack of sheets has been accumulated, the stack is engaged with belt flights so that it can be moved to be presented to a user of the machine.

The sheet dispenser mechanisms and transports described are highly reliable and have been used extensively in automated banking machines. However, problems can sometimes be encountered in the picking and transport of sheets. In some circumstances sheets may have relatively high surface tension and an affinity for adjacent sheets. This may prevent an end note from being readily separated from a stack of sheets. Alternatively an end note may be worn or soiled in a way that reduces its frictional properties. In such cases an end note may be more resistant to the forces of the high friction segment on the picking member and will not readily separate from the stack. In alternative situations the picking mechanism may be picking a type of sheet which is plasticized or otherwise has reduced frictional properties relative to the high friction segment on the picking member. In such circumstances picking the end note from a stack may prove more difficult to accomplish reliably.

Difficulties in picking sheets may also be encountered due to wear or malfunctions. After extended use the high friction segments on a picking member can become worn. This results in the segments providing less engaging force to move an end note. Alternatively or in addition, high friction segments may become soiled with use, which may also have the effect of reducing the frictional properties of the picking member. The currency canisters which hold the stack of notes also provide a biasing force to hold the end note in abutting relation with the picking member. As a result of damage or wear, the mechanism which provides the biasing force may not provide as great a force biasing the end note to engage the picking member as may be desirable to achieve highly reliable picking of sheets.

In circumstances where the picking member has difficulty picking a note, the note fails to move in coordinated relation with the high friction segments on the cylindrical portions of the picking member. The high friction segments may rotate past the end note leaving the end note generally in the stack. When this situation occurs the machine controller generally operates so that repeated attempts are made to pick the note. If the note cannot be removed from the stack, the machine may operate in accordance with its programming to provide notes from other supplies through other picking mechanisms within the machine. Alternatively the machine may indicate a malfunction and be placed out of service. In either case the extended transaction time or complete inability to carry out a user's transaction presents a significant inconvenience to the user of the machine.

Notes with less than optimum properties may also cause problems when being transported within the machine. Notes that have become wet or soiled may adhere to the projecting members and may fail to move with the belt flights in the transport. Notes that are slippery or have unduly low friction may not produce sufficient engaging force with the moving belt flights and may not move in coordinated relation with the belt flights. Likewise unduly worn or limp notes may not achieve normal engaging force with the belt flights and may become stuck or otherwise fail to move in a transport.

These conditions also present the potential for delaying a transaction or placing a machine out of service. The problem of notes sticking in a transport may also result in the misdispensing of notes. In some circumstances notes may be crumpled or damaged due to transport problems.

Thus there exists a need for improvements to picking mechanisms and sheet transports used in automated banking machines. There further exists a need for improvements to picking mechanisms and transports used in automated banking machines that can be readily installed in existing machines to facilitate use with notes and sheet types having a wider range of properties. There further exists a need for improvements to media cassettes which can be used with picking mechanisms.

OBJECTS OF EXEMPLARY EMBODIMENTS

It is an object of an exemplary embodiment to provide an automated banking machine.

It is a further object of an exemplary embodiment to provide an automated banking machine with an improved system for picking sheets.

It is a further object of an exemplary embodiment to provide an automated banking machine with an improved system for transporting sheets.

It is a further object of an exemplary embodiment to provide an automated banking machine which provides added force when necessary for picking or transporting sheets.

It is a further object of an exemplary embodiment to provide an automated banking machine with an improved media cassette.

It is a further object of an exemplary embodiment to provide a method for picking sheets in an automated banking machine.

It is a further object of an exemplary embodiment to provide a method for transporting sheets in an automated banking machine.

It is a further object of an exemplary embodiment to provide a method for improving the operation of an automated banking machine.

It is a further object of an exemplary embodiment to provide a method for upgrading an existing machine to provide for improved picking of sheets.

It is a further object of an exemplary embodiment to provide a method for upgrading an existing automated banking machine to provide for improved transport of sheets.

It is a further object of an exemplary embodiment to provide a method of improving a media cassette for an automated banking machine.

It is a further object of an exemplary embodiment to provide a method for upgrading an existing automated banking machine to provide for improved media cassettes.

Further objects of exemplary forms of the present invention will be made apparent in the following Detailed Description of Exemplary Embodiments and the appended claims.

The foregoing objects are accomplished in an exemplary embodiment of the present invention by replacing the picking member in the prior art sheet dispenser mechanism with, or otherwise providing an alternate picking member that provides for applying additional force to move a sheet from a stack in situations where the sheet does not move with the picking member. In the exemplary embodiment the sheets which are picked through operation of the picking member are notes that are picked from a stack. The stack is bounded by an end note which engages the picking member.

The alternative picking member includes at least one movable engaging portion. The movable engaging portion is movable relative to the rotating picking member. The alternate picking member operates so that when the picking member rotates about its axis to pick a note, the engaging portion is in engagement with the end note being picked. In circumstances where the picking member rotates such that the movement of the picking member exceeds the movement of the end note, the engaging portion moves further radially outward relative to the picking member. This outward movement of the engaging portion applies increasing engaging force to the end note. This increasing engaging force results in additional force tending to move the end note relative to the stack.

The exemplary form of the alternate picking member includes a cam surface and a cam follower portion. The cam follower portion is operatively connected to the engaging portion. The action of the cam surface and cam follower portion operates to cause the engaging portion to move radially inward when necessary, before the engaging portion passes adjacent to the stripping member. This avoids the engaging portion from colliding with the stripping member and prevents damage to the dispenser mechanism as well as to notes that are moved therethrough.

The exemplary embodiment further includes a sheet transport for transporting notes or sheets that have been dispensed from the dispenser mechanism. The sheet transport includes a plurality of belts which include a plurality of generally parallel transversely spaced belt flights. Projecting member portions extend generally parallel and intermediate of the belt flights. This configuration enables sheets to move in sandwiched relation between the belt flights and the projecting member portions. To provide more reliable movement of sheets, at least one of the conventional belts is replaced with an alternate belt. While the conventional belts have a generally smooth continuous sheet engaging surface, the exemplary form of the alternate belt includes at least one and preferably a plurality of, projections that extend from the sheet engaging surface of the belt. As a result, sheets which become stuck due to adhesion to the projecting member portions will be engaged by the projections and urged to move in the transport. Similarly, sheets which do not have sufficient frictional engagement with the belt flights to be moved along the transport are engaged by the projections and urged to move therewith. This minimizes the risk that sheets will become hung up in the transport and results in higher reliability of the machine.

The exemplary form of the picking member and belt may be installed in new machines or in existing automated banking machines without further substantial modifications to the machines. This may enable enhancing machine reliability quickly and at a modest cost.

DETAILED DESCRIPTION OF EXEMPLARY EMBODIMENTS

Figure 1:
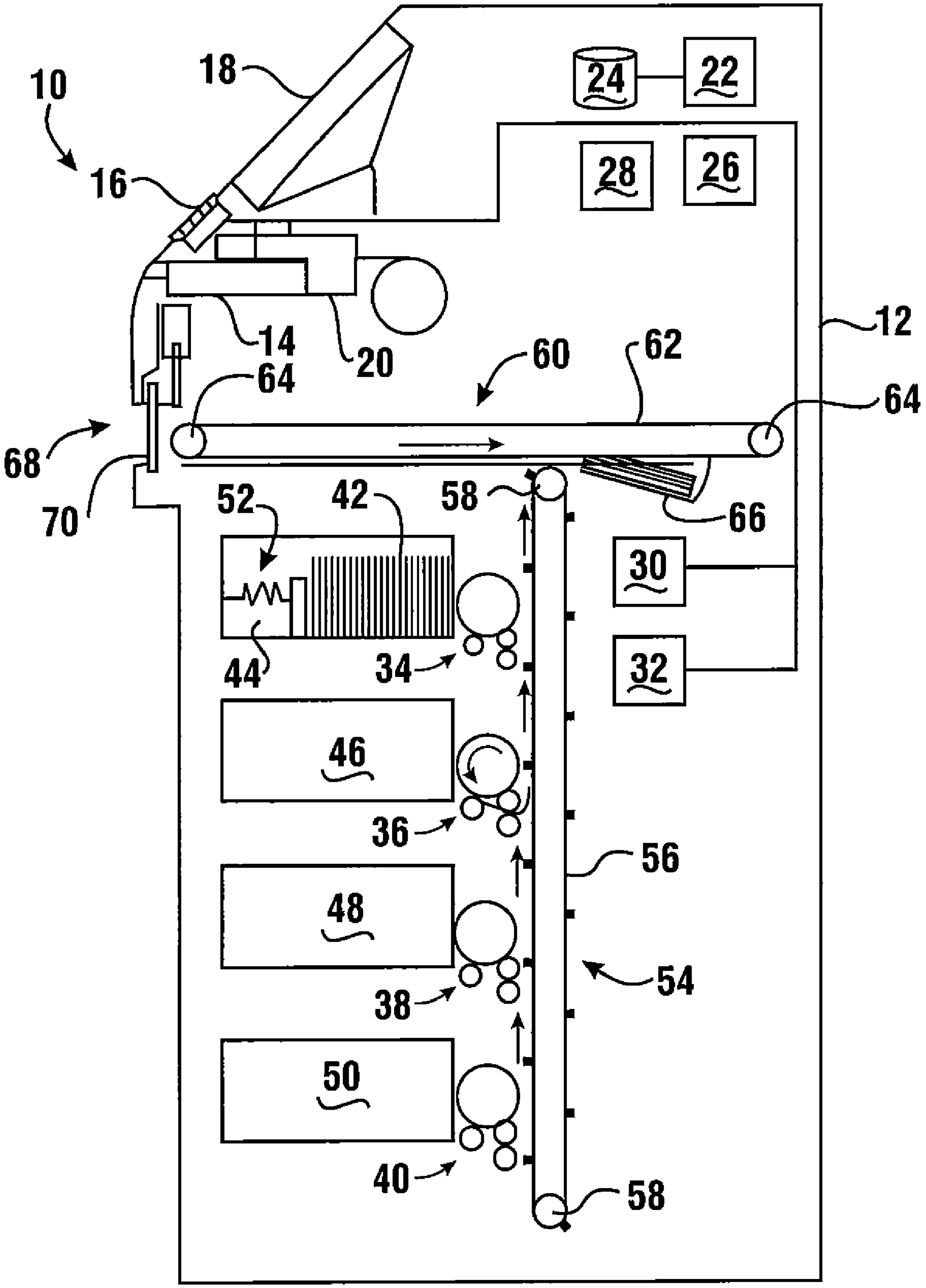
FIG. 1 is a side schematic view of an automated banking machine incorporating an exemplary embodiment of the present invention.

Referring now to the drawings and particularly FIG. 1, there is shown therein an exemplary embodiment of an automated banking machine generally indicated 10. In the exemplary embodiment machine 10 is an ATM. However it should be understood that the invention may be used in connection with other types of automated transaction machines and banking machines.

Automated banking machine 10 includes a housing 12 which houses certain components of the machine. The components of the machine include input and output devices. In this exemplary embodiment the input devices include a card reader schematically indicated 14. Card reader 14 is operative to read a customer's card which includes information about the customer thereon, such as the customer's account number. In embodiments of the invention the card reader 14 may be a card reader adapted for reading magnetic stripe cards and/or so-called "smart cards" which include a programmable memory. Another input device in the exemplary embodiment are input keys 16. Input keys 16 may in embodiments of the invention, be arranged in a keypad or keyboard. Input keys 16 may alternatively or in addition include function keys or other types of devices for receiving manual inputs. It should be understood that in various embodiments of the invention other types of input devices may be used such as biometric readers, speech or voice recognition devices, inductance type readers, IR type readers, and other devices capable of communicating with a person, article or computing device, radio frequency type readers and other types of devices which are capable of receiving information that identifies a customer and/or their account.

The exemplary embodiment of machine 10 also includes output devices providing outputs to the customer. In the exemplary embodiment machine 10 includes a display 18. Display 18 may include an LCD, CRT or other type display that is capable of providing visible indicia to a customer. In other embodiments of the invention output devices may include devices such as audio speakers, RF transmitters, IR transmitters or other types of devices that are capable of providing outputs which may be perceived by a user either directly or through use of a computing device, article or machine. It should be understood that embodiments of the invention may also include combined input and output devices such as a touch screen display which is capable of providing outputs to a user as well as receiving inputs.

The exemplary embodiment of the automated banking machine 10 also includes a receipt printer schematically indicated 20. The receipt printer is operative to print receipts for users reflecting transactions conducted at the machine. Forms of the invention may also include other types of printing mechanisms such as statement printer mechanisms, ticket printing mechanisms, check printing mechanisms, and other devices that operate to apply indicia to media in the course of performing transactions carried out with the machine.

Automated banking machine 10 further includes one or more controllers schematically indicated 22. Controller 22 includes one or more processors that are in operative connection with a memory, schematically indicated 24. The controller is operative to carry out programmed instructions to achieve operation of the machine in accomplishing transactions. As schematically indicated, the controller is in operative connection with a plurality of the transaction function devices included in the machine.

The exemplary embodiment of the invention includes at least one communications device 26. The communications device may be one or more of a plurality of types of devices that enable the machine to communicate with other systems and devices for purposes of carrying out transactions. For example, communications device 26 may include a modem for communicating messages over a data line or wireless network, with one or more other computers that operate to transfer data representative of the transfer of funds in response to transactions conducted at the machine. Alternatively the communications device 26 may include various types of network interfaces, line drivers or other devices suitable to enable communication between the machine 10 and other computers and systems.

Machine 10 also includes a plurality of sensing devices for sensing various conditions in the machine. These various sensing devices are represented schematically by component 28 for simplicity and to facilitate understanding. It should be understood that a plurality of sensing devices are provided in the machine for sensing and indicating to the controller 22 the status of devices within the machine.

Automated banking machine 10 further includes a plurality of actuators schematically indicated 30 and 32. The actuators may comprise a plurality of devices such as motors, solenoids, cylinders, rotary actuators and other types of devices that are operated responsive to the controller 22. It should be understood that numerous components within the automated banking machine are operated by actuators positioned in operative connection therewith. Actuators 30 and 32 are shown to schematically represent such actuators in the machine and to facilitate understanding.

In the exemplary automated banking machine 10 there are four sheet dispenser mechanisms 34, 36, 38 and 40. Each sheet dispensing mechanism is operative responsive to the controller 22 to pick sheets. Sheets may be selectively picked generally one at a time from a stack of sheets such as stack 42 shown adjacent to sheet dispenser mechanism 34. In the exemplary embodiment each of the stacks of sheets associated with a respective sheet dispenser mechanism is housed in a canister or cassette. A canister for use in an automated banking machine may be of the type shown in U.S. Pat. No. 4,871,085, the disclosure of which is incorporated herein by reference. A canister 44 houses sheets in connection with dispenser mechanism 34. Likewise a canister 46 houses sheets to be picked by dispenser mechanism 36. A canister 48 houses sheets dispensed by dispenser mechanism 38 and a canister 50 houses sheets that are dispensed by dispenser mechanism 40. As schematically represented in canister 44, the stack of sheets 42 is biased to engage the sheet dispenser mechanism by a biasing mechanism 52.

In the exemplary embodiment, canisters or cassettes 44, 46, 48, 50 are used to house media having predetermined value, e.g., currency, including bank notes or bills or sheets. Such bank notes may be of various currency denominations which enable dispensing money in varying amounts to customers. Alternatively, one or more of the canisters or cassettes may hold other types of media or sheets such as coupons, scrip, tickets, money orders, vouchers, checks, gaming materials, or other items of value. The controller operates the dispenser mechanism selectively in response to customer inputs and information from systems with which the machine communicates, to cause sheets to be selectively dispensed from the multi-media canisters.

Notes that are dispensed from the canisters in the exemplary embodiment are engaged with a first note transport schematically indicated 54. First note transport 54, which is later described in detail, includes a plurality of continuous belts 56. The belts extend around sets of rollers 58 which operate to drive and guide the belts. As shown schematically in FIG. 1 by the sheet dispensed from dispenser mechanism 36, sheets are enabled to engage the adjacent flights of belts 56 and move in engagement therewith upward to a second transport 60.

The second transport 60 in the exemplary embodiment is similar to that shown in U.S. Pat. No. 5,342,165 the disclosure of which is incorporated herein by reference. Transport 60 also includes a plurality of continuous belts 62 which extend about sets of rollers 64. Rollers 64 operate to drive the belt 62 such that notes passing upward in transport 54 initially engage flights of belt 62 and are collected into a stack 66. In response to operation of the controller 22 when a desired number of notes have been collected in the stack 66, the stack is moved in the manner of the incorporated disclosure and the belts 62 are driven so that the stack 66 is moved toward a user opening 68 in the housing 12 of the machine. As the notes are moved toward the opening 68, the controller operates a suitable actuating device to operate a gate 70 so as to enable the stack to pass outward through the opening. As a result the user is enabled to receive the sheets from the machine. After a user is sensed as having removed the stack from the opening, the controller may operate to close the gate 70 so as to minimize the risk of tampering with the machine.

It should be understood that the devices shown in connection with exemplary automated banking machine 10 are representative of devices that may be found in such machines. Numerous additional or alternative types of devices such as deposit accepting devices, document reading devices, currency accepting devices, ticket printing devices and additional devices may be included in automated banking machines which are used in connection with the present invention.

Figure 14:
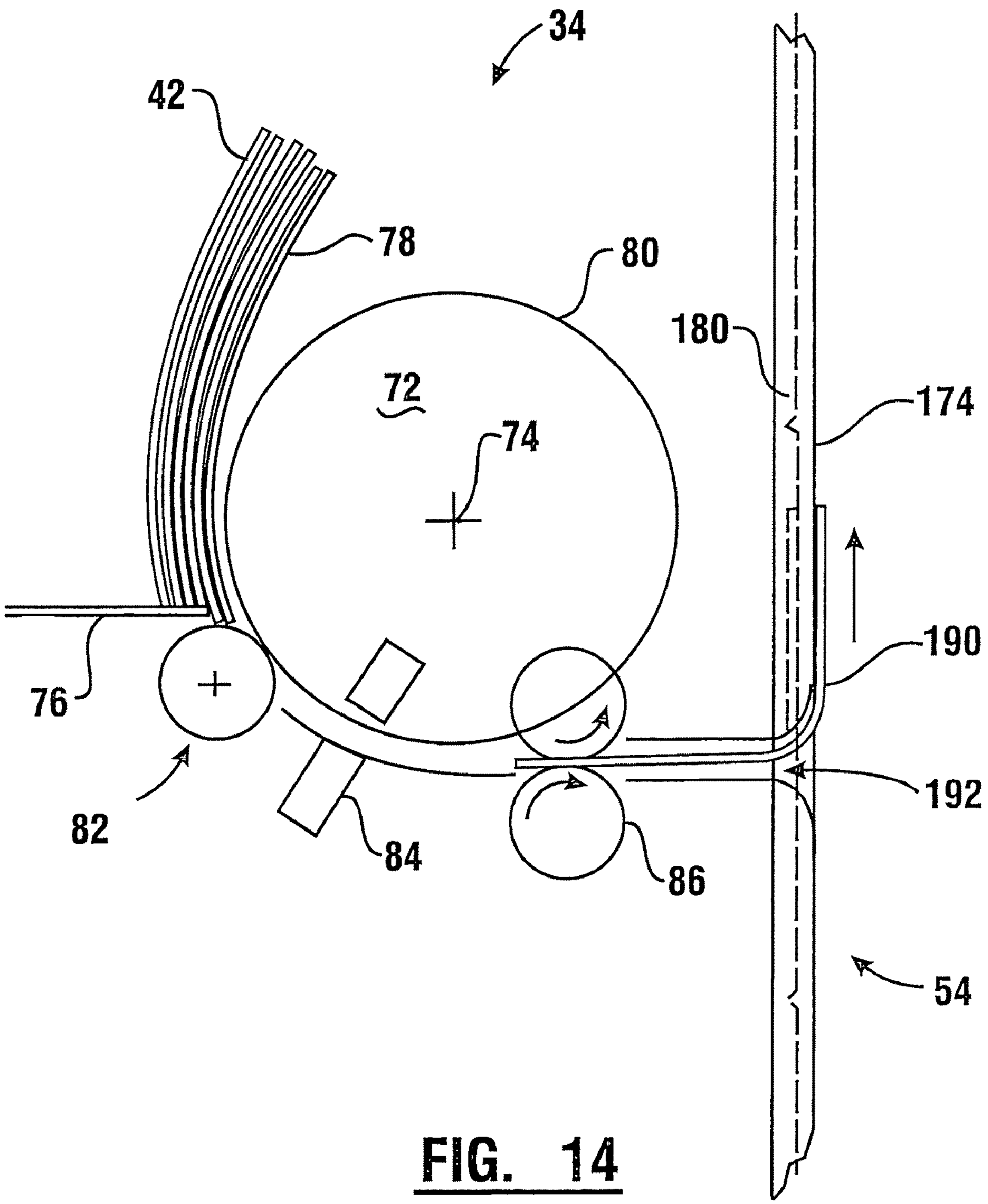
FIG. 14 is a side schematic view showing a sheet that has been dispensed by a dispenser mechanism moving to engage a sheet transport.

FIG. 14 shows the sheet dispenser mechanism 34 in greater detail. In the exemplary embodiment of the machine 10 all the dispenser mechanisms are the same, therefore only one will be described in detail. Dispenser mechanism 34 includes a picking member 72. The picking member 72 is selectively rotated responsive to the controller 22 about an axis 74. Bank notes or other sheets in the stack 42 are supported by a supporting surface 76 which terminates in the area adjacent to the picking member. An end note 78 bounds the stack adjacent to the picking member 72. During each rotation of the picking member the then current end note bounding the stack is moved and delivered from the stack and passed to the transport 54.

The picking member 72 has an outer bounding surface 80. The outer bounding surface 80 is in generally abutting relation with stripping members 82. As previously discussed the stripping members 82 in the exemplary embodiment do not rotate in a clockwise direction as shown in FIG. 14. In the exemplary embodiment, the stripping members 82 will however rotate in a counterclockwise direction due to action of associated one-way clutches as later described.

Positioned downstream of the stripping members 82 is a doubles detector 84. Doubles detector 84 may be a mechanical sensor, radiation sensor, sonic sensor or other type sensor that is suitable for determining if single or multiple notes have moved past the stripping member toward the transport. Downstream of the doubles detector are a pair of carry away rolls 86. The carry away rolls are operative to engage sheets that have moved sufficiently away from the stack so as to engage the rolls. The rolls, which are operated by a drive in response to the controller 22, operate to engage sheets and move them into the transport. It should be understood that this configuration of the dispenser mechanism is exemplary and in other embodiments different configurations may be used.

As discussed in the incorporated disclosure of U.S. Pat. No. 5,577,720, the normal operation of the dispenser mechanism involves the picking member rotating responsive to the controller 22 during picking operations. When it is desired to pick the end note 78 the picking member 72 rotates in a counterclockwise direction as shown in FIG. 14 about the axis 74. This is done through operation of a drive or other similar device. Rotation of the picking member urges the end note 78 to move from the stack. The stripping members 82 resist the movement of the end note because the stripping members do not move in a clockwise direction as shown in FIG. 14. Because of the surface area of the picking member 72 engaging the end note and the frictional properties of the outer bounding surface 80, the force urging the end note 78 to move from the stack generally overcomes the resistance force of the stripping members. This is because the stripping members have a smaller surface area and/or a different frictional coefficient resulting in less resistance force than the moving force of the picking member. The stripping members however provide sufficient resistance to resist generally all but the end note 78 from moving from the stack. This is because the notes in the stack other than the end note, are not directly engaged with the picking member and do not experience the same degree of force urging them to move from the stack.

As the end note 78 is moved from the stack the thickness thereof may be sensed by the doubles detector 84. The doubles detector 84 is operatively connected to the controller and at least one signal from the doubles detector provides an indication as to whether a single or a multiple note has been pulled from the stack. In circumstances where multiple notes are sensed, the controller may cause the picking member to operate to stop rotating in the counterclockwise direction as shown in FIG. 14, and instead to rotate in a clockwise direction. When the picking member 72 rotates in a clockwise direction to pull sheets back into the stack 42, the stripping members 82 are enabled to cooperatively rotate in a counterclockwise direction as shown in FIG. 14. This is due to the one-way clutch associated with each of the stripping members. As a result the sheets are returned to the stack. Thereafter the controller 22 may again operate so as to rotate picking member 72 in a counterclockwise direction and an attempt is again made to pick a single end note from the stack.

In circumstances where the doubles detector 84 senses only a single note passing from the stack, the controller operates a drive or other suitable moving mechanism to cause the carry away rolls 86 to engage and move the sheet to the transport 54. It should be understood that the steps described as being taken responsive to operation of the controller are exemplary. In some embodiments of the invention the controller may cause the machine to operate to direct double notes to a divert bin or other storage area rather than attempting to repeatedly pick a single note.

Figure 2:
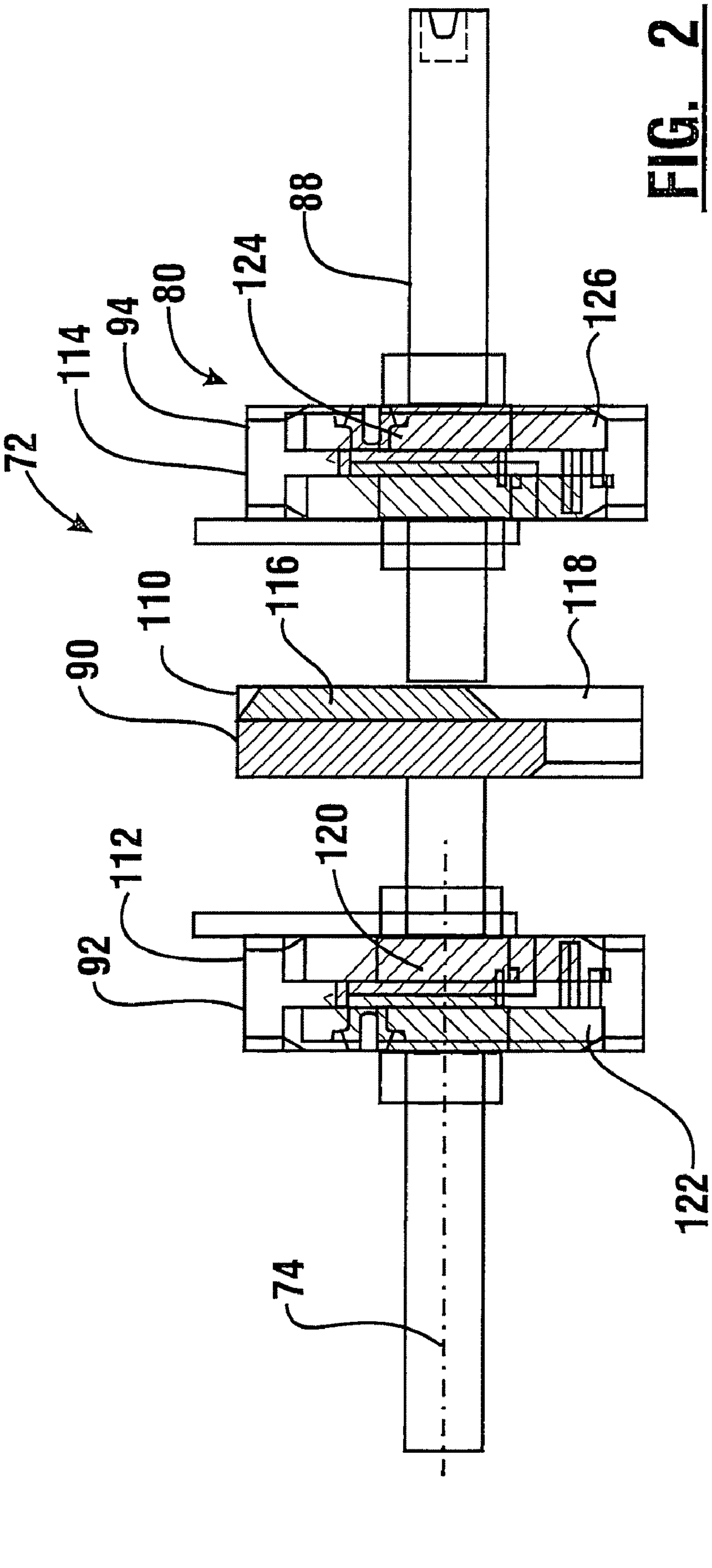
FIG. 2 is a side view of a picking member used in an exemplary embodiment of the present invention.
Figure 3:
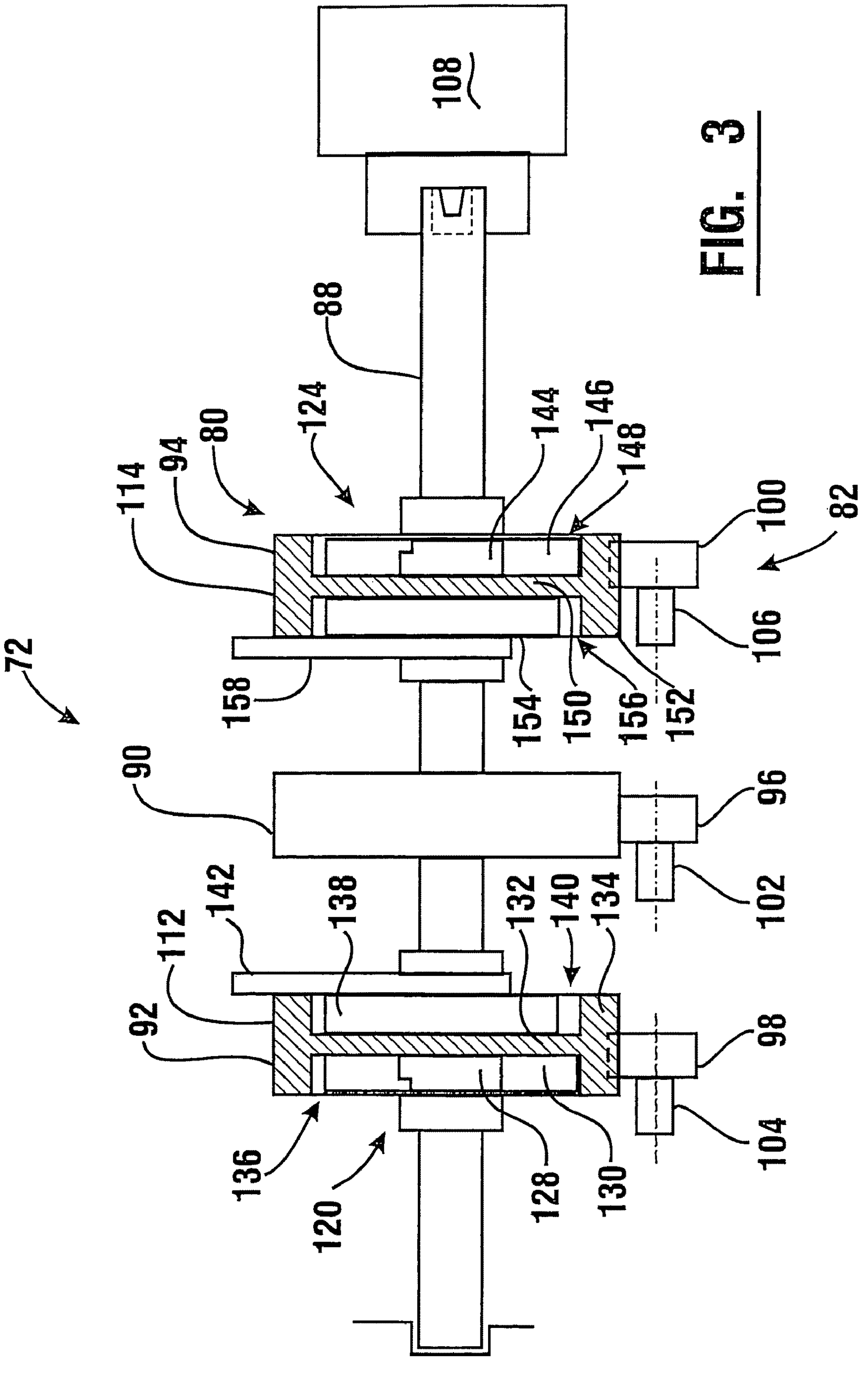
FIG. 3 is a cross sectional view of the picking member shown in FIG. 2 in operative connection with a drive in the machine.

The picking member of the exemplary embodiment of the present invention is shown in greater detail in FIGS. 2 and 3. The picking member 72 includes a central shaft 88. Three separated cylindrical portions are supported on the shaft. These cylindrical portions include a central portion 90. Disposed on a first axial side of cylindrical portion 90 is a first outboard portion 92. Disposed in an opposed axial direction from central cylindrical portion is a second outboard portion 94.

As shown in FIG. 3 each cylindrical portion 90, 92 and 94 has an associated one of the stripping members 82 in abutting relation therewith, indicated 96, 98 and 100 respectively. Each of the stripping members has an associated one-way clutch 102, 104 and 106 operatively connected therewith. Each of the one-way clutches as previously discussed, enables only one-way rotation of the stripping member. The stripping member is enabled to rotate only when sheets are being pulled back into the stack. However when sheets are being picked the stripping members remain generally stationary.

As shown schematically in FIG. 3, shaft 88 is operatively connected with a drive 108 which selectively rotates the shaft responsive to signals from the controller. As also shown in FIG. 3, in the exemplary embodiment stripping member 96 which is in abutting relation with the central portion 90 is somewhat angularly disposed from stripping members 98 and 100 which are in abutting relation with the outboard portions 92 and 94 respectively. In the exemplary embodiment, stripping member 96 is disposed somewhat angularly forward of the other stripping members such that notes tend to engage the central stripping member during picking prior to engaging stripping members 98 and 100. Of course in other embodiments of the invention other approaches, configurations and types of stripping members and picking members may be used.

As shown in FIG. 2 the outer bounding surface 80 of the picking member includes an outer surface 110 of cylindrical portion 90, as well as outer surface 112 of cylindrical portion 92 and outer surface 114 of cylindrical portion 94. Outer surface 110 includes thereon a ribbed relatively high friction portion 116. The balance of the outer surface 110 has a relatively lower friction portion 118. High friction portion 116 applies an engaging force to the end note bounding the stack which is generally sufficient to engage and move the end note from the stack. The low friction portion 118 is generally enabled to move relative to the end note without causing the note to be moved from the stack. In the exemplary embodiment this construction facilitates reliably picking a single note each time the picking member is rotated one turn. This construction further provides spacing between notes sequentially picked from the stack. Such spacing facilitates identifying and handling of notes.

Outer surface 112 of cylindrical portion 92 likewise includes a ribbed, relatively high friction portion 120 on the outer surface thereof. Outer surface 112 also includes a relatively lower friction portion 122 which surrounds the high friction portion. The angular position of high friction portion 120 generally corresponds to high friction portion 116 on the central portion 90. As is the case with the other relatively high and low friction portions, high friction portion 120 applies force to the end note generally sufficient to engage and move it from the stack, while the relatively lower friction portion is enabled to move in engagement with the end note without causing it to be disposed from the stack. Similarly as shown in FIG. 2 cylindrical portion 94 also includes a generally high friction portion 124 and a generally lower friction portion 126. The high and low friction portions on the cylindrical portion 94 angularly correspond to the high and low friction portions on the other cylindrical portions of the picking member.

As most clearly shown in the partial cross sectional view in FIG. 3, within the high friction portion 120 of cylindrical portion 92, is an arcuate segment 128. Arcuate segment 128 occupies a portion of the axial width of the cylindrical portion toward the outboard side of the picking member. The arcuate segment 128 is supported on a movable member 130. Movable member 130 as later discussed in detail, is movable relative to the cylindrical portion and the picking member in a manner which enables arcuate segment 128 to move radially outward relative to the bounding surface bounding the picking member. In the exemplary embodiment the cylindrical portion 92 is generally I-shaped in transverse cross section and includes a central web portion 132. The web portion 132 terminates in cross section in a flange portion 134 which supports the outer surface 112 thereon. The movable member 130 is movable in a recess 136 on a first longitudinal side of the web member 132.

A cam 138 is positioned in a recess 140 which extends on opposed longitudinal side from recess 136. Cam 138 is in supporting connection with the shaft 88. Cam 138 is also in supporting connection with a support member portion 142. The support member portion 142 operates to hold the cam 138 stationary as the shaft 88 and cylindrical portion 92 rotates.

Cylindrical portion 94 includes structures which are generally a mirror image of those associated with cylindrical portion 92. The high friction portion of outer surface 114 includes an arcuate segment 144 which is supported on a movable member 146. The movable member 146 is positioned in a recess 148 which is bounded by a web portion 150 and a flange portion 152 of cylindrical portion 94.

A cam 154 is positioned in a recess 156 on an opposed longitudinal side from recess 148. Cam 154 is in supporting connection with the shaft 88 and is held stationary relative to the shaft by a support member portion 158.

Figure 4:
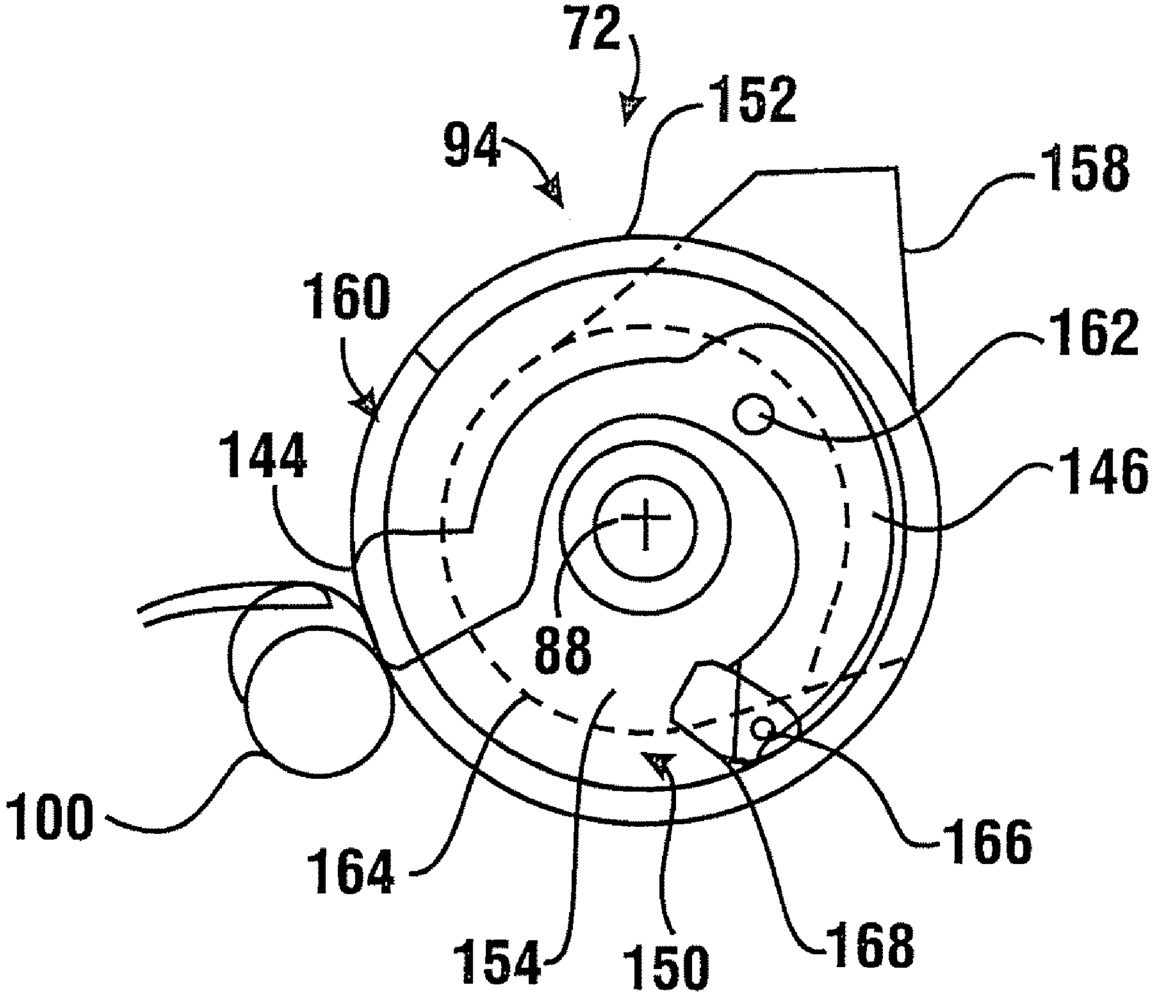
FIG. 4 is a side view of the picking member shown in FIG. 3.

As the operation of the cylindrical portions 92 and 94 of the picking member are similar, an explanation of the operation of the picking member will be described with reference to cylindrical portion 94. As best seen in FIG. 4, the segment 144 extends through an opening 160 in the flange portion 152 of cylindrical portion 94. The exemplary movable member 146 is generally horseshoe shaped and is supported on the picking member through a pivot connection 162. The pivot connection supports the movable member 146 through the web portion 150.

The cam 154 is bounded by a cam surface 164. A cam follower portion 166 is supported on the movable member 146 at an end opposed of the arcuate segment 144. The cam follower portion extends through an opening 168 in the web portion 150. This enables the cam follower portion 166 to engage the cam surface 164 of the cam 154. As can be appreciated, this arrangement enables the position of the arcuate segment 144 to be controlled as the picking member rotates due to the engagement of the cam follower 166 with the cam surface 164.

Figure 5:
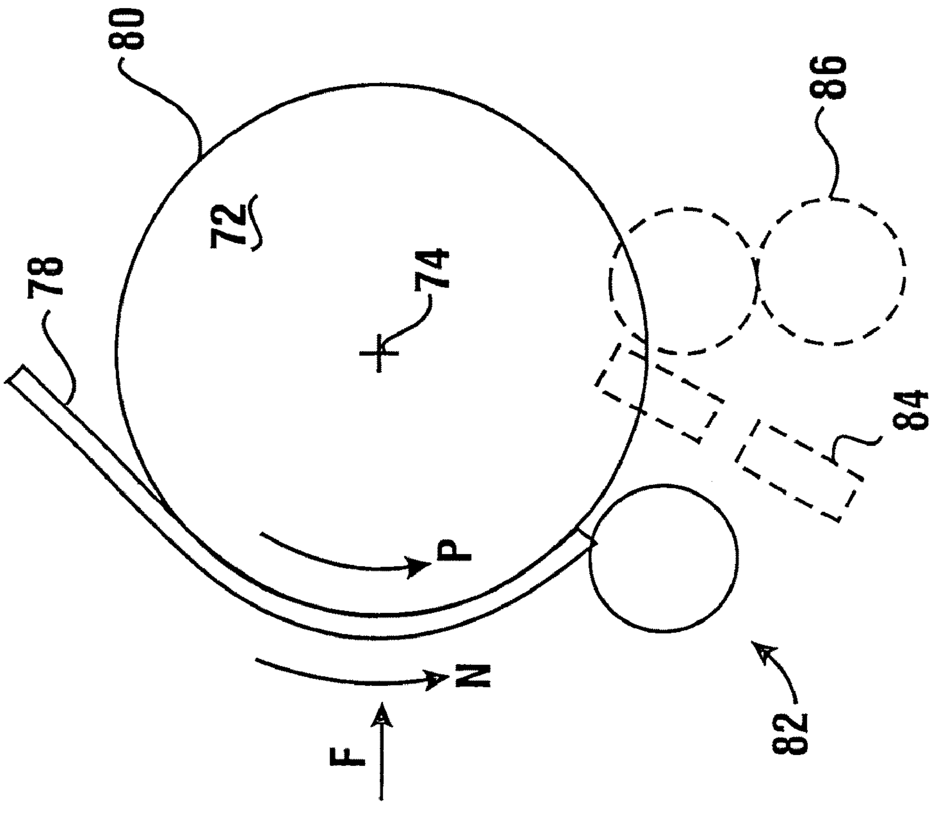
FIG. 5 is a side schematic view of the picking member operating to move an end note from the stack in circumstances where the end note moves in coordinated relation with the picking member.

The overall operation of the exemplary picking member 72 is explained with reference to FIGS. 5 and 6. As indicated in FIG. 5, during normal operation of the picking member the high friction portions on the picking members engage an end note 78 bounding the stack. The high friction portions move the note generally engaged and at the same speed as the picking member, past the stripping member 82 so that the end note is moved from the stack. During this normal operation the note moves in synchronized relation with the movement of the outer bounding surface 80 of the picking member 72. As a result during normal operation the velocity of the end note indicated by arrow N corresponds generally to the velocity of the outer surface 80 of the picking member represented by arrow P. Arrow F corresponds to the direction of the force applied to the stack which holds the end note 78 in engaged relation with the picking member 72.

Figure 6:
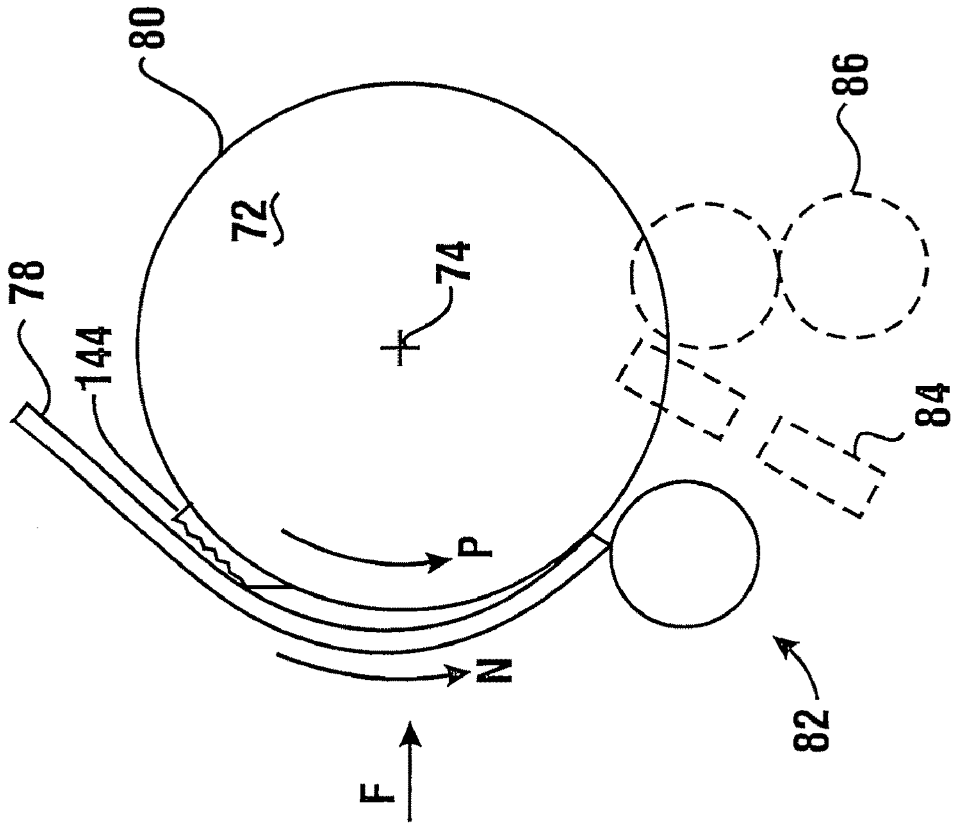
FIG. 6 is a view similar to FIG. 5 but showing the movement of the engaging portion of the picking member radially outward responsive to the picking member moving in a picking direction without corresponding movement of the end note.

FIG. 6 represents the operation of the picking member 72 of the exemplary embodiment when an end note 78 fails to move in coordinated relation with the picking member. In such circumstances the velocity and displacement of the picking member is greater than the corresponding velocity and movement of the end note 78. The high friction arcuate segments 128, 144 which serve as engaging portions, because they are enabled to move relative to the picking member 72, tend to maintain engaged relation with the end note. This is represented by the arcuate segment 144 in FIG. 6. Because the engaging portion of the arcuate segment 144 remains engaged with the end note and is movable relative to the picking member, when the angular movement of the picking member exceeds the movement of the engaging portion of segment 144, the segment 144 moves radially outward relative to outer bounding surface 80. The movement of the engaging portion further radially outward relative to the axis of rotation 74 increases the engaging force on the end note urging it to move from the stack. As can be appreciated from the later detailed description of the movable member, the engaging portions tend to move further radially outward providing increasing engaging force, with an increase in difference between the movement of the picking member and the engaging portion. This increasing force on the end note tends to cause the end note to begin moving past the stripping members 82 so that the note can be picked. As the end note begins to move in coordinated relation with the picking member, the engaging portions may begin to move radially inward. In the exemplary embodiment the action of the cam follower portion and the cam surface operate to assure that the engaging portions are moved radially inward to the level of the outer bounding surface 80 by the time the engaging portions rotate to a position adjacent to the stripping members 82. This assures that the engaging portions and the notes are not damaged.

Figure 7:
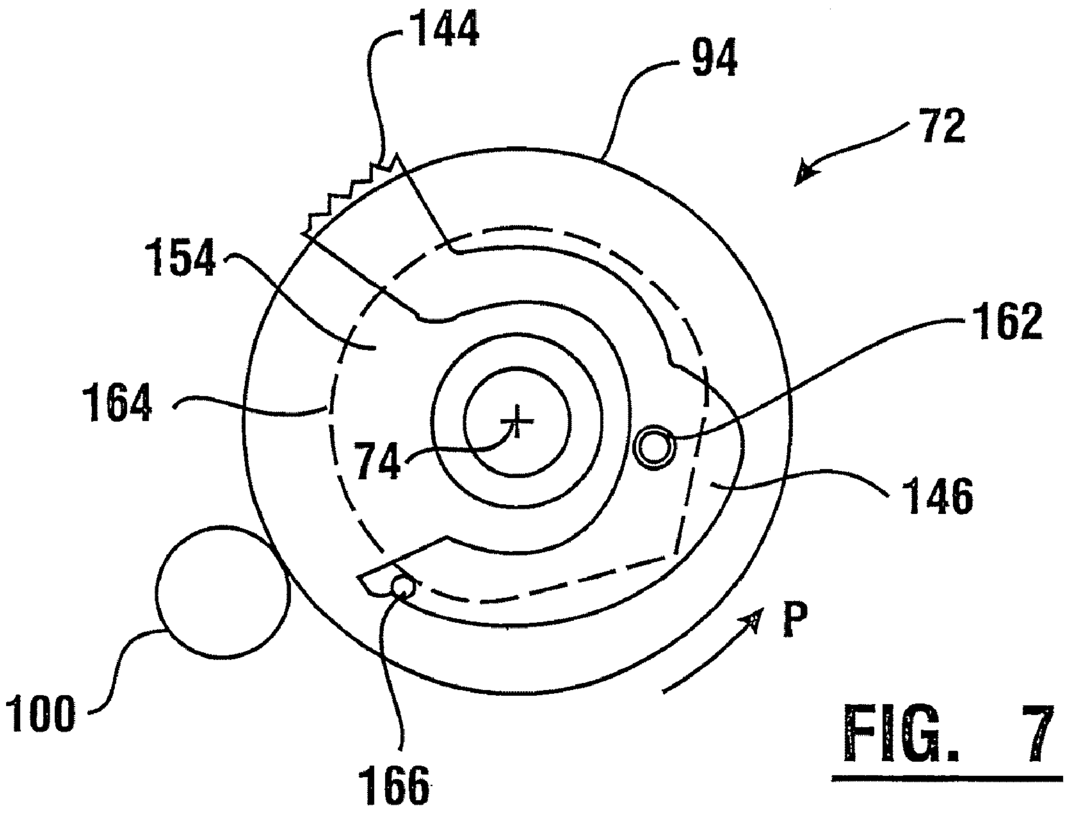
FIGS. 7-10 are side schematic views showing a sequence of positions of the engaging portion of the picking member and the operation of the cam surface to retract the engaging member as the picking member rotates.

FIGS. 7-10 show the exemplary operation of the picking member 72 with regard to cylindrical portion 94 of the picking member. It should be understood that cylindrical portion 92 is a mirror image thereof and works in a similar manner during picking. As represented in FIG. 7, the picking member 72 rotates in the direction of arrow P. Assuming that an end note engaged with the engaging portion which is included on segment 144 is not moving in synchronization with the picking member, the segment 144 rotates in a first direction about pivot connection 162. This results because the segment 144 is engaged with the note and the angular movement thereof does not correspond to the angular movement of the picking member 72 about the axis 74. Segment 144 moves radially outward relative to axis 74. The radially outward movement of segment 144 is limited by the engagement of the cam follower portion 166 with the cam portion 164 of cam 154.

As can be appreciated, the outward movement of the engaging portion on segment 144 applies increasing engaging force on the end note responsive to the end note not moving with the picking member. In addition the engaging portion of segment 144 operates to move further radially outward with an increasing difference between the movement of the picking member and the movement of the note. This outward movement may continue until the segment 144 reaches the full extent of its travel as limited by the cam surface.

Figure 8:
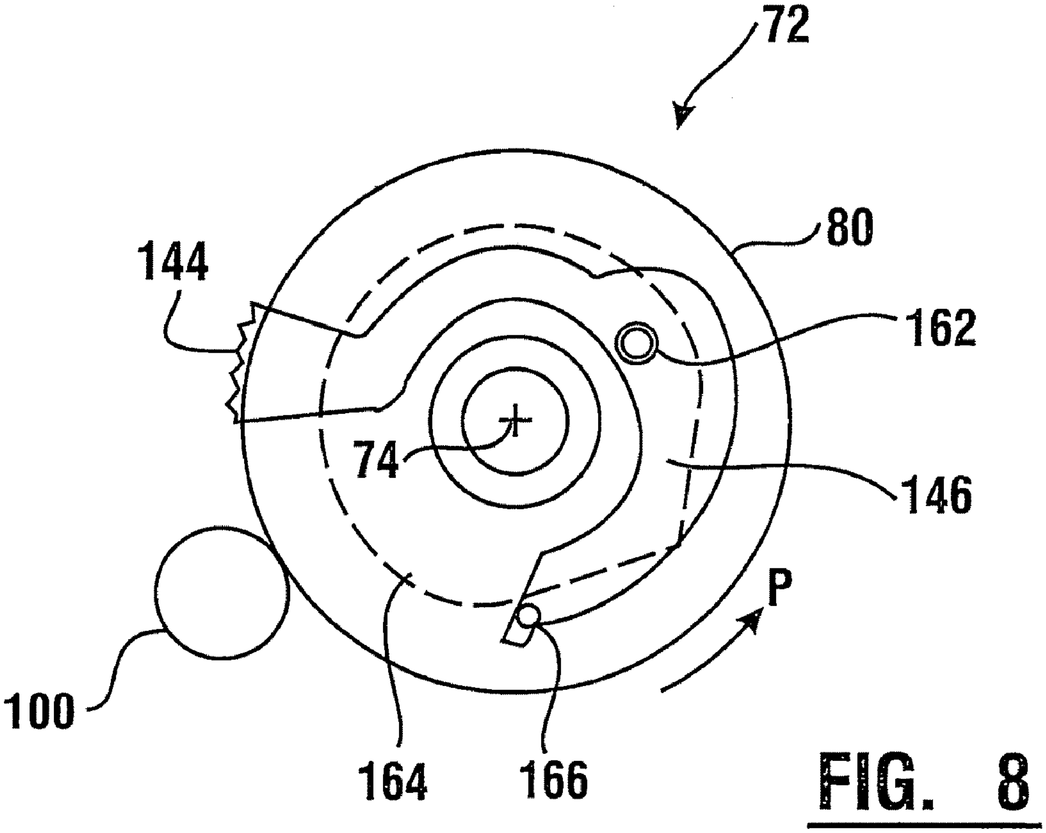

As shown in FIG. 8, if the end note has not initially moved in coordinated relation with the picking member, the engaging portion of the arcuate segment 144 will generally remain extended radially outward relative to the outer bounding surface of the picking member as the picking member further rotates. This provides additional force tending to assure that the note is moved from the stack. It should be appreciated that once the note begins moving, if note movement begins to exceed that of the picking member, the engaging portion of the arcuate segment 144 will begin to retract radially inward toward the outer bounding surface 80. Generally however once the engaging portion has extended radially outward, it will remain outwardly extended to the extent permitted by the engagement of the cam follower portion 166 with the cam surface 164.

Figure 9:
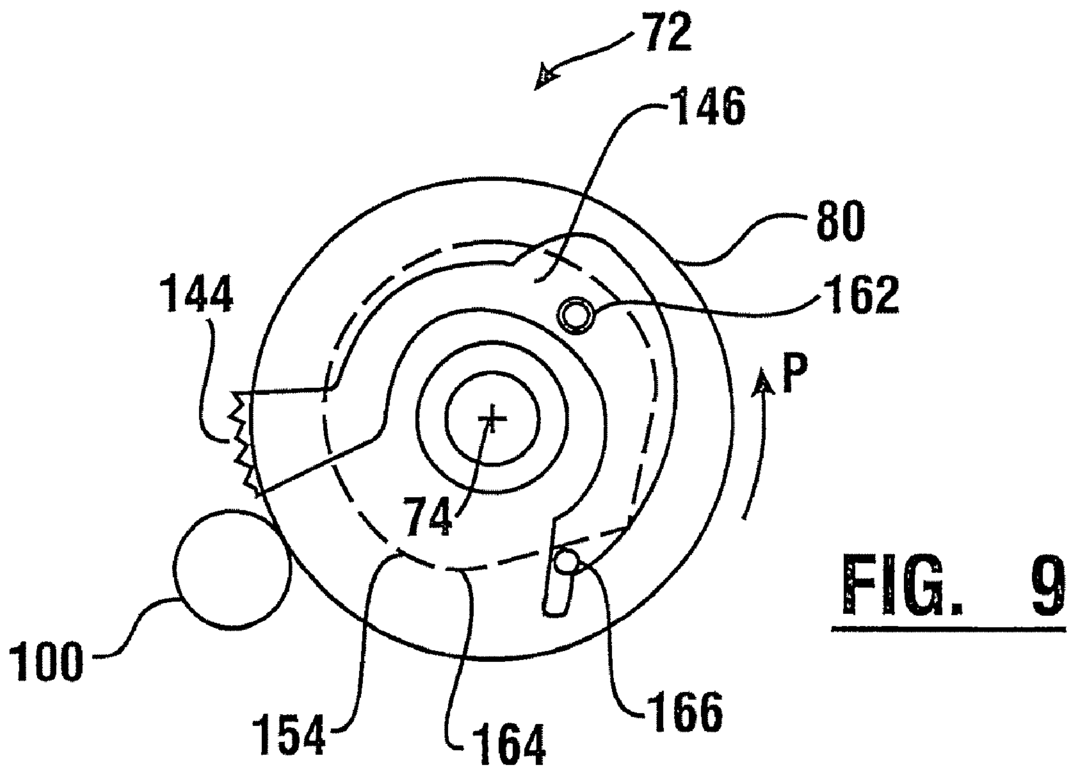

As shown in FIG. 9, as the picking member 72 rotates further toward the position where the engaging portion of the arcuate segment 144 approaches the stripping members, the profile of the cam surface 164 causes the cam follower portion 166 to cause the movable member 146 to rotate relative to the pivot connection 162. As shown in FIG. 9 the cam surface tends to rotate the movable member 146 in a generally opposed rotational direction about pivot connection 162, a direction in which the movable member rotates to extend the arcuate segment. As a result, as the picking member rotates so that the arcuate segment approaches the stripping member, the arcuate segment tends to move radially inward toward the outer bounding surface 80.

Figure 10:
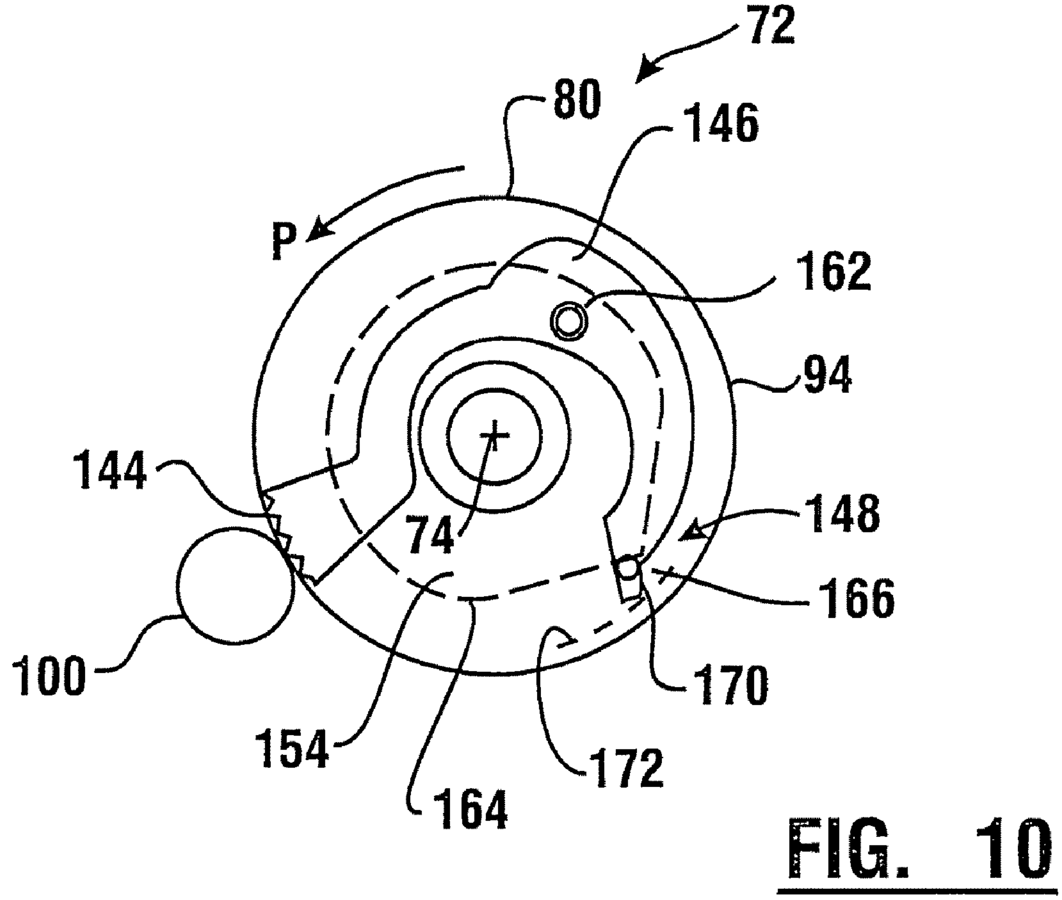

As shown in FIG. 10 once the picking member 72 has rotated to the point where the engaging portion of segment 144 is in abutting relation with the stripping member, the operation of the cam surface 164 and the cam follower portion 166 has caused the engaging portion to be retracted through movement of the movable member 146. The outer surface of segment 144 at this point is moved to generally conform with the outer bounding surface 80 of the picking member. In addition as the engaging portion on the segment 144 retracts radially inward, the engaging portion applies a decreasing engaging force to the end note as the end note is moved between the picking member and the stripping member. This decreasing force not only avoids collisions between the engaging portion and the stripping members, but it also prevents possible damage to the mechanism as well as to the notes being picked.

As shown in FIG. 10 the exemplary embodiment includes a stop portion 170 on the movable member 146. The stop portion 170 engages a surface 172 bounding recess 148. The stop portion prevents the engaging portion on the segment 144 from being moved radially inward substantially beyond the outer bounding surface 80 of the picking member.

As can be appreciated this exemplary embodiment of the picking member provides increasing engaging force on the end note responsive to the end note not moving with the picking member. As a result additional picking force is applied in only those circumstances where it is required to move the end note from the stack. In circumstances where notes are soiled, have high surface tension or are of slippery consistency, additional moving force is usually automatically applied. Further the exemplary form of the picking member also enables compensating for wear or reduced friction with soiling that may result from extended use of a picking member. In this way the exemplary form of the picking member is able to compensate for those conditions which might otherwise result in a decrease in note picking reliability.

It should further be understood that while in the exemplary form of the picking member the engaging portion is moved radially outward and applies additional picking force based on the relative movement between the end note and the picking member, in other embodiments other approaches may be used. Such approaches may include for example, other devices and systems for determining a difference in relative movement between the notes being picked and the picking member, and moving in engaging portion to apply additional engaging force in response thereto. Although the exemplary embodiment uses a mechanical type system to accomplish this, electronic and electromechanical systems may be used in other embodiments.

A further useful aspect of the exemplary form of the picking member and its operation in connection with dispensing mechanisms, is that it may be readily retrofit to an existing automated banking machine. The exemplary embodiment enables a service technician to access an interior area of an ATM such as by unlocking a door to a secure chest portion. Once access is gained to the note handling mechanism, the technician may remove an existing picking member which does not include the features of the radially movable engaging portions, and to install a picking member 72 in place thereof. In the exemplary embodiment the support member portions 142 and 158 are configured to engage existing surfaces within the housing of the ATM so as to hold the cams stationary as the picking member rotates. Once installed in the ATM, the door to the secure chest portion is closed and locked.

Picking member 72 is constructed to have the same general profile as picking members that do not incorporate the exemplary embodiment. Thus, installation of the exemplary picking member is readily made to improve the operation of the machine. It should further be understood that the programming of the controller 22 also often need not be changed to accommodate the installation of the picking member 72. Except as described herein, the operation of the picking member 72 is similar to that of a picking member which may be replaced in terms of moving and retracting notes.

Figure 12:
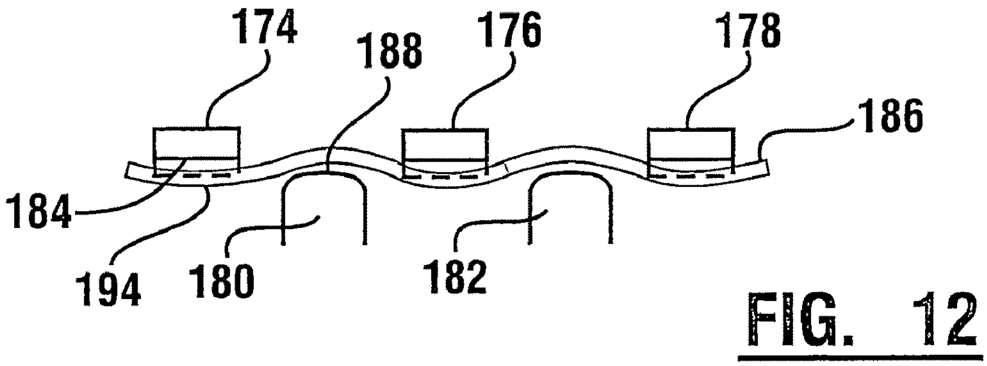
FIG. 12 is a side cross sectional view of the sheet transport showing a sheet in engagement with a plurality of belt flights and projecting member portions.

In the exemplary embodiment of the invention a note transport such as note transport 54, includes features to reduce the risk that notes may become stuck or jammed in the transport. As previously discussed in connection with FIG. 1, note transport 54 includes a plurality of continuous belts 56 which extend about sets of rollers 58. It should be understood that the transport 54 may include belts that extend the entire length of the transport or may have several belts which span sections of the transport. In an exemplary embodiment the continuous belts are arranged so that the transport includes a plurality of generally parallel belt flights. These belt flights are represented in FIG. 12 by belt flights 174, 176 and 178. Each of the belt flights extend along a longitudinal direction of the transport, in which longitudinal direction sheets are moved. The belt flights are moved through operation of a drive or similar moving mechanism which is controlled responsive to operation of the controller 22 and which drives the rollers upon which the belts are supported.

As shown in FIG. 12, disposed transversely intermediate of each adjacent pair of belt flights, are projecting member portions 180, 182. As can be readily seen from FIG. 12, each of the belt flights has a first sheet engaging surface represented by surface 184 of belt flight 174, which faces in a first facing direction toward a sheet 186 which extends in the transport. The projecting member portions each include a second sheet engaging surface represented by surface 188 of projecting member portion 180. The second sheet engaging surface 188 faces in a second facing direction which is generally opposed of the first facing direction. As will be appreciated the first and second facing directions in which the sheet engaging surfaces of the belt flights and the projecting member portions extend respectively, are both generally normal of the longitudinal direction in which the sheets move.

Figure 13:
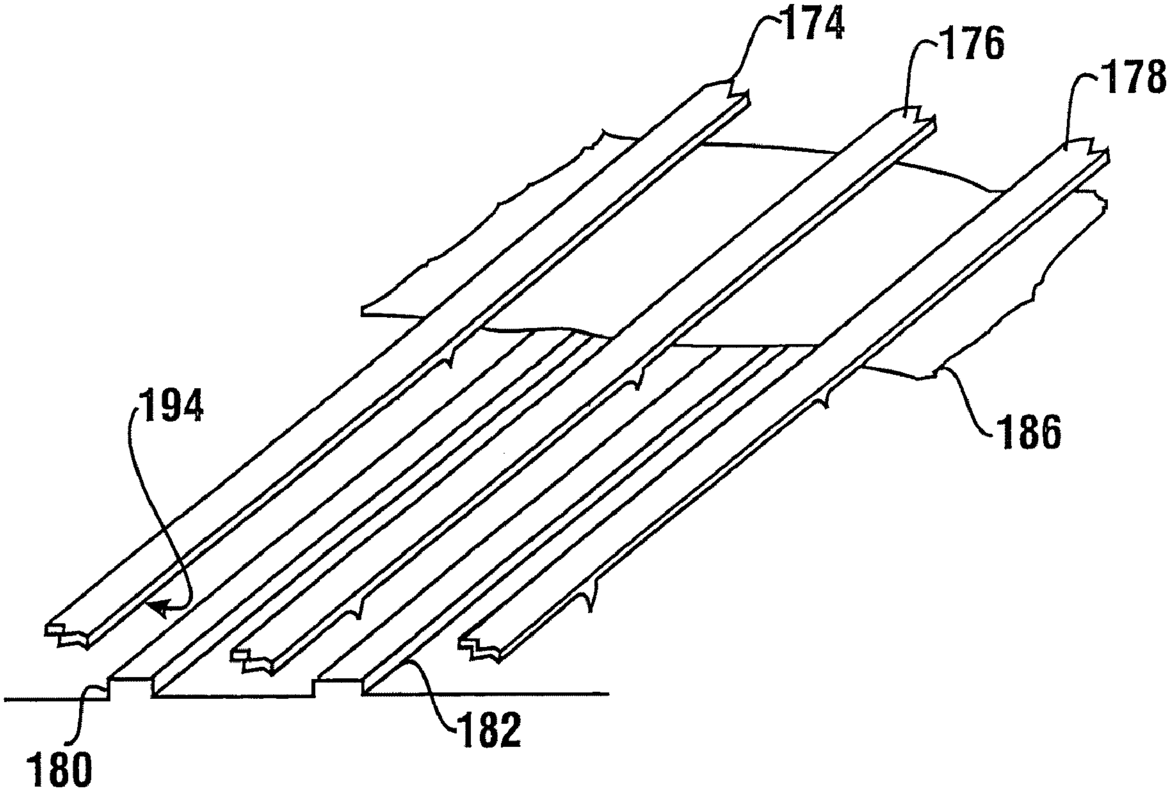
FIG. 13 is an isometric view of a sheet transport including belt flights of the type shown in FIG. 11 operating to move a sheet through the transport.

As can be appreciated from FIGS. 12 and 13, the configuration of the first belt flights and the sheet engaging member portion is such that a sheet that is moved into intermediate relation between the first sheet engaging surface of the belt flights and the second sheet engaging surfaces of the projection member portions, is deformed in a wavelike configuration so that the sheet is engaged with the belt flights. As a result when the belt flights move, the sheet 186 moves in engagement therewith.

As can be appreciated from FIG. 14, the sheet transport 54 is enabled to accept sheets such as a sheet 190 through openings such as opening 192. As can be appreciated, from FIG. 14, a sheet passing through the opening in the projecting member portions moves in engagement with the first belt flights to become trapped in sandwiched relation between the belt flights and the projecting member portions. The sheet once trapped in this manner is caused to be moved along with the belt flights to a desired location within the machine responsive to signals from the controller.

As mentioned previously, occasionally sheets such as bank notes become stuck in transports of this type. This may result due to various conditions which prevent the notes from moving in coordinated relation with the belt flights. In the exemplary embodiment of the present invention, conventional type belts which have in the past been used in transports of this type are replaced with alternative belts which reduce the risk that sheets will become stuck. Specifically while prior belts have a generally smooth continuous sheet engaging surface, the alternative belts used in the exemplary embodiment include at least one longitudinally spaced projection which extends in the first facing direction from the sheet engaging surface of the belt. In a more preferred exemplary embodiment such longitudinally spaced projections extend at spaced intervals on the first sheet engaging surface of the belt. The presence of such longitudinally spaced extending projections engage sheets that might otherwise not move in the transport and move them to the desired location.

Figure 11:
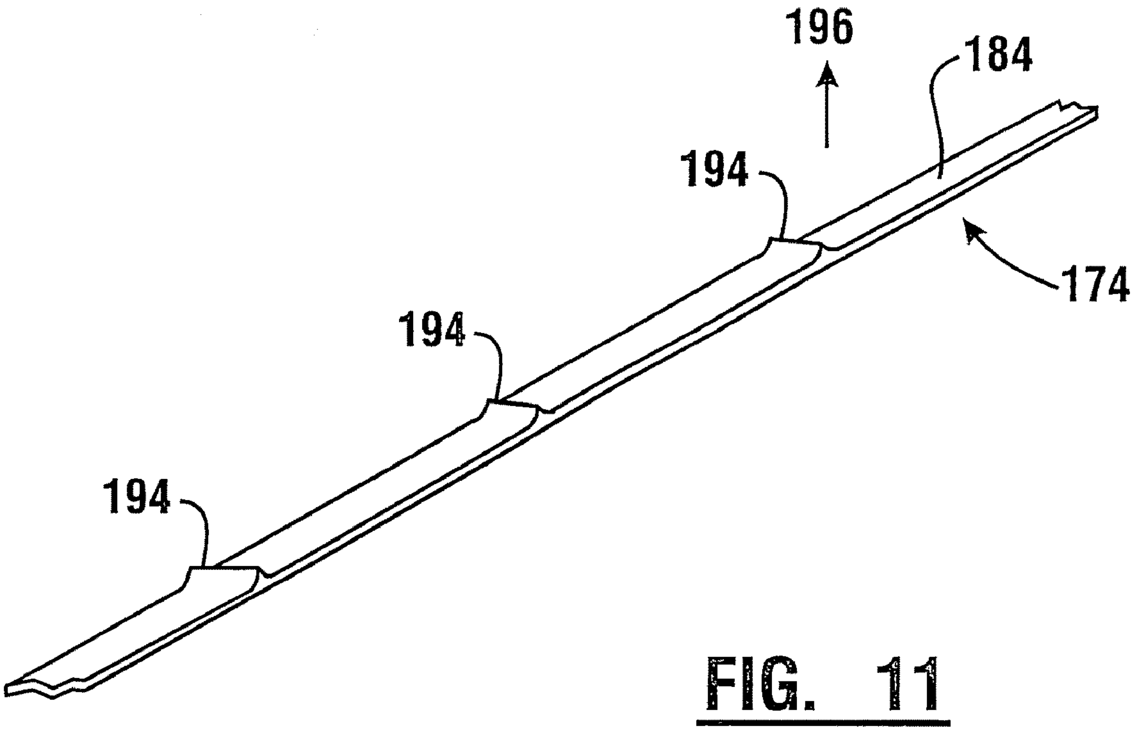
FIG. 11 is an isometric view of a portion of a belt flight including longitudinally spaced projections thereon.

FIG. 11 shows an isometric view of belt flight 174 with the first sheet engaging surface 184 thereof turned 180 degrees from that shown in FIG. 13. The first sheet engaging surface 184 includes a plurality of longitudinally spaced projections 194. The projections 194 extend generally in the first facing direction represented by arrow 196. In the exemplary embodiment, the projections 194 are deformable, resilient and spaced from one another a distance that is greater than the length of the sheets that are moved through the associated transport in the longitudinal direction. This enables a sheet to extend between the adjacent longitudinally spaced projections. It should be understood however that other embodiments of the invention may have projections with other properties and the projections spaced more closely together. Other alternative embodiments of the invention may have the projections spaced far apart, even to the extent of including only one such projection on the continuous sheet engaging surface of a belt.

In embodiments of the invention all of the belts used in connection with a transport may include projections thereon. However in some embodiments it may be desirable only to replace certain belts with alternate belts including such projections. For example in the transport including three belt flights shown in FIG. 13, it may be desirable only to replace the middle belt with an alternate belt. Alternatively it may be desirable to replace the two outward belts with an alternate belt, leaving the middle belt as having a generally smooth continuous outer surface. Various approaches to replacing the belts may be taken depending on the particular type of documents being transported.

As shown in FIG. 13 embodiments of the invention may have multiple belts arranged such that the projections that extend from the first sheet engaging surfaces of the belts are generally transversely aligned. In this way each of the longitudinally spaced projections will maintain generally the same spaced relation relative to the other projections as the belts are moved from the transport. Alternate embodiments of the invention may have the belts installed such that there is no predetermined relationship between the projections on each respective adjacent belt. In each situation benefit is obtained as the projections facilitate movement of sheets in the transport.

Figure 15:
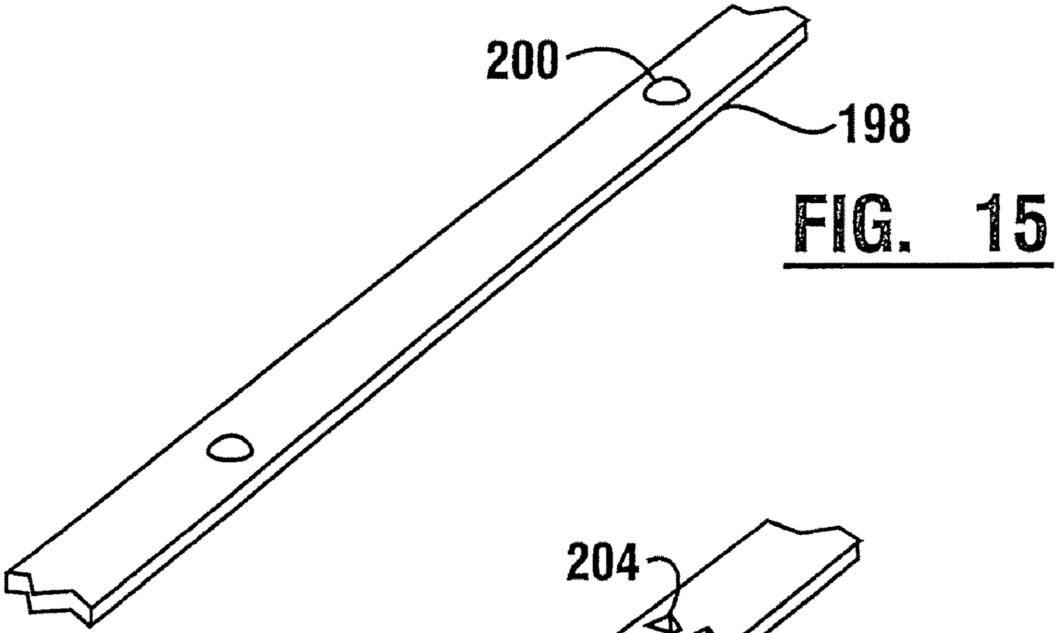
FIGS. 15-17 show alternative exemplary forms of projections positioned on belt flights which may be used in connection with sheet transports including the improvement of the present invention.
Figure 16:
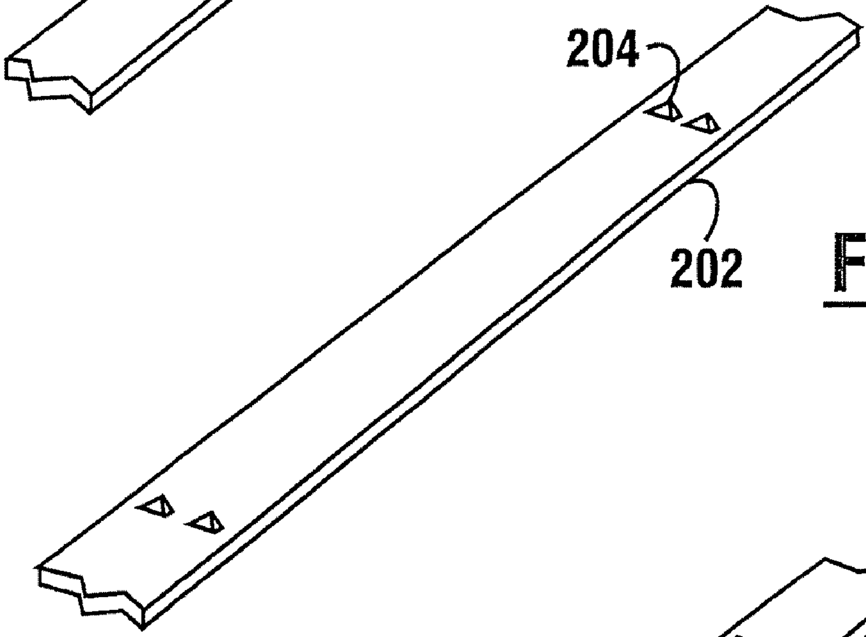
Figure 17:
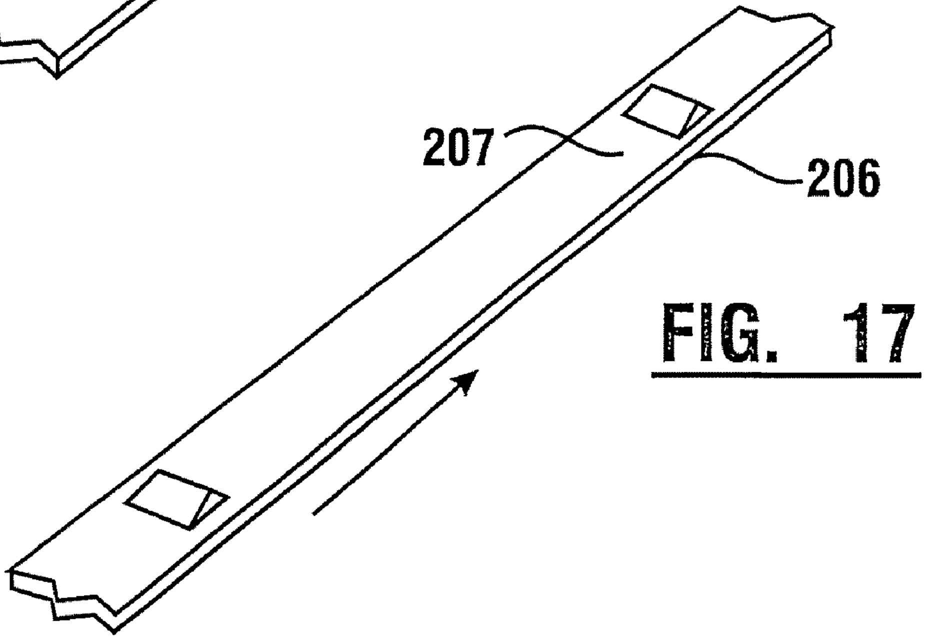

It should be understood that the configuration of belt flight 174 with the longitudinally spaced projections which extend across the first sheet engaging surface of the belt is exemplary. In other embodiments of the invention other types of projection configurations may be used. For example, FIG. 15 shows a belt flight 198. Belt flight 198 includes bubble type projections 200. FIG. 16 shows a further alternate belt flight 202 which has adjacent cone-like projections 204. FIG. 17 shows yet a further alternate belt flight 206. Belt flight 206 includes ramp-like projections 207. It should be understood that these belt and projection configurations are exemplary and in other embodiments other configurations may be used.

The exemplary form of the transport improvements of the present invention is designed for use in connection with existing transports which move sheets such as bank notes in an automated banking machine. Belts which include the improvement are made to extend about existing sets of rollers within the machines and to replace existing transport belts which have generally smooth continuous sheet engaging surfaces about the entire periphery thereof. To improve the performance of the transports in such machines, a service person must open the housing of the machine such as by unlocking and opening a door of a secure chest. The service person is then enabled to remove the existing transport belt from a set of rollers which support and move such belt. With the prior belt removed from the transport, an alternative belt of one of the types described herein including longitudinally spaced projections is installed in supporting connection with the set of rollers. The service person may then close and lock the door of the secure chest of the ATM. Sheets may be then moved in the transport urged not only by the relatively smooth portions of the sheet engaging surface of the belt, but further urged to move by engagement with the projections thereon. As can be appreciated, the projections on the belts provide additional urging force that is generally sufficient to move sheets that otherwise might slip or become stuck in a transport.

It should be appreciated that in the exemplary embodiment, the alternate belts described may be used in connection with transport 54 as well as transport 60. The principles of the invention may also be applied to other devices which move sheets within the machine. For example belts which include longitudinally spaced projections of the type described herein may be used in connection with a system for moving stacks of sheets such as is shown in U.S. Pat. No. 5,507,481, the disclosure of which is incorporated herein by reference. In such transports the projecting member portions comprise moving belt flights which move in coordinated relation with the facing belt flights and serve to transport stacks in between. Alternative belts including projecting portions thereon may be used to move stacks of sheets that are in between and enable movement of such stacks more reliably. As is explained in the incorporated disclosure, such transports in which the projecting member portions comprise moving belt flights enable reliably moving stacks of notes or connected sheets such as passbooks and checkbooks within an automated banking machine.

The principles of the present invention may also be applied to other types of stack and sheet transports including for example, stack accumulation and presentation mechanisms such as is found in U.S. Pat. No. 5,435,542, the disclosure of which is also incorporated herein by reference. Of course the principles of the invention may be applied to other transport mechanisms as well. It should be understood that the improved sheet dispensing functions achieved through utilization of the principles of the present invention may be incorporated in automated banking machines with the improved transport features to achieve improved reliability in moving and delivering sheets within the automated banking machine. Of course it should also be understood that in some embodiments the improved picking capabilities will be implemented without the improved transport capabilities and vice versa. The principles of the invention may also be applied to other configurations of picking members and devices as well as sheet transports.

In an exemplary embodiment, cassettes or canisters can be labeled to identify and indicate the content of media therein. For example, a multi-media canister may use a mechanical button arrangement to represent items of data relating to the canister and its content. The use and operation of information indication buttons for a canister is described in detail in the disclosure of U.S. Pat. No. 4,871,085, which has been incorporated herein by reference. A button (or movable cassette information indicator member) arrangement may be reflective of cassette ownership, cassette serial number, and media description (e.g., denomination code, height, thickness). A button arrangement can be read by the automated banking machine via a media dispenser. The buttons can contact an electrical switch actuator of a dispenser component. In an exemplary embodiment, button contact surfaces can include gold plating.

However, the changing of an information indication button arrangement may require the cassette or canister to be opened in order for service personnel to access the buttons. Additionally, certain button arrangements may require that some button holes remain empty of buttons. Thus, the possibility of losing unused removed buttons during handling exists. What is needed is a cassette that enables unused buttons to remain therewith and that permits a button arrangement to be changed without requiring opening of the cassette.

Figure 18:
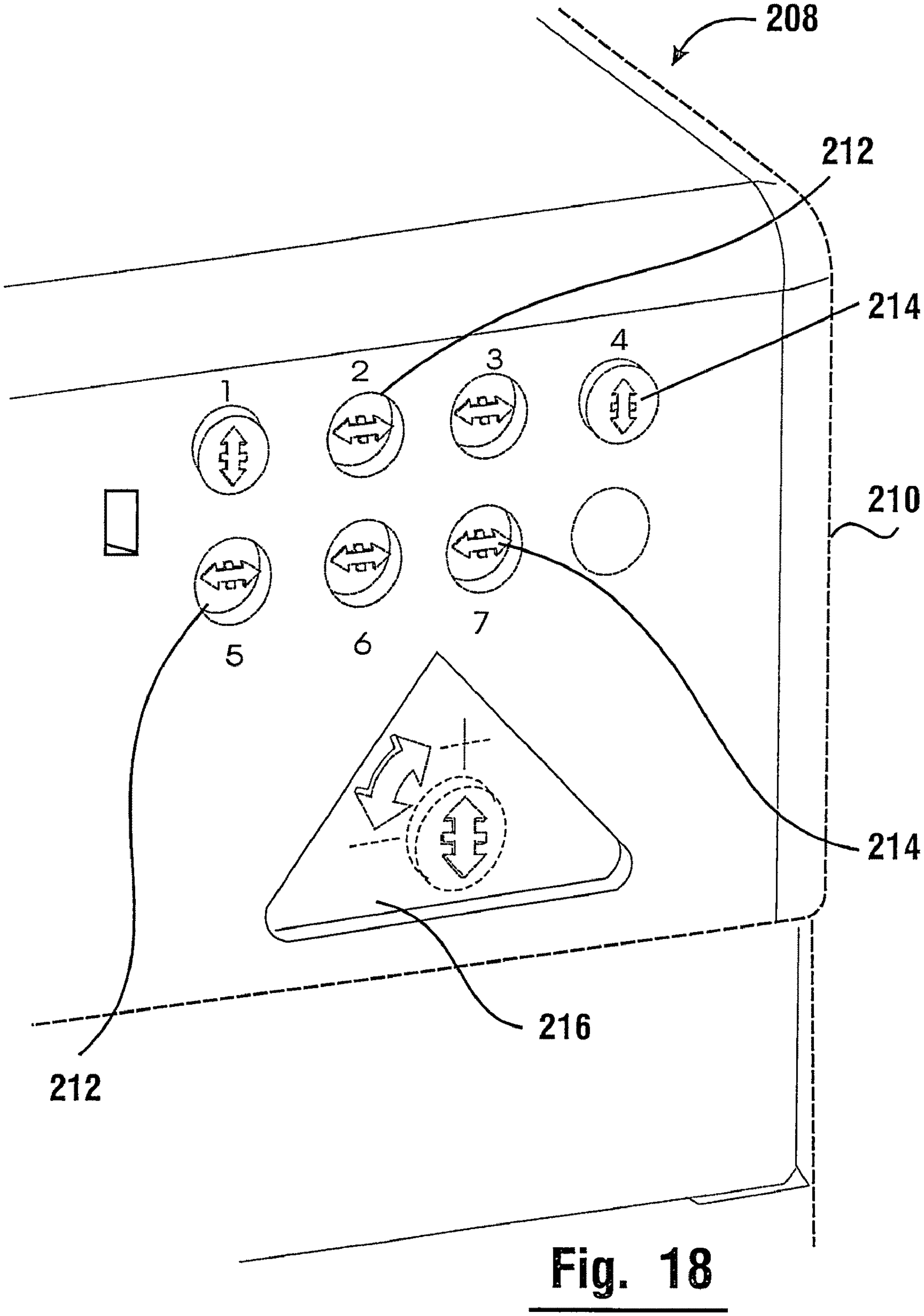
FIG. 18 shows a media cassette arrangement including indicator buttons.

FIG. 18 shows a portion of a media cassette 208. The cassette includes a housing 210, button holes 212, and buttons 214. The buttons can have an outward end or head. The buttons can be elongated and have an axis. The position of the buttons can be changed (or adjusted or reconfigured) to correspondingly change (or alter) the cassette information that is represented by the position of the buttons. The buttons can be axially moved (e.g., repositioned) outward and inward relative to the cassette housing (or outer surface of the cassette) by rotation thereof. For example, a button may be rotated counterclockwise approximately 90 degrees to move the button head from an inward location or position (e.g., recessed or retracted inward from the housing outer surface) to an outward location or position (e.g., extended outward from the housing outer surface). Of course, distances or angles less than or greater than 90 degrees may be used. An outwardly positioned button can be read or sensed by the machine. When a button is in an inward position, the button head may be flush with a cassette outer surface or inward of the outer surface. An ATM may be arranged such that an inwardly positioned button cannot be read (or detected or sensed) by the machine, whereas an outwardly positioned button can be read.

A button may be similar to a screw. A button may have threads which permit its movement relative to the cassette housing. A button head may have a groove or slot arrangement which is adapted to receive the end of a conventional rotation device, such as a screw driver. Alternatively, a button head may have a unique groove or protrusion arrangement which requires a special tool to engage and move the button. Thus, for reasons of security, only authorized personnel may have access to the special tool.

A button head may be accessed from outside of the cassette. That is, authorized service personnel may access the buttons without first opening the cassette. Thus, a cassette need not be opened to change or modify a button arrangement. For example, a cassette fully loaded with currency need not have the currency removed in order to rearrange buttons.

A button can be operatively engaged to a cassette to remain therewith. The end of a button opposite the button head may be removably fixed to the cassette. For example, the end may have a securing device, such as a pin or flange or tab, to prevent removal of the button by outward movement. Thus, a button may have a fixed or predetermined limit to its outward extent. Likewise, a button may also have limited movement in its inward direction. A button may be removably attached to a cassette while the cassette lid is open. That is, the securement of a button to the cassette may be of such an arrangement that the button may not be removed or disengaged from a cassette without first opening the cassette.

The cassette housing 210 may have a symbol 216 (or emblem or label or indicia) thereon representative or indicative of open and closed button positions. As shown, the symbol 216 includes a representation of a button head. The symbol indicates, via an arrow, which way to turn or rotate a button to move it between a closed position and an open position. The symbol also shows that a button head arrow in the vertical or upward direction is indicative of the positive (+) or outward button position. Likewise, the symbol shows that a button head arrow in the horizontal or sideways direction is indicative of the negative (−) or inward button position. Thus, a button moved so that its arrow is in the vertical position is "on" and can be detected or read by the machine. Likewise, a button moved so that its arrow is in the horizontal position is "off" and cannot be detected by the machine.

FIG. 18 shows eight button holes and seven buttons. Seven of the button holes are labeled with indicia 1-7. Two buttons (at holes 1 and 4) are in an "on" (extended) position and five buttons (at holes 2-3 and 5-7) in an "off" (retracted) position. Of course greater or fewer button holes and buttons may be used. The empty button hole can be used for other purposes, such as to indicate a low media condition.

Figure 19:
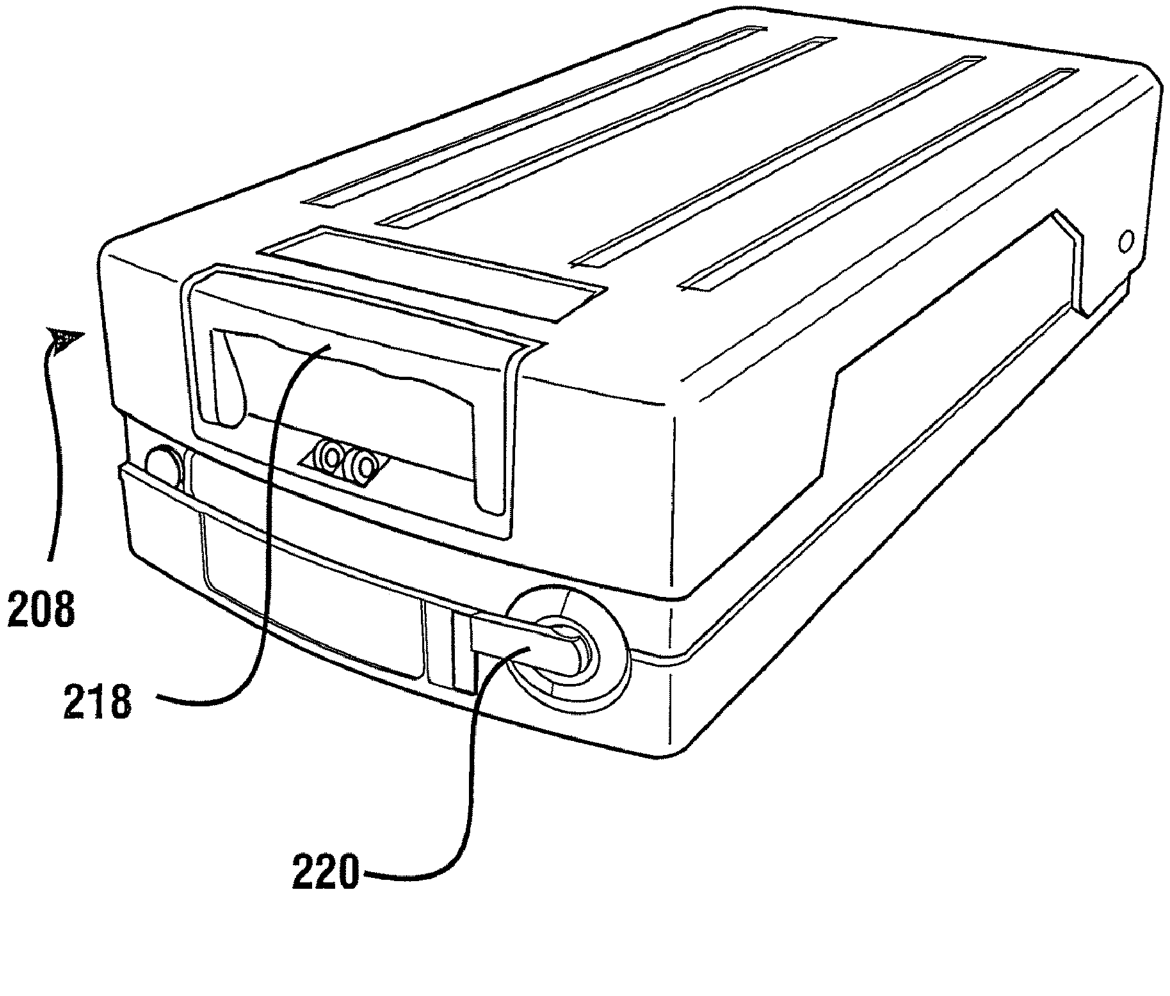
FIG. 19 shows a front angled view of the cassette housing of FIG. 18.
Figure 20:
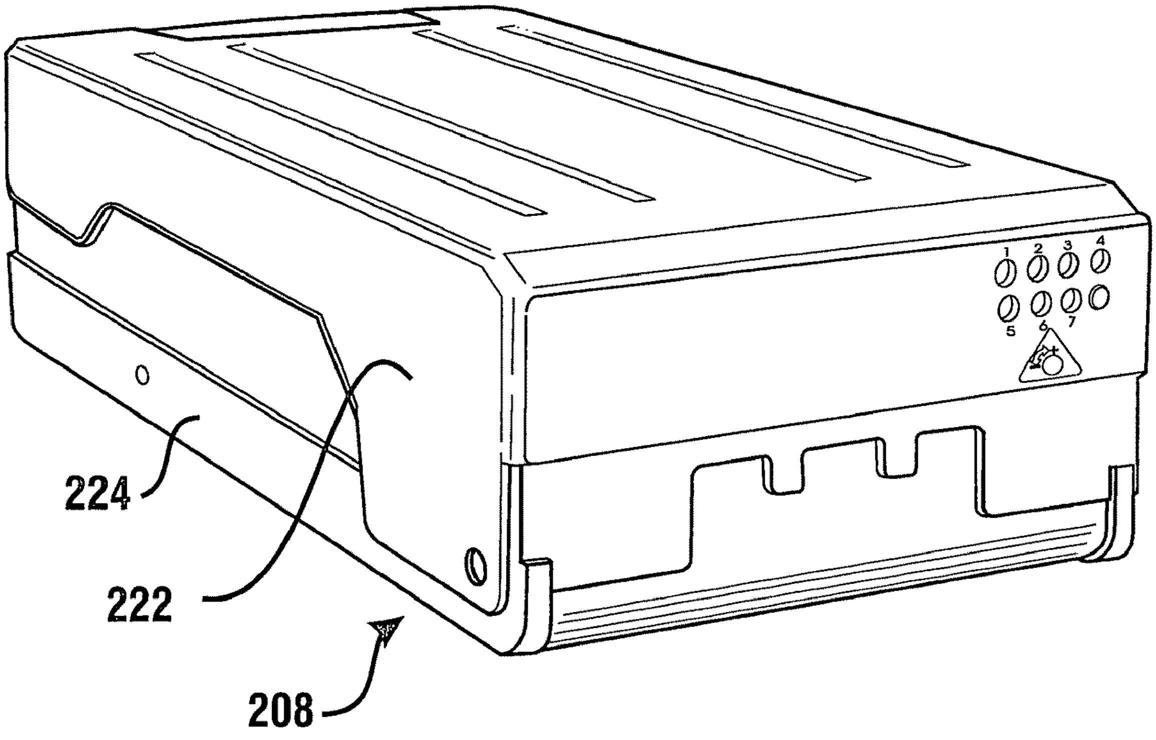
FIG. 20 shows a rear angled view of the cassette housing of FIG. 18.

FIGS. 19 and 20 show respective front and rear angled views of the cassette housing of FIG. 18. FIG. 19 also shows a cassette handle 218 and a cassette lever 220. FIG. 20 also shows a cassette lid 222 and base 224. Service personnel may carry the cassette via the handle. The lever may be used in opening the cassette.

Figure 21:
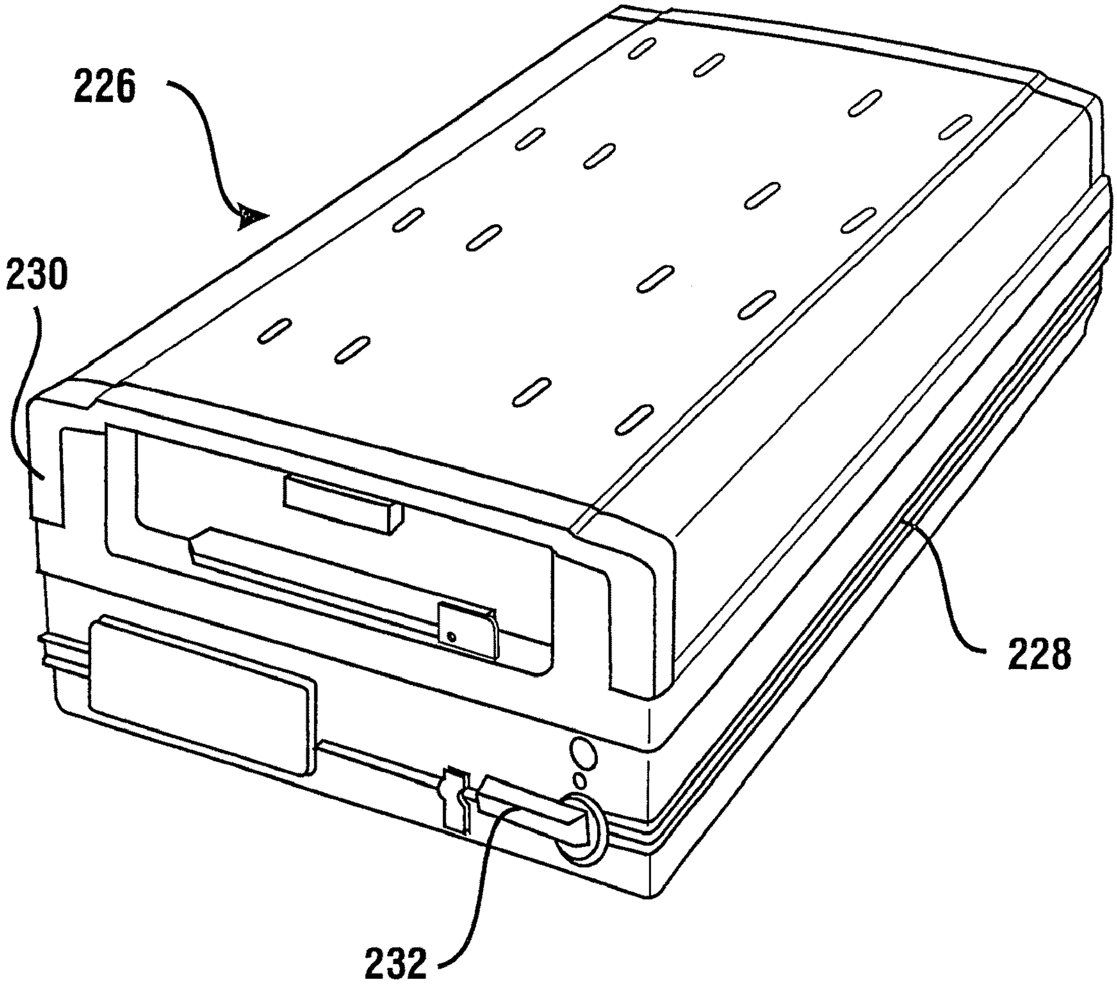
FIG. 21 shows a front view of an alternative cassette housing.
Figure 22:
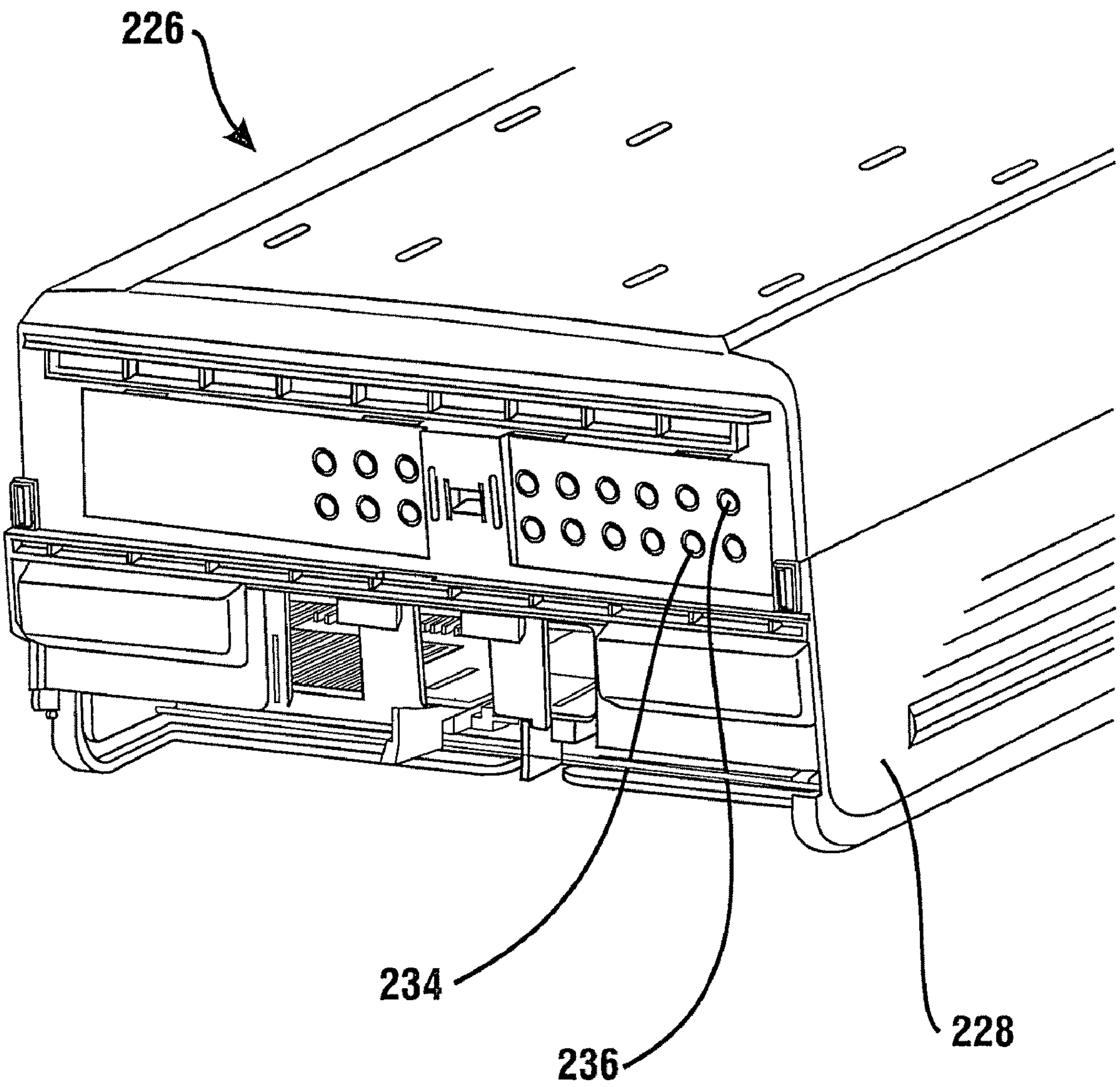
FIG. 22 shows a rear view of the cassette housing of FIG. 21.

FIGS. 21 and 22 show respective front and rear views of an alternative cassette 226. FIG. 21 also shows a cassette housing 228, handle 230, and a lever 232. FIG. 22 shows the cassette housing 228 having a configuration of eighteen button holes 234. The button holes may have indicia adjacent thereto to represent their usage. For example, a button hole 236 to be used by a media low indicator may be labeled "ML", which can be representative of "media low." Other configurations and labels may be used. For example, a media cassette may have twenty-eight button holes which can be equivalent to 28 bits. A cassette may also use buttons to indicate the presence of a cassette, a cassette latched condition, and/or a media (e.g., money) low condition to an automated banking machine.

As discussed in incorporated U.S. Pat. No. 4,871,085, a low currency condition in a cassette can be indicated or signaled by using an indication contact button. However, sometimes too large an amount of surplus currency is often remaining in a cassette when a low currency condition is indicated. In certain situations it would be more efficient to be able to dispense more of the cassette currency before a service call is required. Thus, an ability to adjust what constitutes a media-low condition in a cassette would be beneficial. An exemplary embodiment permits such adjustment, refinement, or fine tuning of a media-low indicator arrangement.

Figure 23:
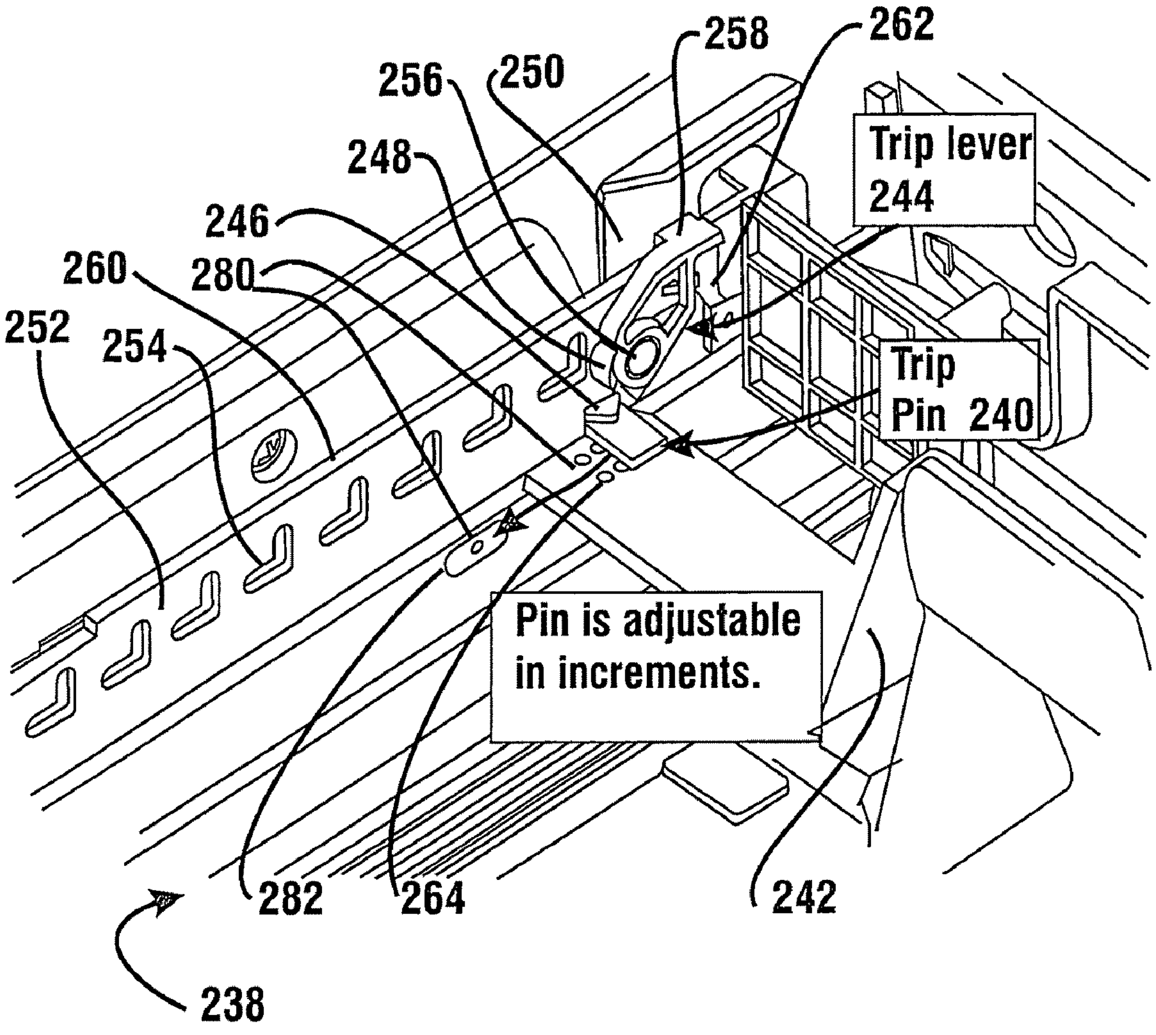
FIG. 23 shows a low media indicator arrangement for a cassette.

FIG. 23 shows a low media indicator arrangement 238 for a cassette. A pin 240 movable with (e.g., located on or attached to) a push plate body 242 is operative to trip a lever 244 in triggering a low media condition. The push plate body can be biased (e.g., spring biased) to push (or provide a force on) media toward a media exit portion of the cassette. The trip pin is operative to cause actuation of a media-condition (e.g., media low) indicator device (e.g., indicator button or indicator button mechanism) responsive to media attaining a predetermined media state in the cassette. The trip pin may have a head 246 which can abut or engage a trip lever head 248 to move the trip lever generally parallel to the movement of the push plate (e.g., in a horizontal direction). The heads may be angled cams. The trip lever may be moved to drive a media-low actuator (or actuator arm) 250. A spring-loaded actuator arm may be used.

A low media actuator may include an indicating contact button, although other devices may also be used to indicate a low media condition to an automated banking machine. For example, a lever (or actuator arm) may be arranged such that movement thereof may be directly detected or sensed by a machine component to indicate a low media condition, without (or in addition to) the use of an indicator button. Still, other indicating relationships and arrangements may be used.

A cassette wall portion 252 can include a plurality of slots 254 (or openings). A trip lever 244 can be operatively attached to an actuator arm 250 via a connector 256 (e.g., pin or screw or bolt) extending through a slot 254. That is, the trip lever and the actuator arm may be connected with the wall therebetween or intermediate thereof (e.g., the trip lever on one side of the wall and the actuator arm on the opposite side of the wall). The connector 256 is operative to slide along a slot 254.

A trip lever 244 (or latch or arm) can move in both a pivoting (e.g., rotational) direction and a lateral direction (i.e., the direction generally parallel to the movement of the push plate). The trip lever is operative to pivot about an axis of the connector. The trip lever can include a stop (or ledge or flange) 258. The stop 258 is operative to engage a step (or shelf) 260 of the cassette wall 252. The engagement is operative to prevent to the trip lever from rotating downward past the step. The trip lever can also be weighted in a laterally downstream portion 262 thereof.

As media is depleted, the push plate moves the trip pin. The trip pin head can eventually contact the trip lever head. With additional push plate movement the trip lever is pushed by the trip pin in the lateral direction. That is, the force due to the weighted portion of the lever can prevent rotation of the lever while the lever has the ability to slide in the slot. The trip lever can be pushed laterally until the connector reaches the downstream end of the slot (e.g., the end of the slot nearest an indicator button hole). With the connector positioned against the end of the slot the actuator arm is extended in its media-low position (e.g., a position which can cause an indicator button to extend from a button hole).

With the connector positioned against the end of the slot, further push plate movement can cause the trip lever to overcome the force due the weighted portion and begin to pivot. The trip lever can pivot a distance such that trip pin head can eventually slide past the trip lever head. Without any trip pin force acting on the trip lever the weighted portion can cause the trip lever to pivot in the opposite direction until the stop again engages the step.

The trip pin 240 (e.g., abutting device or tripping device) can be an adjustable trip pin. The pin can be rearranged or repositioned on a push plate. The embodiment of FIG. 23 provides for a trip pin to have three different trip settings. Of course other arrangements may have greater or fewer settings. In an exemplary embodiment, an adjustable pin can be arranged to fine tune a low media condition to range levels in millimeters. For example, a trip pin may be adjustable in 2 mm increments. Of course larger or smaller length increments are within the scope of the exemplary embodiment.

A trip pin (or member) may be removably securable to a push plate (or device) at various positions longitudinally spaced along the push plate (or push device) in a direction generally parallel to the movement of cassette media. A trip pin 240 can be removably attached to a push plate portion 242. For example, the connection may include a snap fit type of connection or a tongue and groove type of connection. That is, a trip pin may have a plural projections which are adapted to fit into or mate with respective recesses of a push plate portion. FIG. 23 shows recesses 264. A connection arrangement may have plural spaced or disposed connection areas. For example, a connection arrangement may have pairs of connectors. A connection may be similar to a LEGO® block type of connection. Other manners of attachment, connection, or fastening may also be used.

Alternatively, a trip pin may be slidably secured to a push plate body. The push plate body could have one or more slots. The slots could extend in the push plate in the (longitudinal) direction of media (and push plate) movement. The trip pin could be operative to slide along the slots. The trip pin may have a (lower) flange at one end to retain securement to the push plate body. The trip pin could be fixed or secured at a specific position along the slots. A securing (or locking) device could be used to secure the trip pin at a specific position. Hence, a trip pin could be secured to the push plate body (or member operatively connected thereto) at a first slot position and then later securely repositioned at a second slot position. The trip pin arranged at the first position (or first setting) could be operative to cause actuation (e.g., trip) of an indicator device prior to having the trip pin arranged at the second position (or second setting). That is, a trip pin at one setting can cause (or trigger) a cassette media-low indicator to be actuated (or operated or set into action) at a first predetermined currency volume level condition (or state), whereas the trip pin at a different setting can cause the same cassette indicator to be actuated at a different predetermined currency volume level condition. Thus, the actuation of a media-low indicator at a corresponding predetermined media-low state can be arranged by positioning the trip pin to trip the indicator when the media reaches the predetermined media-low state. Actuation of a media-low indicator can be directly responsive to the trip pin setting.

Alternatively, a trip pin may be rotatably secured to a push plate body. For example, a trip pin may be turnable like a dial or knob. For example, a trip pin may be rotated to one of four different settings. A trip pin may have different sized heads. Each head could be rotated into position engage a trip lever to reflect different media-low levels. Each respective head could be used to trip the same media-low indicator at respective different times. In certain embodiments a trip pin head may be rotatable while the cassette is in an ATM. Thus, trip settings could be automatically changed by the ATM to vary trips settings of a particular cassette. For example, a cassette may carry two different types of media with one media using a first trip pin head and the other media a second trip pin head. Also, a single trip pin head may itself be rotatable. The head could have plural different sized lever engagement points thereon.

For example, the head may have four engagement points spaced at 90 degrees. Thus, the trip pin head may be rotated to determine a particular media-low setting.

Alternatively, a push plate may have plural trip pins fixedly attached thereto or integral therewith (e.g., of one-piece therewith). That is, the pins may remain with the push plate (i.e., instead of being removed therefrom). In an embodiment the pins can be recessed or hidden in or below a push plate, and then elevated, extended, or revealed during usage thereof. For example, a pin may be spring biased toward an extended operating position. When the recessed pin is moved perpendicular to and outward from push plate movement it can pop up (e.g., be biased upward in a pivoting direction) into an operating position. After use, the pin can be lowered (e.g., moved against the spring into a position parallel with the push plate surface) and then pushed back into the push plate.

Furthermore, trip pins may be of different sizes or dimensions. For example, trip pins may have lever-engaging heads of different lengths. Thus, a first trip pin having a head of a first length may be attached to a push plate (or some other component which is movable as a paper stack lessens in length). The first trip pin may be attached to the push plate by using a first groove (or slot) pattern arrangement. The first trip pin may be replaced by a second trip pin having a head of longer length. The second trip pin may be attached to the push plate using the same groove pattern (connection) arrangement that was used by the first trip pin. Thus, a low media volume (or length of currency stack) condition would be indicated sooner using the second trip pin than with the first trip pin. That is, the longer head portion of the second trip pin would trip the trip lever before the shorter head portion of the first trip pin.

It should be understood that combinations of (a) adjusting where a trip pin is attached to a push plate, and (b) adjusting trip pin head sizes may be used. Such combinations can further provide fine tuning of low media (or empty media) conditions.

An adjustable trip pin may be set at a particular trip position based on the thickness of the particular currency which is to be loaded in the cassette. For example, a cassette may need a longer stack of thicker (e.g., worn or older) notes in order to have the same number of notes as in a smaller stack of thinner (e.g., new) notes. The thickness of currencies may also vary among nations. Hence, a pin may be arranged to trip earlier for thicker notes and later for thinner notes.

Additionally, it may be beneficial to replenish an ATM cassette (or cassettes) prior to losing the ability to dispense a specific denomination of currency (or the ability to dispense any currency). An adjustable trip pin may be set at a particular trip position based on cassette service response time ability. For example, a first ATM located at a bank building (having bank employees) may have a faster service response time than a second ATM situated at a remote location which is distant from service personnel. That is, a bank employee who works in the bank building (and is notified of a low currency condition) may be able to quickly replenish a currency cassette in the first ATM without leaving the bank, whereas a longer length of time may be needed for an entity to replenish the second ATM. The servicing of the second ATM may require lengthy travel time. Of course other service response time scenarios may occur, such as having an ATM located near an ATM maintenance and/or service center.

Thus, where a relatively longer response time is needed, an adjustable trip pin may be set so that it trips a low condition lever relatively early (e.g., a relatively large portion of a currency stack remains in the cassette at trip time). Contrarily, where a relatively shorter response time is needed, an adjustable pin may be set so that it trips a low condition lever relatively late (e.g., a relatively small portion of a currency stack remains in the cassette at trip time).

In other situations service personnel may only want to know if a cassette has been emptied of its contents. For example, a cassette may have been pre-loaded with media such as coupons. The coupon promoter may have set a specific limit on the number of coupons to be dispensed. Hence, once the cassette is empty it is not to be reloaded with any more of the coupons. Thus, an adjustable trip pin may be set so as to be able to indicate an empty cassette condition.

In alternative embodiments a trip lever can be adjustable. That is, a trip lever may be removed and relocated to a different cassette wall slot. Levers of different sizes and lengths may also be used. Combinations of adjustable and interchangeable trip pins and trip levers can further provide fine tuning of low media (or empty media) conditions. For example, a trip pin and a trip lever can be arranged to accurately indicate a fully empty cassette condition.

Furthermore, a sequence of trip indicators using one or more trip levers may be used. Thus, a machine and/or service personnel may be able to receive numerous notices concerning the indicated level of media remaining in a particular cassette. Each subsequent notice can be reflective of a lesser amount of media remaining in a cassette. For example, a trip pin may pivot a first trip lever to cause a signaling of a first media low condition (which may correspond to the number of notes or the value of notes remaining in the cassette). The first trip lever may be allowed to pivot to permit the trip pin to slide there beyond toward the next (second) trip lever in the sequence. The trip pin may then proceed onward toward the second lever to cause its tripping (i.e., the second tripping in the sequence). Additionally, the slots in a cassette wall may have spacing therebetween of different lengths. That is, the space between two adjacent slots may be greater than the space between two other adjacent slots. Other arrangements may use slots of varying lengths for use with different sized trip levers. That is, a slot may have a greater length than an adjacent slot.

During rough handling or transport a cassette may be dropped or receive vehicle induced vibration. Thus, in certain situations a media-low indicator mechanism of a cassette may trip prematurely. Because of a premature trip, a fully loaded cassette may indicate that it needs replenishing. An exemplary embodiment prevents a media-low indicator mechanism from tripping prematurely. For example, a replenished media cassette can have its low media condition actuator system locked during transport to prevent false firings or trips. The locking arrangement of the exemplary embodiment can be used to reduce or prevent service calls due to false firings of media low mechanisms.

A spring loaded actuator arm can be moved to indicate a low media condition. For example, a previously discussed trip lever may be used to trip, fire, or release the actuator arm. An actuator arm may be used to extend an indicator button through a button hole. The actuator arm can be biased away from its indicating position.

Figure 24:
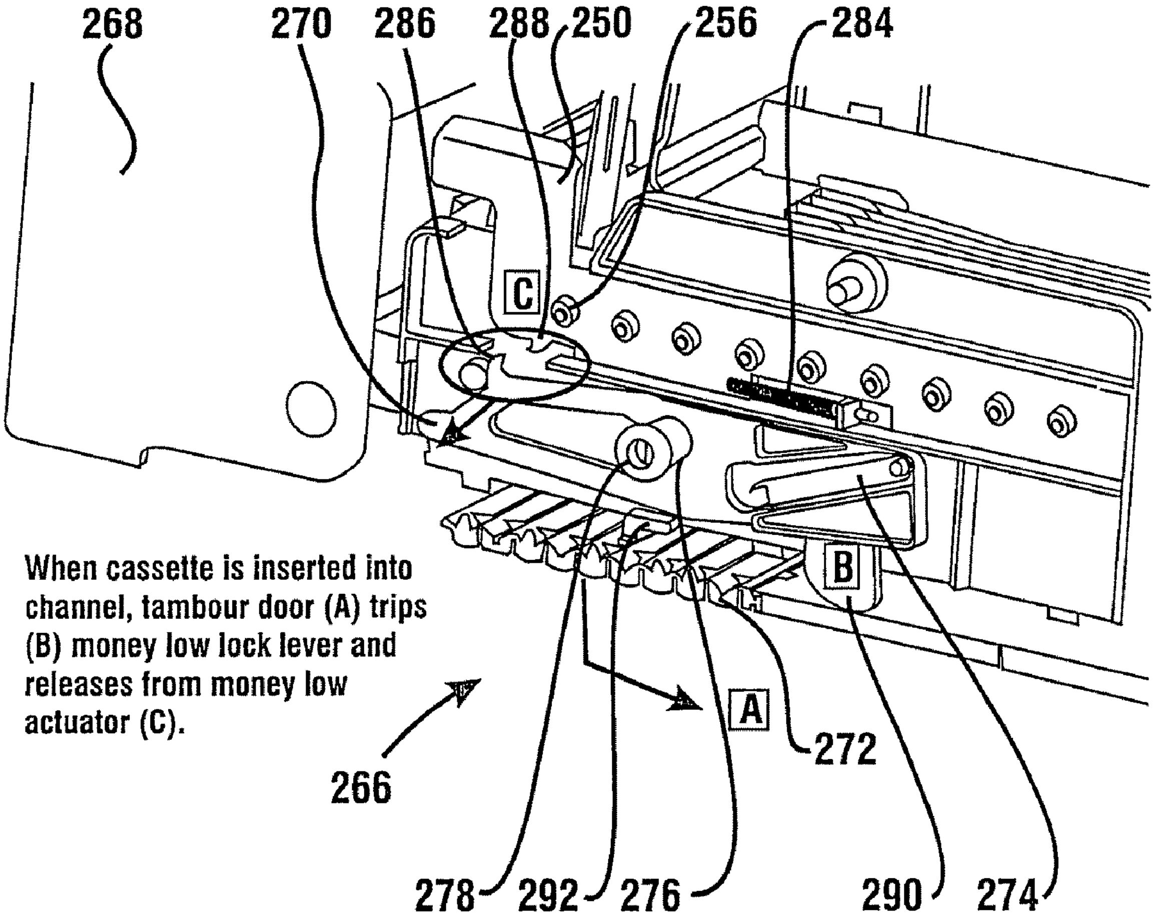
FIG. 24 shows a media low lockout arrangement in an unlocked position.
Figure 25:
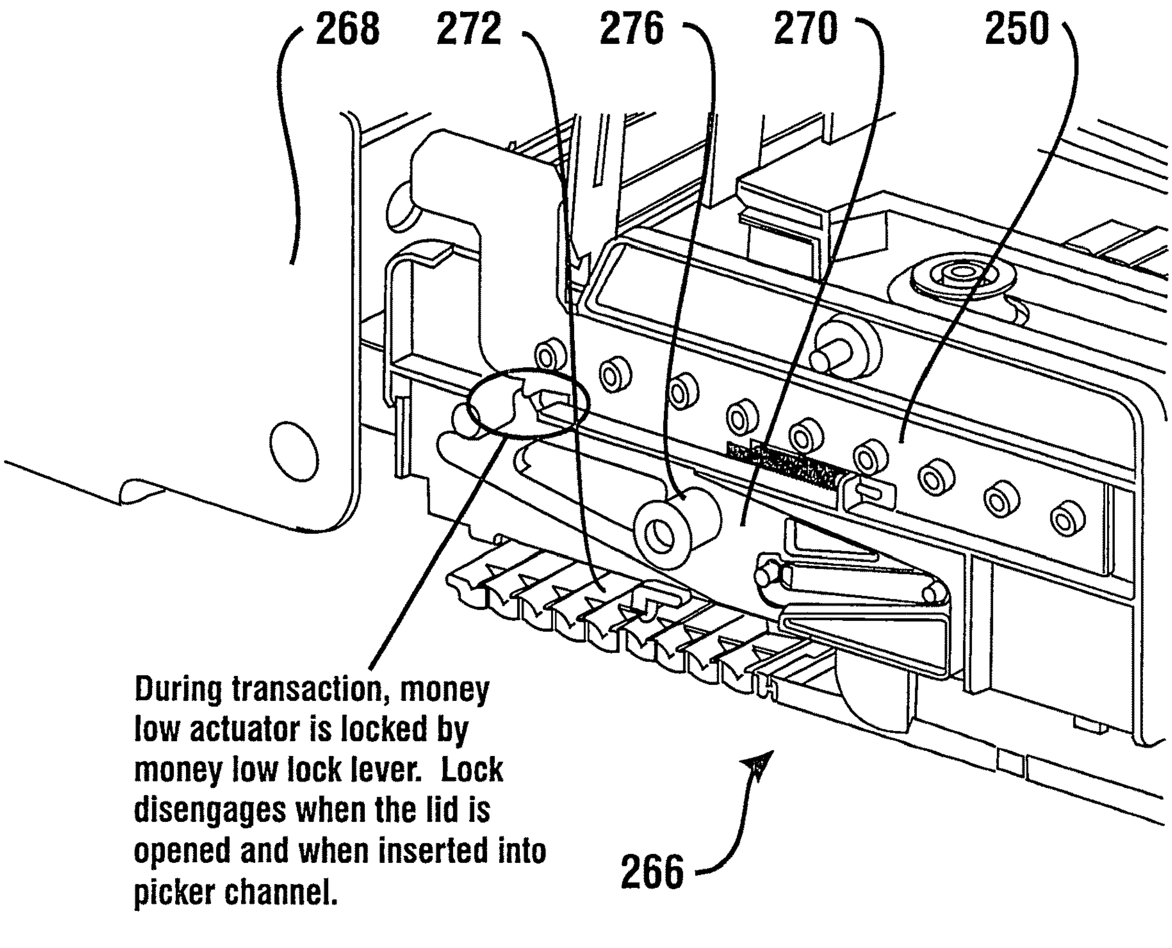
FIG. 25 shows a media low lockout arrangement in a locked position.
Figure 26:
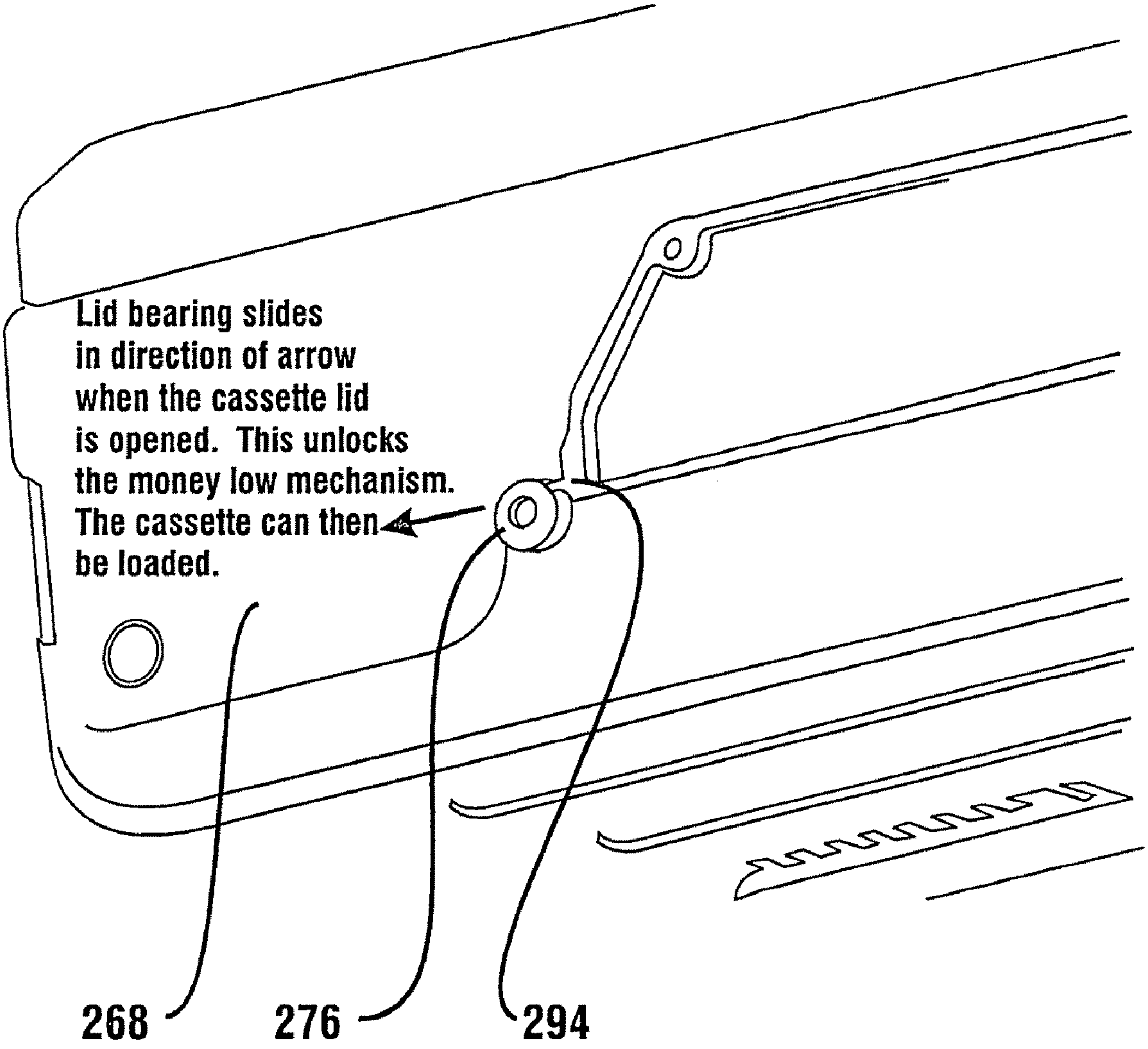
FIG. 26 shows a cassette with its lid closed.

FIG. 24 shows a cassette portion 266 in which a media low lockout arrangement is in an unlocked (or open) position. The cassette lid 268 is also shown as in an open position. FIG. 25 shows the cassette portion 266 in which the media low lockout arrangement is in a locked (or closed) position. FIG. 26 shows the cassette with the lid 268 closed. FIG. 24 also shows the cassette portion having a spring loaded media low actuator arm 250, media low lock lever 270, and a door 272 (e.g., a tambour door). The lock lever 270 can be spring loaded by a spring 274. The lock lever can be biased by the spring toward its unlocking position, as shown in FIG. 24. FIG. 24 shows the spring in its normal (or resting) biasing state. One end of the spring may be attached to the lock lever and the other end to a portion of the cassette.

The lock lever can be pivoted (or rotated) about a shaft 276 (or pin). The shaft may be flanged 278 at an end thereof to help hold the lock lever thereon. An opposite end 280 of the shaft can extend into (or through) a shaft slot 282 in a cassette wall portion 252, as shown in FIG. 23. The opposite end may also be flanged to maintain the shaft 276 in (or relative to) the shaft slot. The shaft is movable in the shaft slot. The shaft may be movable in a direction generally parallel to the direction of arrow A. As explained in more detail hereafter, the shaft may be moved by a portion of the cassette lid 268. The lid portion being able to bear against the shaft to cause movement thereof.

The actuator arm 250 can be biased by a spring 284 in the direction of arrow A. That is, the actuator arm can normally be biased to the right in FIG. 24. The actuator arm can be moved to the left in FIG. 24 to indicate a low media condition. The actuator arm 250 can generally be moved the length of a horizontal slot 254 in the cassette wall portion 252, as previously discussed with regard to FIG. 23.

The lock lever has an engagement portion 286 (projection or tab or finger) which is adapted to correspondingly engage an engagement portion 288 (projection or tab or finger) of the actuator arm in a locking relationship. That is, the lever finger 286, when in an upward locking position, can engage the actuator finger 288 to prevent movement of the actuator arm toward the left as shown in FIG. 25. The lever finger and the actuator finger can both have a backside angled cam surface. Should the lever be in a locking position with the lever finger behind the actuator finger, then the angled surfaces may assist movement of the actuator finger past the lever finger. That is, even though a lock lever may be in an upward locking position behind the actuator finger, the actuator arm may be able to slide there past, e.g., slide toward the right in FIG. 24.

The tambour door 272 may be opened in a recessing or retracting manner. For example, the door can be opened by moving in the direction of arrow A in FIG. 24. Opening of the door can permit a picker mechanism to be properly positioned to pick media from the cassette. The door can be automatically opened upon insertion of the cassette into a machine. Further operation of cassette doors is known and need not be discussed herein.

The lock lever 270 is operative to hold the actuator arm 250 in a locked position during cassette handling and transport. For example, the actuator arm may be locked during the time period following a cassette replenishing and prior to placing the replenished cassette in an automated banking machine. The actuator arm may also be locked during the time period between cassette removal from a machine and opening of the cassette lid.

When the cassette is inserted into a dispenser picker channel of an automated banking machine, the lock lever is operative to be automatically moved away from its holding (or locking) position. Upon movement of the lock lever, the lock lever engagement finger 286 is operative to disengage from the actuator arm engagement finger 288. Then, when a low media condition is reached, the actuator arm is free to be moved against the biasing force of its spring to assist in indicating a low media condition.

Locking and unlocking of the spring loaded actuator arm can be controlled by both the tambour door and by the cassette lid. The lock lever can be moved (or tripped) to an unlocking position by the tambour door. A fully loaded cassette having the actuator arm locked can be inserted into a machine. Upon insertion of the cassette into the machine the door can be opened. As the door is opened, it is operative to engage and move a flange 290 (or arm or portion or extension) of the locking lever 270. For example, the lock lever flange 290 may be moved by engagement with a latch 292 (or catch) on or associated with the tambour door 272. As the door is moved opened, the latch is operative to engage and move the locking lever flange 290. Alternatively, an end of the tambour door itself may be operative to engage and move the lock lever flange. Movement of the lock lever flange 290 (in the direction of arrow A) is operative to cause the lock lever 270 to pivot about the shaft 276. The pivoting action is operative to free (or release or unlock) the actuator arm from its locked condition. That is, the lock lever engagement finger 286 is operative to disengage from the actuator arm engagement finger 288. The open tambour door 272 is operative to maintain (or retain) the lock lever 270 in its unlocking position.

A cassette may need to be removed from an automated banking machine for several reasons, including replenishment. A cassette may be removed from a machine while an actuator arm is in an indicating position. Also, a low media condition may have been indicated, but before a replenishment service could be performed the cassette was emptied of media. Alternatively, a machine may be programmed to empty a cassette prior to replenishment.

Prior to removal of an empty cassette, a media pusher plate may have moved the trip pin past the last trip lever. Thus, the cassette actuator arm, due to action of its return spring, would have returned to its non-indicating position. Upon cassette removal, the tambour door is operative to move toward a closing position. With closing movement of the door the lock lever is no longer held by a door latch in an unlocking position. Thus, the lock lever, due to action of its spring, pivots back to a locking position and traps (or locks) the actuator arm in its non-indicating position. That is, a lock lever finger is operative to be moved to again lockingly engage an actuator arm finger. Hence, during cassette transport (or travel) from the machine to a replenishment work station the actuator arm can again be held in a locked (or secured) condition.

In another scenario a cassette may be removed from an automated banking machine with the actuator arm in an indicating position (e.g., with the actuator arm causing an indicating button to extend through a button hole). For example, the cassette may be removed subsequent to a low media indication but prior to the trip pin passing the trip lever. The cassette may still contain media (i.e., cassette not empty). During removal of the partly filled cassette the tambour door would release the lock lever to return to its locking position. The lever finger would engage the backside (right side in FIG. 24) of the actuator finger. The angled cam surfaces of the lever finger and the actuator finger may be in locked engaging relationship. The engagement may prevent the actuator arm from sliding past the lock lever. For example, even with the push plate withdrawn the engagement may be of greater force than that of the actuator arm return spring. Thus, the lever would operate to lock the actuator arm in its indicating position (in its leftmost slot position in FIG. 24).

The actuator arm (whether locked in an indicating position or a non-indicating position) can be automatically released from its locked position upon opening of the cassette lid. With the cassette lid being opened, a lid bearing member 294 is operative to permit movement of the shaft 276 in the direction of arrow B, as shown in FIG. 26. Movement of the shaft causes the lock lever 270 to pivot and unlock the actuator arm 250. That is, opening of a cassette (e.g., a cassette with the tambour door closed and the cassette out of a machine) is operative to unlock the actuator arm. Contrarily, closing of the cassette lid is operative to move the shaft in an opposite direction to lock the actuator arm.

FIG. 24 shows the shaft in a lid open position. FIG. 25 shows the shaft in a lid closed position. FIG. 26 shows that the shaft is operative to be moved from its lid closed position to its lid open position.

Having the actuator arm unlocked or free during servicing can be beneficial. For example, a free actuator arm during opening of the lid can ensure commonality of initial locking conditions; can permit testing of actuator arm movement and the actuator arm spring operation; may assist in media reloading operations; and may assist in accessing and replacement of cassette components.

With a lid in an open state, a cassette can be replenished or reloaded (loaded or filled). For example, a cassette may be loaded manually or by an automated loading machine. Upon closing the lid, the lock lever is moved to lock the actuator arm in its non-indicating position. A replenished cassette can be transported to an automated banking machine.

A lock lever can be automatically moved to lock an actuator arm responsive to the lid be closed at a work station or the tambour door being closed in a machine. That is, the locking arrangement permits an actuator arm to be automatically locked for all transport. Thus, a media-low indicator mechanism can be properly secured during transport.

As discussed in incorporated U.S. Pat. No. 4,871,085, information regarding a media cassette can be indicated or signaled to an automated banking machine by using one or more indication buttons. An arrangement of buttons can be representative of a cassette and its content, such as cassette ownership, cassette serial number, and currency denomination. Information regarding a particular representative characteristic of a cassette can be passed to an automated banking machine via physical contact between one or more buttons and a component of an automated banking machine. For example, a media-low condition may be indicated by causing contact between a button and a component of an automated banking machine via movement of the contact button. Other cassette buttons may come into contact with a component of an automated banking machine upon insertion of the cassette into the machine.

In an exemplary embodiment discussed in more detail herein, a media cassette may use other arrangements or techniques to indicate cassette content information to an automated banking machine. Unlike communication involving mechanical buttons for physical contact, the exemplary embodiment permits communication to occur without requiring physical contact. For example, a cassette may use an indicator member such as a non-contact transponder to communicate with the automated banking machine. Radio frequency (e.g., radio waves) can be one manner in which to communicate in a non-contact relationship, e.g., communication not based on physical contact. Other types of remote communication may also be used.

A cassette may have one or more radio frequency identification (RFID) tags (or devices or indicator members) which contain data indicative or reflective of cassette content information. RFID tags can operate on the RS backscatter principle. Data communication may occur between the RFID tags and an automated banking machine. Data communication may also occur between the RFID tags and a computer at a service center work station.

A canister or cassette may use non-contact RFID tags instead of or in addition to information indication contact buttons. One or more tags may be removably attached or mounted to a cassette (e.g., thereon or therein). Alternatively, tags may be permanently affixed to a cassette, such as embedded in a (plastic) portion of a cassette.

RFID tags are operative to store information therein representative of the canister and its content, such as cassette ownership, cassette serial number, and currency denomination. In an exemplary embodiment, tags can contain much more cassette-related data than can be represented by an indication button arrangement. For example, in the exemplary embodiment, tags may contain information reflective of logging data (e.g., dates, media counters, handler's name or ID) and media description (e.g., type, height, length, thickness). A tag may carry a unique cassette identification number of 32 bits or longer. The tags are also capable of storing more information in a smaller space in comparison to a mechanical indication button arrangement.

RFID tags, unlike buttons, do not require contact (e.g., mechanical or electrical contact) with a media dispenser component. Thus, the contactless tags can prevent damage (wear and tear) thereto and/or to the dispenser, and may further prevent possible jams associated with mechanical buttons.

RFID tags may have read-only or rewritable memory for storage of cassette information. RFID tags may have a memory which can be changed or modified by service personnel. The tag memory may be programmable. For example, a service work station may have a device operative to communicate with an RFID tag to change and/or read the data contained therein. A hand-held RFID tag communication device may also be used.

Alternatively, a tag may have unchangeable data. In such alternative situations, a combination of read-only tags may need to be assigned or attached to a particular cassette to fully represent its information content. A cassette may also have a combination of read-only and programmable tags.

Each media cassette in an automated banking machine can be equipped with an RFID tag. A reader device is operative to remotely read the tag data. The reader device may be associated with a dispenser feed channel. The reader is operative to read tag data while the tag is in physically contactless relationship with the machine. Thus, a tag reader can be spaced from the tag. It follows that communication between a cassette information tag and an ATM can occur without requiring physical contact, which would occur with the use of previously discussed buttons.

When a cassette having an RFID tag is inserted into a dispenser feed channel of a machine, reader circuitry associated with the dispenser feed channel can interrogate the tag to receive information about the particular cassette. The reader circuitry may comprise a circuit card assembly. In an exemplary embodiment, a tag may be of a type that does not need a power source (e.g., battery), but lives on the RF energy provided by the reader. The information exchanged between an RFID tag and a reader may be encrypted to provide additional security. Thus, a reader may comprise a decoder in decoding circuitry.

Figure 27:
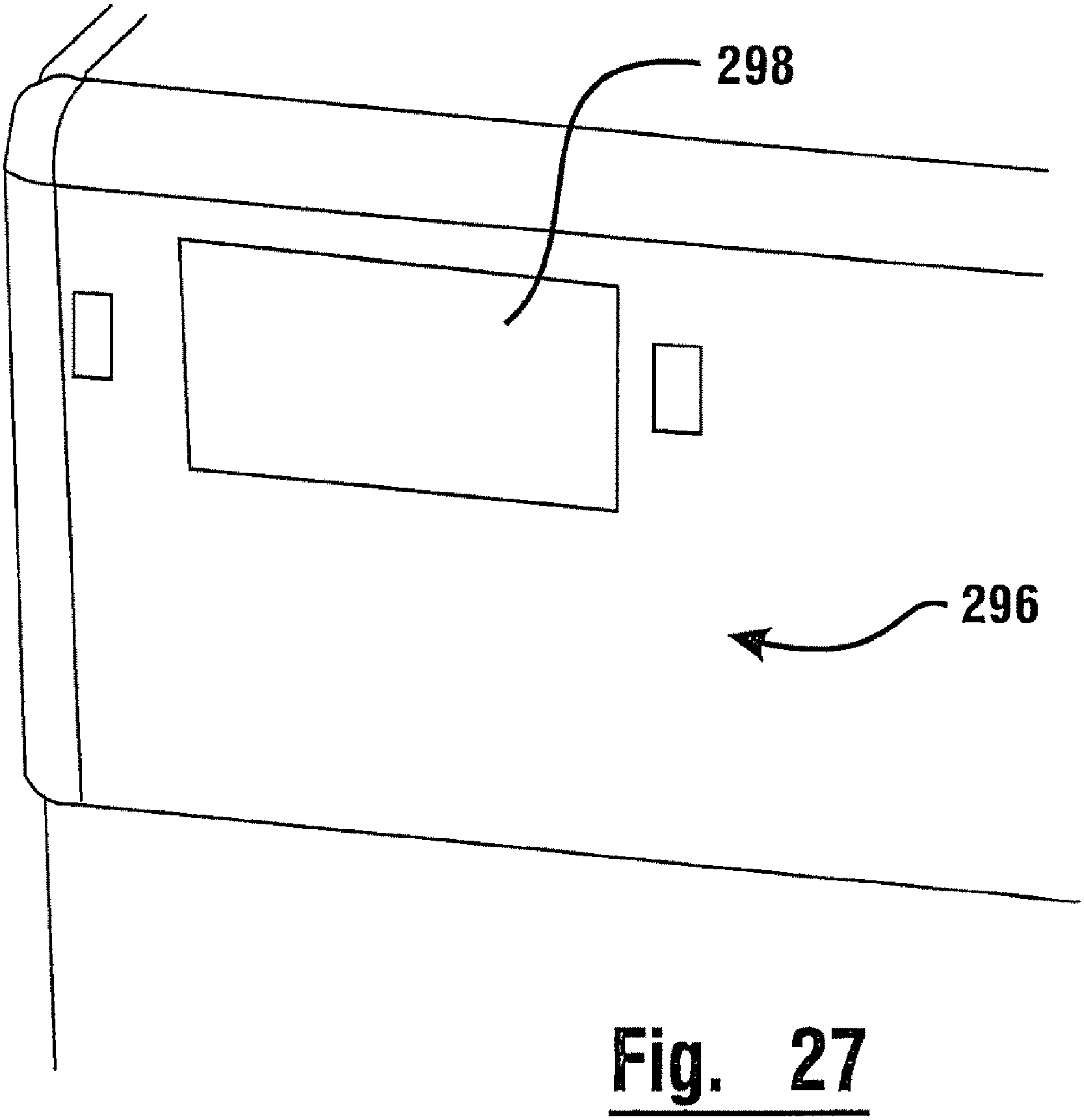
FIG. 27 shows a cassette portion including an RFID tag.
Figure 28:
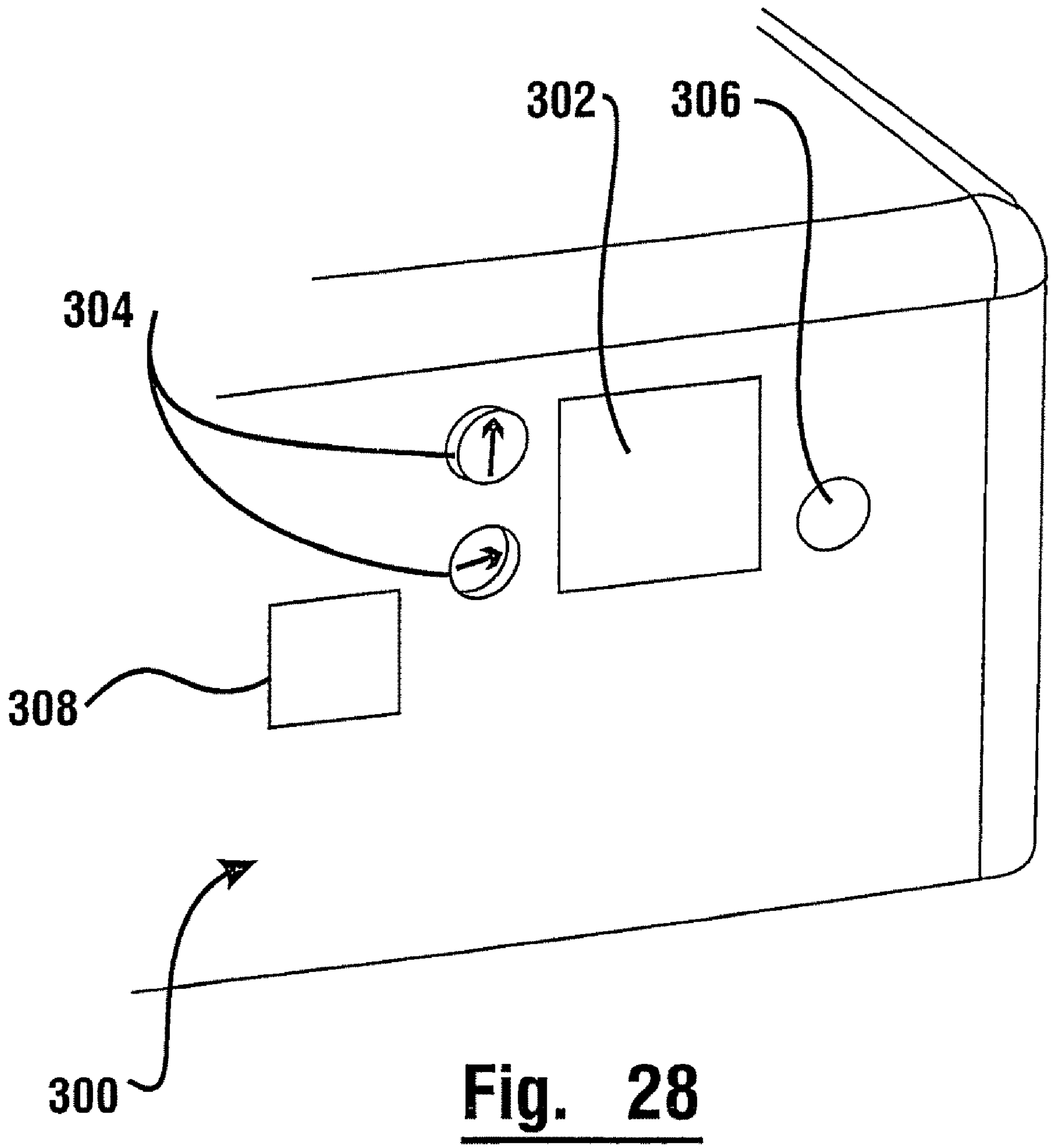
FIG. 28 shows a cassette having an RFID tag adjacent indication contact buttons.

FIG. 27 shows a portion of a cassette 296 having an RFID tag 298. FIG. 28 shows a portion of an alternative cassette 300 having an RFID tag 302 in a location typically reserved for information indication contact buttons. That is, the tag 302 is positioned at a button location. Alternatively, a modified cassette may have certain buttons replaced by the tag. Buttons 304 are also shown. A button hole 306 which may be useful for indication of a media-low condition is also shown. One or more buttons 304 may be used to indicate to the machine that the cassette has an RFID tag. Machines may be operative to read both buttons and RFID tags.

Contactless (and wireless) technology can also be used to indicate to the automated banking machine the presence of a cassette, a properly positioned cassette in a dispenser channel, and/or a media (e.g., money) low condition. A cassette latched condition may also be indicated. That is, buttons which are operative to indicate the latching position of a cassette may also be replaced in using a contactless cassette.

In an exemplary embodiment the sensing of the position of a cassette may be implemented by using one or more sensors. Although not limited thereto, low cost, high accuracy Eddy current type distance sensors may be used. A sensor can be part of a sensor circuit associated with a dispenser feed channel. A target (e.g., a metal target such as Ferrite) or indicator member can be attached to or embedded into a cassette (which may comprise plastic). The sensor is operative to accurately measure the distance between the indicator member (e.g., target) and the sensor (or another object). A cassette may be determined to be properly positioned in a machine (or a work station) if the target is sensed to be within a predetermined or acceptable range of the sensor. That is, a cassette may be deemed properly positioned if it is determined to be close enough to the sensor. A machine processor can determine from the sensor data whether the cassette is properly positioned. One or more targets and/or sensors may be used. Likewise, a contactless target/sensor arrangement can be used to determine if a cassette is properly positioned in a work station. FIG. 28 further shows the cassette portion 300 having a target 308. It should be understood that a cassette may have numerous locations at which a target may be positioned.

A contactless sensor arrangement may also be used to determine a low media condition in a cassette. The arrangement can be similar to an arrangement for sensing cassette position. A movable target (e.g., Ferrite) can be associated with a cassette instead of a button. A low media sensor can be used to corresponding measure the distance between the target and the sensor. One or more targets and/or sensors may be used. A target reaching a particular position can be indicative of low media (e.g., money) remaining in the cassette. The accuracy requirement for a low media sensor may be less than that for a cassette position sensor. For example, a low media target may be closer when sensed (e.g., may have been moved closer prior to sensing). Therefore, a low media sensor arrangement may be capable of using a smaller moving target. Alternatively, a highly accurate sensor/target arrangement may be used, such as in attempting to determine the exact number of notes or bills remaining in a cassette.

Figure 29:
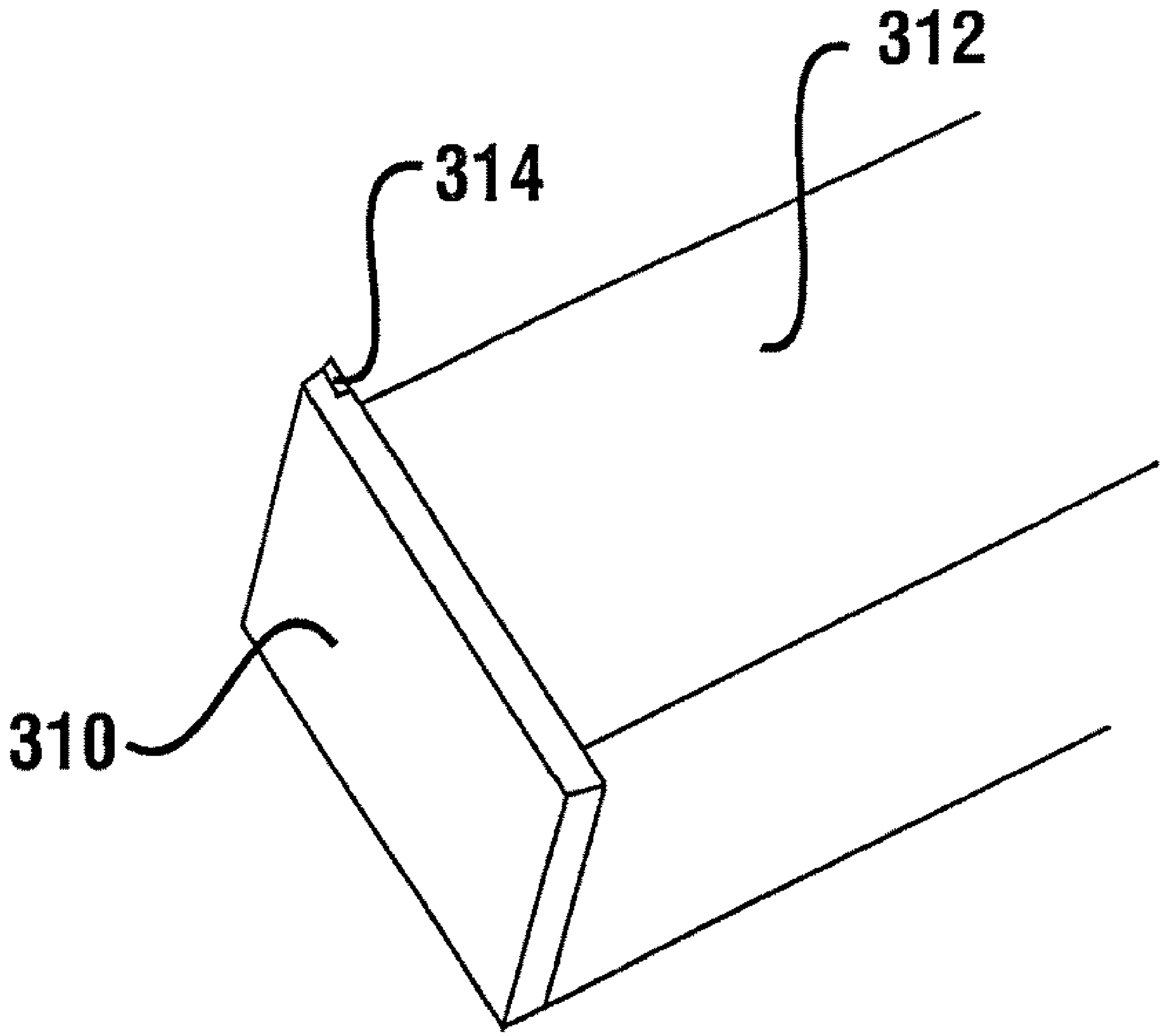
FIG. 29 shows a push plate having a target.

A low media target may be mechanically moved progressively in response to spring pressure or other mechanisms. For example, the target may be attached to or embedded in a push plate (e.g., currency follower plate) of a cassette. FIG. 29 shows a push plate 310 and a stack of media 312. The push plate has a target 314. Alternatively, a target may be first moved in correspondence with a cassette reaching a low media condition. A sensor could be operative to detect the movement of the target. Furthermore, a target may first become detectable only after a cassette has reached a low media condition. For example, a target could be shielded from detection at an acceptable media condition. Later the target could become unshielded at the low media condition. Of course other sensor/target arrangements and/or devices may be used, such as a range finder (e.g., laser range finder). A global positioning system (GPS) or component thereof may also be used.

As previously discussed, an RFID tag may include data representative of a cassette and its content. For example, an RFID tag may include data reflective of currency code, currency denomination, and the unique serial number of the cassette.

In an exemplary embodiment, an automated banking machine can be operative to read an RFID tag to obtain the initial or current amount of currency in a cassette. The machine may also be operative to keep a running count of the currency currently in a cassette. This may be accomplished by keeping a record of the number of bills initially in a cassette minus the bills removed from the cassette.

An automated banking machine can be operatively connected to other machines on a network (e.g., an ATM banking network, which may include the Internet). In an exemplary embodiment the network can track information (e.g., currency data) related to a particular cassette by recognizing its unique serial number. It follows that the network can ascertain information (e.g., currency data) related to a particular machine. It further follows that the network can ascertain information (e.g., currency data) related to each machine in the network. The network information (e.g., currency data) can be updated periodically or continuously. For example, the network information can be in real time.

The network may include one or more computers. An automated banking machine may have at least one computer. The network may includes a host which can communicate with each machine. The communication may involve the Internet and/or a proprietary network.

The tracking ability enables a customer (e.g., a host bank) to know the exact amount of currency (e.g., amount, value, types, etc.) circulating within their ATM banking system or network. The arrangement enables a network operator to provide better cash management. Machine currency amounts can be adjusted accordingly, e.g., currency can be added or removed from the system. Currency of a particular denomination can be ordered. Thus, cash management, cash replenishment control, and banking network efficiency can be enhanced.

The ability to track individual cassettes via their serial number permits improved network efficiency. For example, problem cassettes can be identified. A particular cassette may be linked or associated with a certain number of failures. These failures may have involved different machines. That is, the same cassette can be linked to failures in various machines. Tracking of the particular cassette enables it to be identified for maintenance, repair, or replacement.

An RFID tag may also include trackable data. For example, certain data may be reflective of the entity (person or persons) responsible for handling a cassette, including the entity who loaded the cassette. Thus, particular cassettes can be linked to particular entities. Thus, the ability to track individual cassettes in a banking network can enable security to be improved.

RFID tags can be operative to read, log(store), and report the cassette data. All actions associated with a cassette can be logged into an RFID tag. For example, RFID tags may be used in providing trackable information relating to cassette serial number, cassette ownership, currency nationality, currency denomination, currency length, currency height, currency thickness, loaded currency amount, times, dates, handler ID, machine serial number, cassette age, repair records, etc.

The use of RF can eliminate mechanical contact between cassettes and dispenser feed channels. Of course the use of radio frequency is one example of non-contacting remote communication. It should be understood that other types of non-contacting information communication may be used instead of (or in additional to) radio frequency or radio waves.

A cassette may also have an electronic lock. For example, a cassette may have an electronic keypad lock. The electronic keypad lock may replace (or be in addition to) a key lock.

Each unique cassette can have a different access code or combination. The code of an electronic lock cassette can be changed.

An electronic lock cassette can be equipped with a battery pack. The battery pack can be charged in a non-contacting manner. For example, the cassette can have an inductive charging port associated with the battery. The battery can be recharged via the inductive charging port.

A locking arrangement can include a locking latch, such as a bar or lever. A latch bar can be movable between a locking position and a non-locking position. A latch bar in a locking position can prevent the cassette from being opened. An electronic lock cassette can use a drive device to operate the latch bar. For example, a solenoid or motor can be used to drive the locking latch bar. The drive device can operate off of a battery.

An electronic programmable keypad can be used with an electronic lock of a cassette. The keypad can be programmed to receive multiple cassette access codes. That is, more than one access code or combination may be able to unlock the cassette. Additionally, plural access codes may need to be entered to unlock a cassette. For example, a user ID followed by a password may be needed for gaining entry to the interior of a cassette. Furthermore, codes or IDs entered into a keypad can be recorded (e.g., stored in a memory) by the electronic lock. Dates and times of access (or attempted access) can also be recorded. Thus, an audit trail of cassette access can be recorded.

After a key code is entered (or a sequence of codes) then the cassette can be unlocked. A solenoid or motor can be engaged or driven by a battery. The solenoid can operate to move a latch bar from a locking position to an open position. The cassette can then be opened, such as by opening the cassette lid or cover. The opening, loading, and closing of a cassette can be performed manually. In alternative handling arrangements the functions of opening, loading, and closing of a cassette may be performed by a cassette handling machine.

An electronic locking arrangement can increase security in comparison to mechanical key locks. The use of tangible keys can be eliminated. Each cassette can have a different access code. Thus, loss of a single code would not endanger other cassettes. Furthermore, the access code of a cassette can be changed. For example, a cassette may have its access code changed upon each entry therein. An electronic lock may also be arranged to prevent closure of a cassette until its access code is changed.

Upon closing a cassette cover or lid, the cover may be automatically locked. Mechanical arrangements for automatically locking a latch bar may be used. For example, a latch bar may be spring actuated so that closure of the cover returns the latch bar to a locking position. Alternatively, the latch bar may be driven to a locking position by a drive device. A cassette may also have a visual indicator (e.g., LED display) denoting locked and unlocked conditions. Alternatively, a contactless sensor arrangement (as previously discussed) may be used to sense whether a cassette latch bar is in (or has been moved to) a locking position.

Figure 30:
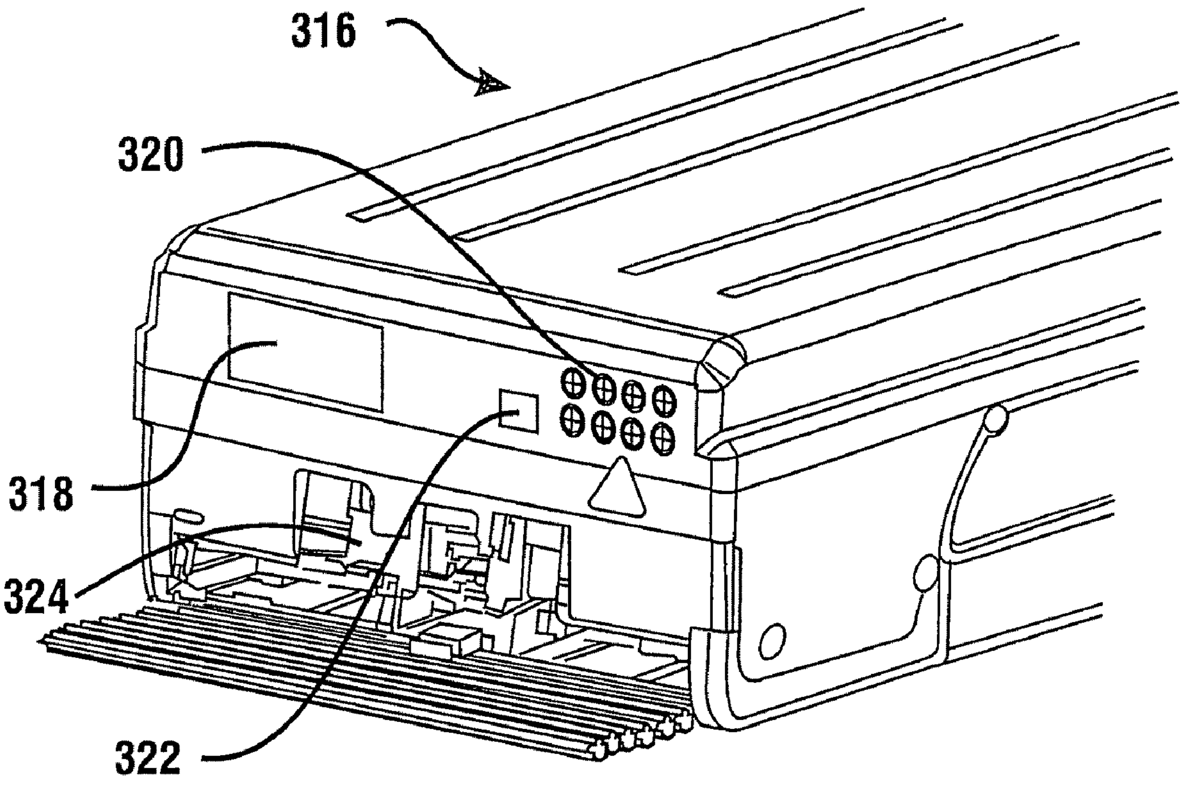
FIG. 30 shows a cassette with an RFID area, an indication button area, and an inductive charging port area.

FIG. 30 shows a rear portion of a cassette 316. The cassette has an RFID area 318, an indication contact button area 320, and an inductive charging port 322. A picker/note engagement area 324 is also shown. Of course other arrangements may be used. For example, the port location and the RFID location may be switched.

Figure 31:
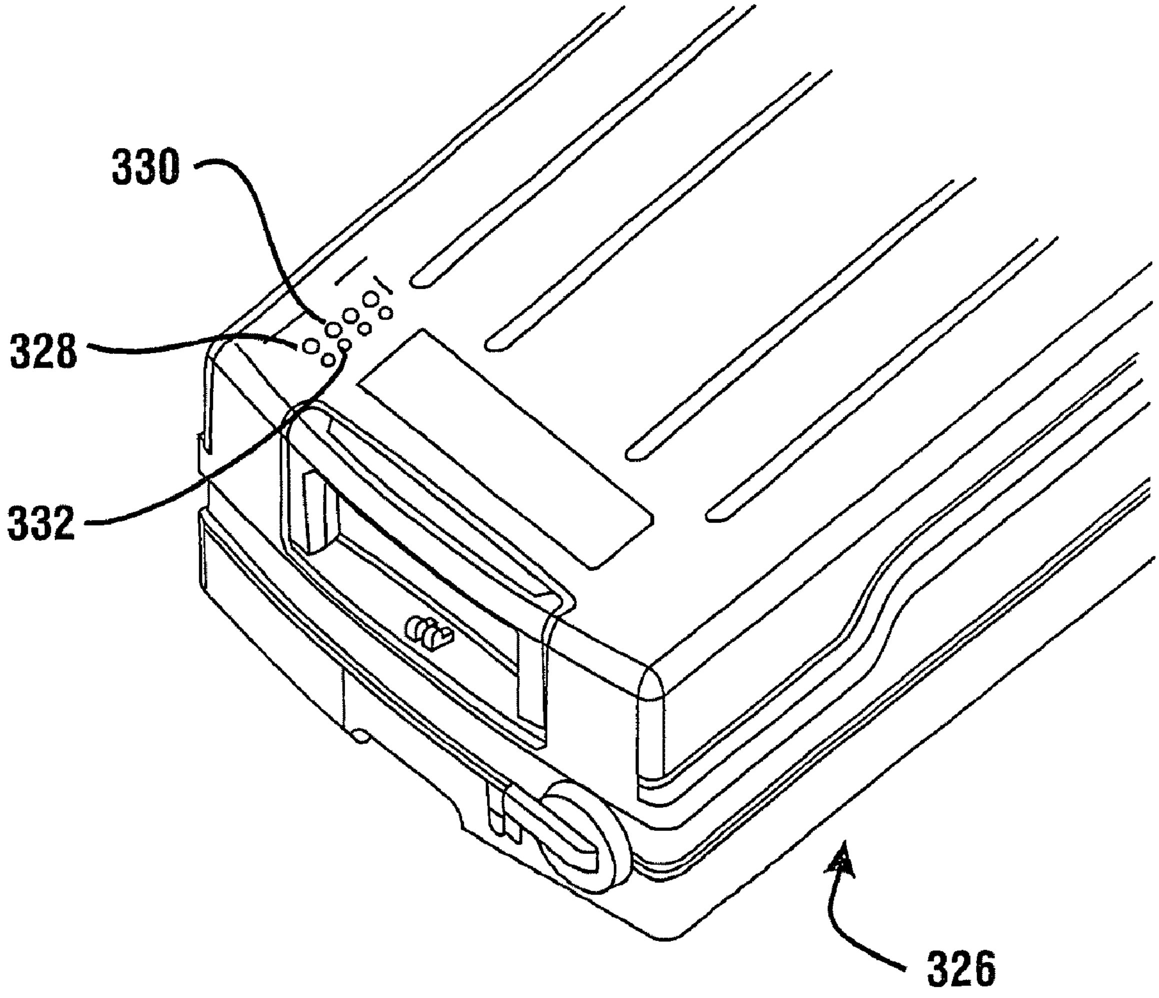
FIG. 31 shows a cassette portion with a programmable keypad area.

FIG. 31 shows a closed cassette 326 with a programmable keypad area 328 on a top portion thereof. The keypad area includes buttons 330 and LEDs 332. The LEDs (i.e., light emitting diodes) can be operative to signal which button or buttons have been pushed or keyed. Of course, input devices other than push buttons may be used. For example, an input device may be operative to sense touch. The keypad is operative to receive an access code to open the cassette.

Figure 32:
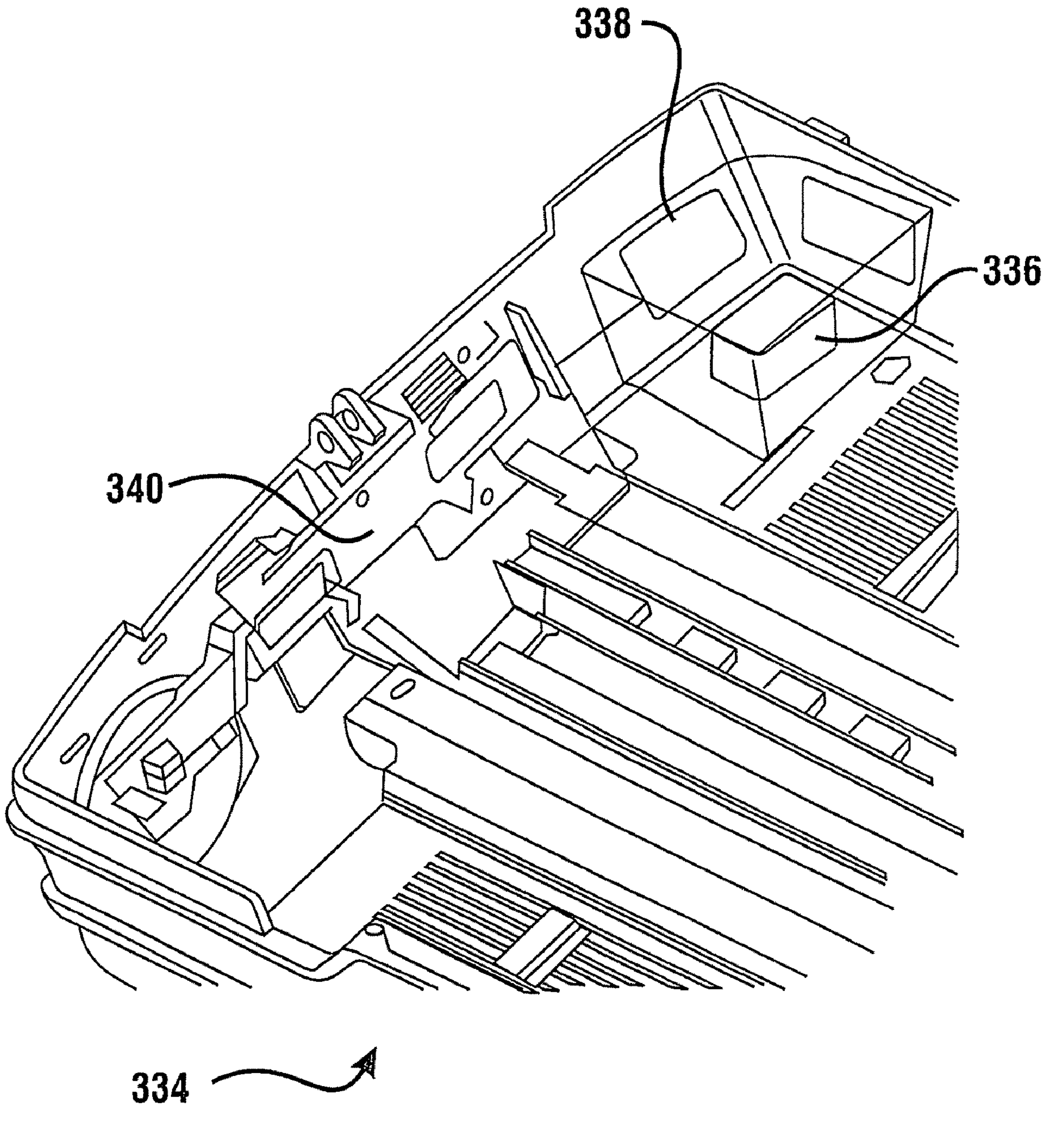
FIG. 32 shows a battery pack in a cassette.

FIG. 32 shows a cassette portion 334 with a battery pack 336, solenoid 338, and a latch bar 340 in operative connection. A keypad area can be externally located adjacent (e.g., above or sideways of) the solenoid and/or battery pack. The solenoid can be initiated by the keypad to drive the latch bar. A processor may also be operatively connected with the keypad and battery. The latch bar may be of a conventional configuration.

Figure 33:
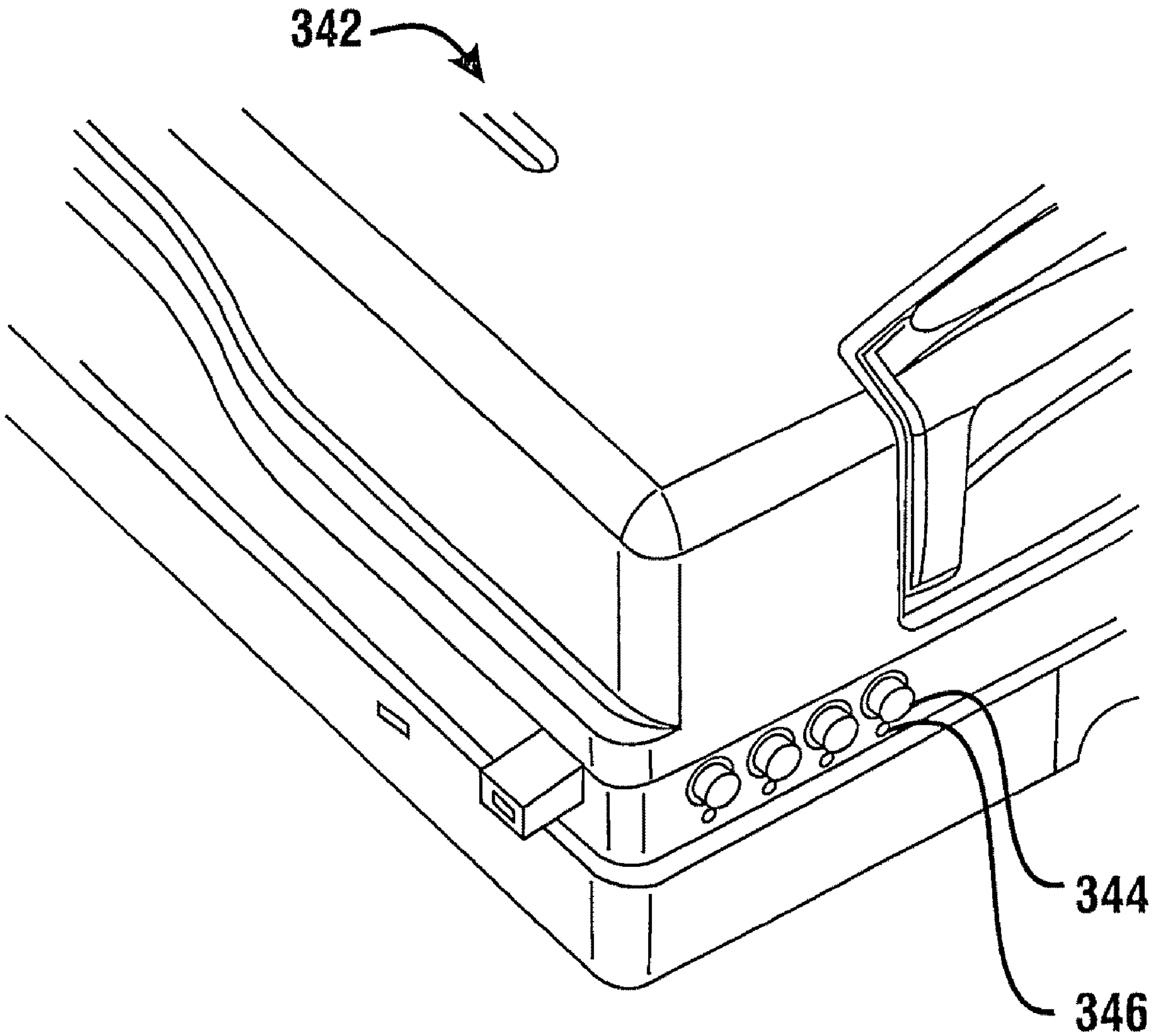
FIG. 33 shows a programmable locking button and LED arrangement.

FIG. 33 shows a cassette 342 with programmable locking buttons 344 and adjacent LEDs 346. The buttons are shown as spaced or separated, axially extending, and of similar cylindrical shape. Each button has a corresponding LED located there beneath. The LEDs are shown as spaced and of similar circular shape. Each of the buttons can be identical. Likewise, each of the LEDs can be identical. The buttons and LEDs extend from a common surface. Although four buttons and four LEDs are shown, it should be understood that a cassette may have greater or fewer numbers thereof.

Figure 34:
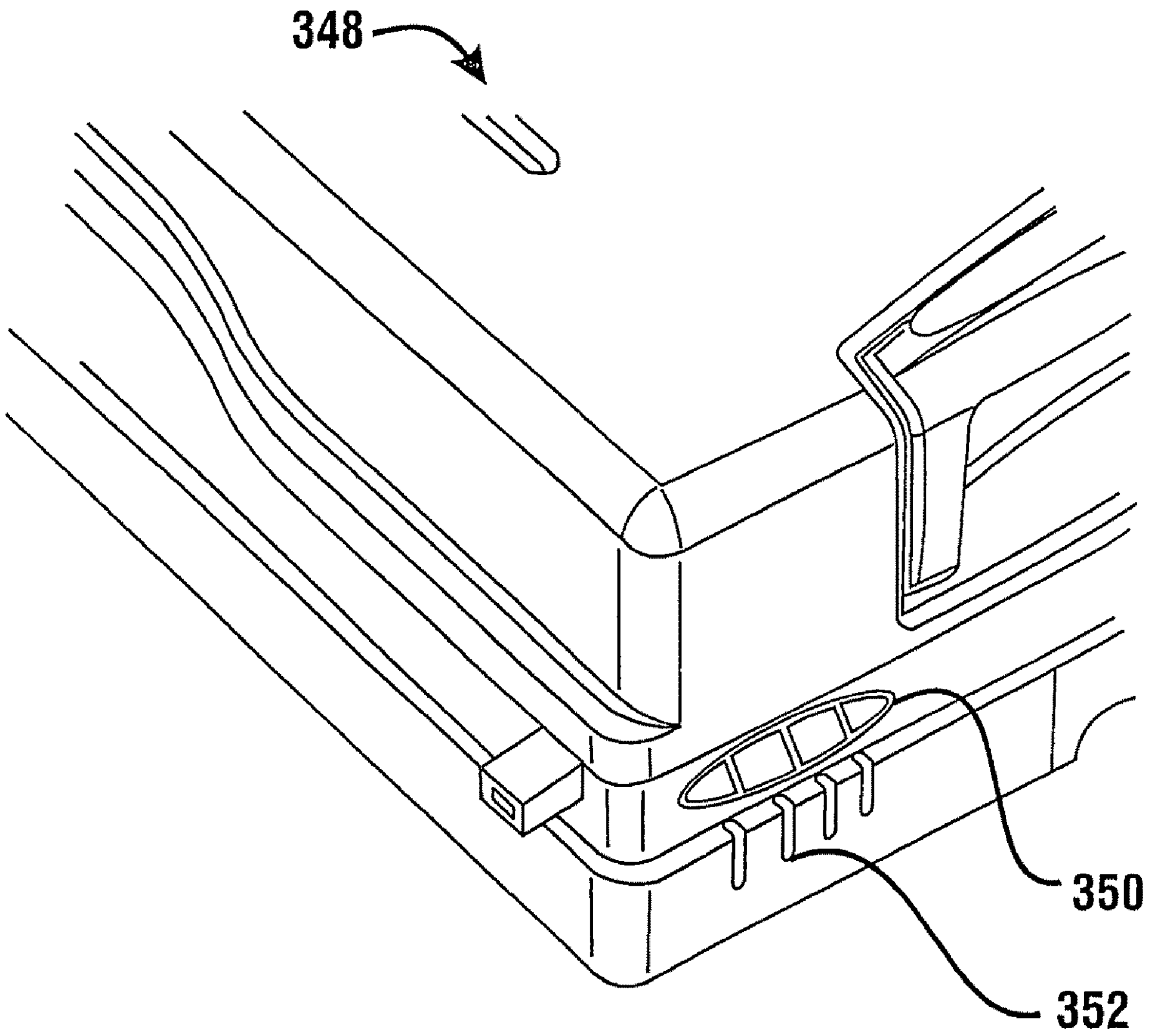
FIG. 34 shows another programmable locking button and LED arrangement.

FIG. 34 also shows a cassette 348 with programmable locking buttons 350 and adjacent LEDs 352. The buttons are shown as dissimilar and closely arranged to an adjacent button. Each button forms part of a segmented oval. The LEDs are shown as spaced, and of similar elongated shape. The buttons and LEDs may extend from, be flush with, or be recessed into a cassette surface. Each LED may also be positioned on adjacent cassette surfaces. For example, a first portion of an elongated LED may axially extend generally perpendicular to a second portion thereof. Thus, an LED may be visible from two different directions, e.g., top and side views.

Figure 35:
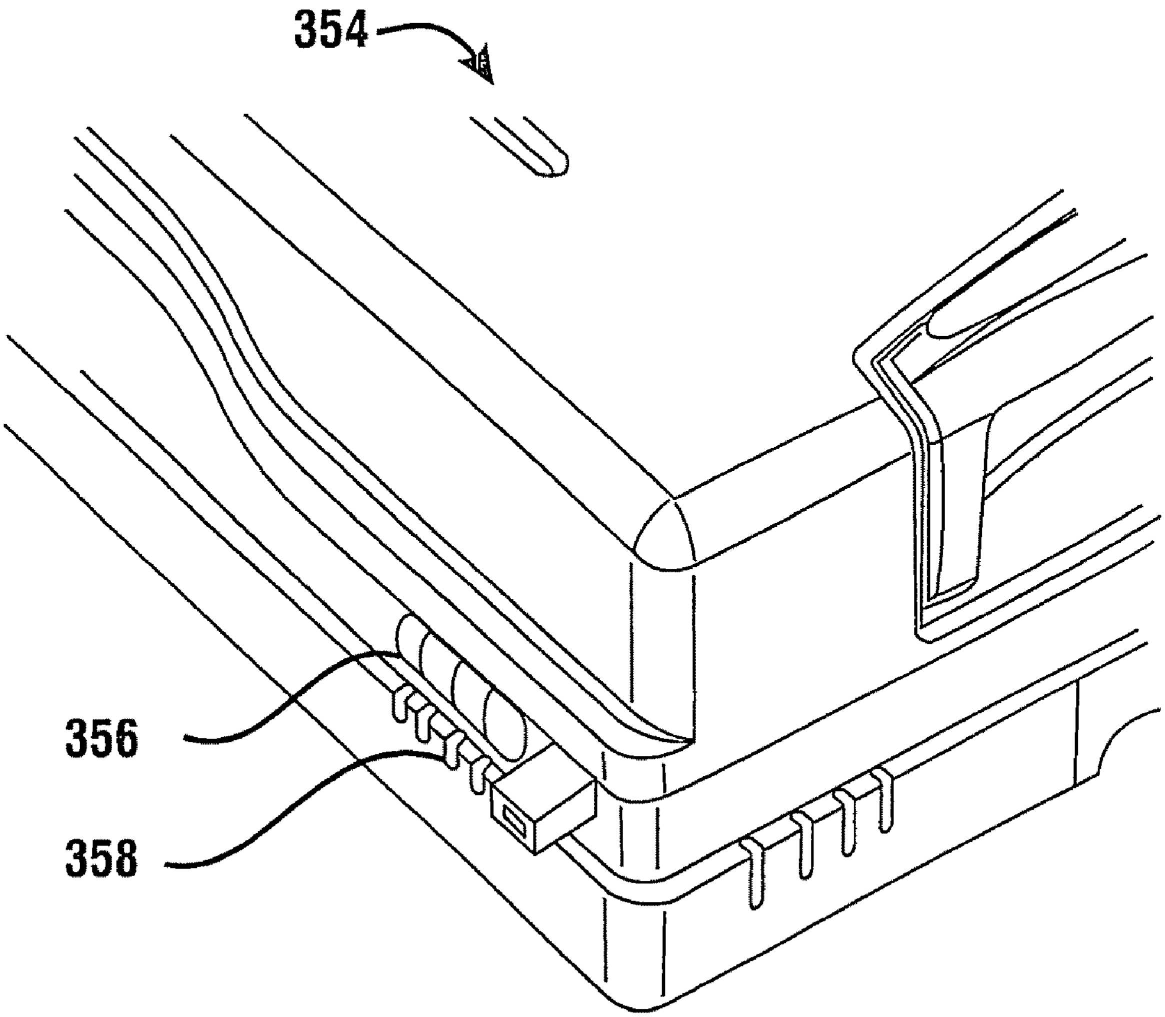
FIG. 35 shows a further programmable locking button and LED arrangement.

FIG. 35 shows a cassette 354 with programmable locking buttons 356 and adjacent LEDs 358. The buttons form a rectangular area with the ends in the elongated direction rounded. In comparison to FIG. 34, the LEDs are shorter in the elongated direction (e.g., have less length) but have a greater width (e.g., larger thickness). The button/LED arrangements of FIGS. 34 and 35 are also positioned at different cassette locations.

Figure 36:
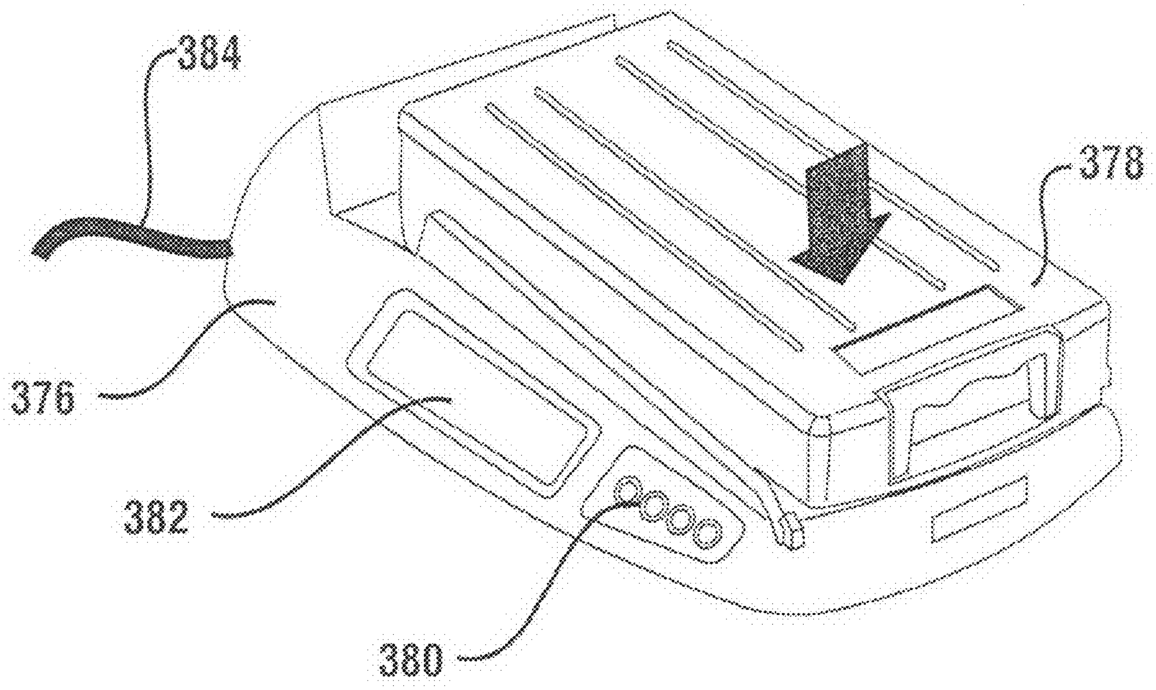
FIG. 36 shows a cassette and tray arrangement.
Figure 37:
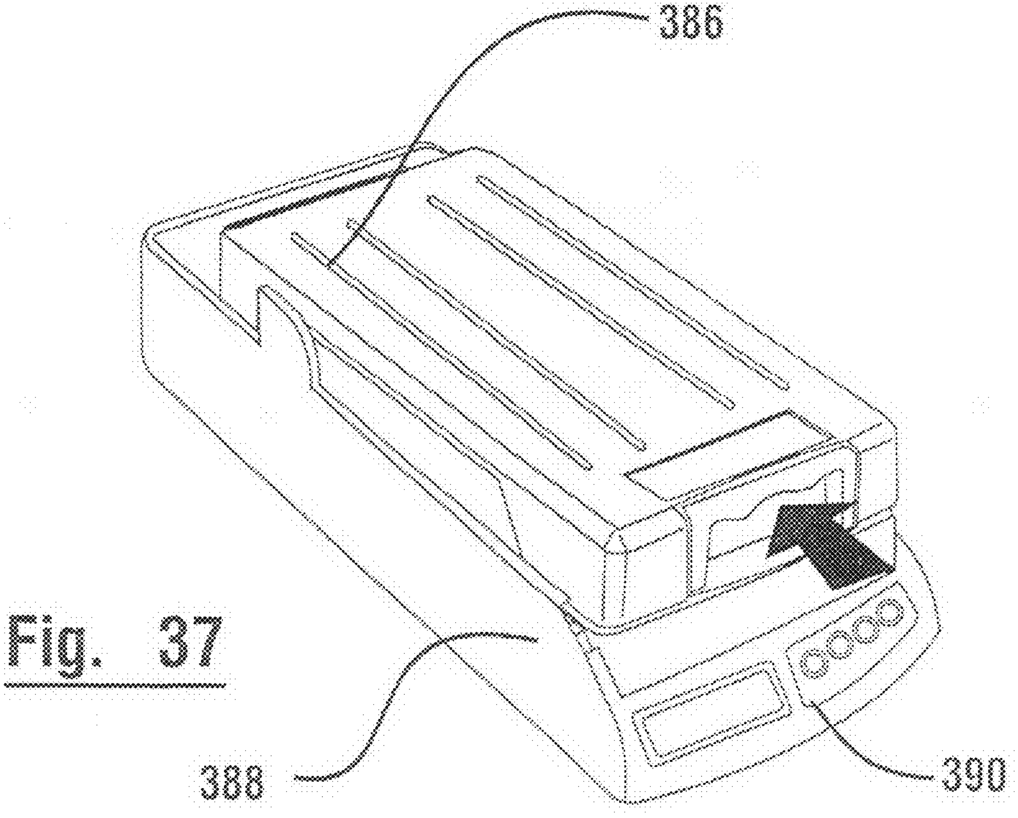
FIG. 37 shows another cassette and tray arrangement.
Figure 38:
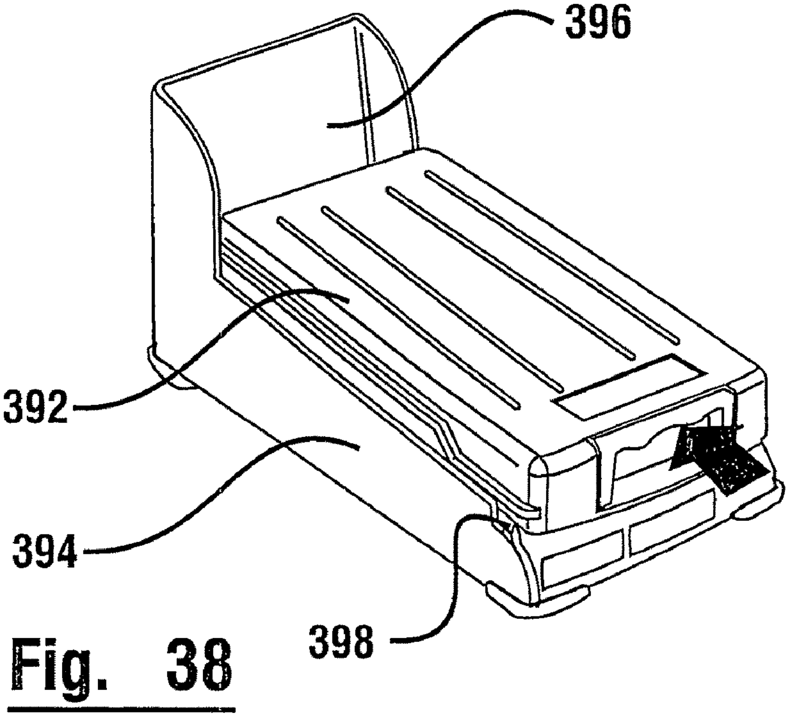
FIG. 38 shows a further cassette and tray arrangement.

FIGS. 36, 37, and 38 show different work station tray (or base) arrangements operative to receive a cassette. A tray can permit service personnel to communicate with a cassette. The communication may be remote. An RFID tag may also be programmed while a cassette is in a tray.

Figure 39:
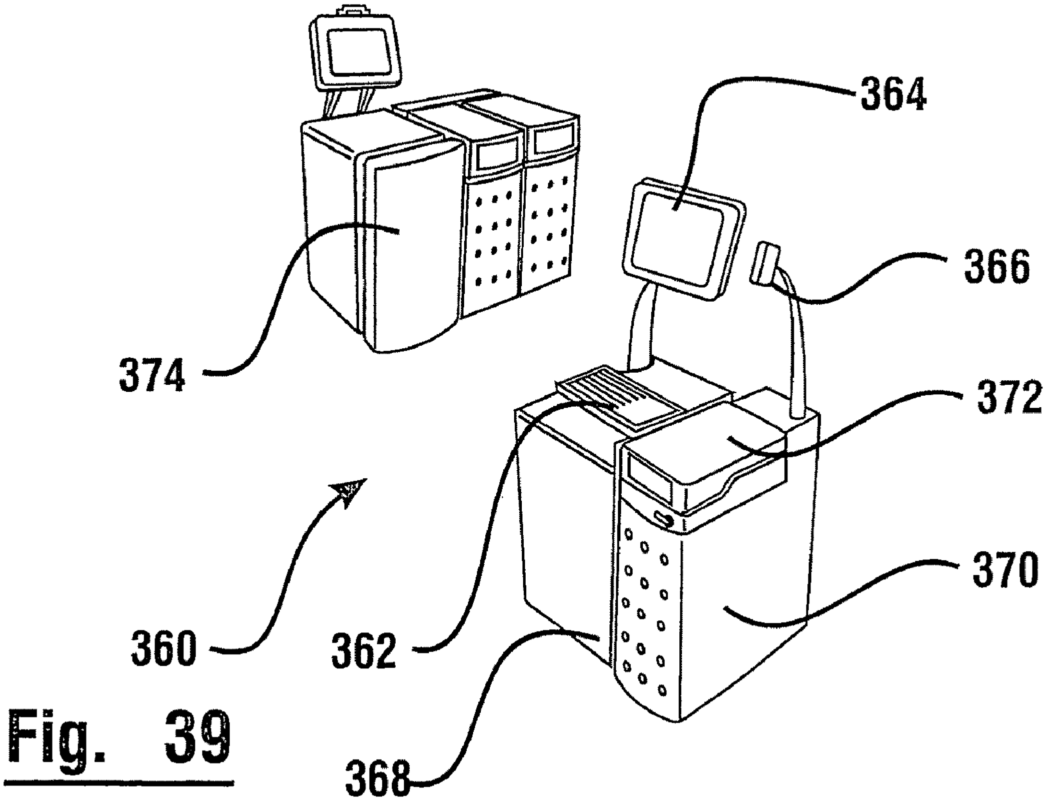
FIG. 39 shows a cassette work station area.

FIG. 39 shows a work station area 360. A work station can include one or more computers and memory storage devices. Cassettes can be serviced at a work station. For example, a cassette can be replenished or have maintenance performed thereon at a work station. An RFID tag of a cassette can also be modified or read at a work station. A keyboard and a display can be used to communicate information between service personnel and an RFID tag. The serial number of a cassette can be read. Information directed to the history of a particular cassette may be displayed. FIG. 39 also shows a work station 370 having a keyboard 362, display screen 364, camera 366, storage area 368, and a cassette 372. The work station area 360 also has another work station 374.

A cassette may be opened at a work station tray. In an alternative embodiment, a tray is operative to remotely communicate with a cassette to unlock the cassette. For example, as an additional layer of security, a cassette may be without an external keypad thereon. Programmable locking buttons can be arranged on the tray. The buttons can be operated to receive an access code to open a cassette. The access code can be operative to trip a solenoid to drive the latch bar to an unlocking position. A tray can also have an LCD panel for displaying cassette content information or information relating to an access code.

FIG. 36 shows a tray 376 in which a cassette 378 may be lowered therein, as demonstrated by the arrow. A cassette in a tray may be partly surrounded on four sides. A cassette may be locked or latched into a tray. FIG. 36 also shows programmable locking buttons 380, an LCD panel 382, and a system port line 384. Alternatively, a base tray may be used in the field (i.e., at an ATM) to service a cassette, instead of at a work station.

FIGS. 37 and 38 show alternative arrangements in which a cassette may be slid into a tray, as demonstrated by the arrows. A cassette in a tray may be partly surrounded on three sides. FIG. 37 shows a cassette 386, a tray 388, and a programmable locking buttons and LED panel 390. FIG. 38 shows a cassette 392, a base 394 having a lid back rest 396, and a locking latch 398.

As previously discussed, media (e.g., currency, coupons, etc.) which is to be inserted into a cassette can vary in dimensions. For example, the length, width, and height of currency notes may vary from one country to another. The sizes of different denomination currency notes may also vary within the same country. However, media needs to be properly arranged within a cassette so that it can be properly removed by a picker mechanism. The size (e.g., height) of a particular type of media may limit its use to a particular sized cassette. Thus, different sized media may require corresponding different sized cassettes. It follows that a large number of different cassette configurations may be needed.

An exemplary embodiment is directed to a cassette that can be used with different types and sizes of media. The total number of cassette configurations can be reduced. Thus, costs can be reduced, parts count can be reduced, and reliability can be improved.

A single cassette of the exemplary embodiment can have different configurations. The cassette can be adjustable to contain different sized media. The cassette can have a rail system. The rail system can have one or more adjacent rails. For example, generally parallel rails may be spaced from each other in a direction generally perpendicular to their axes. The rail system can be adjustable. For example, the height of a rail may be adjustable. That is, a rail may be adjustable in the vertical direction. Hence, the same cassette can be adjusted to hold currency of a first height and currency of a second height.

Figure 40:
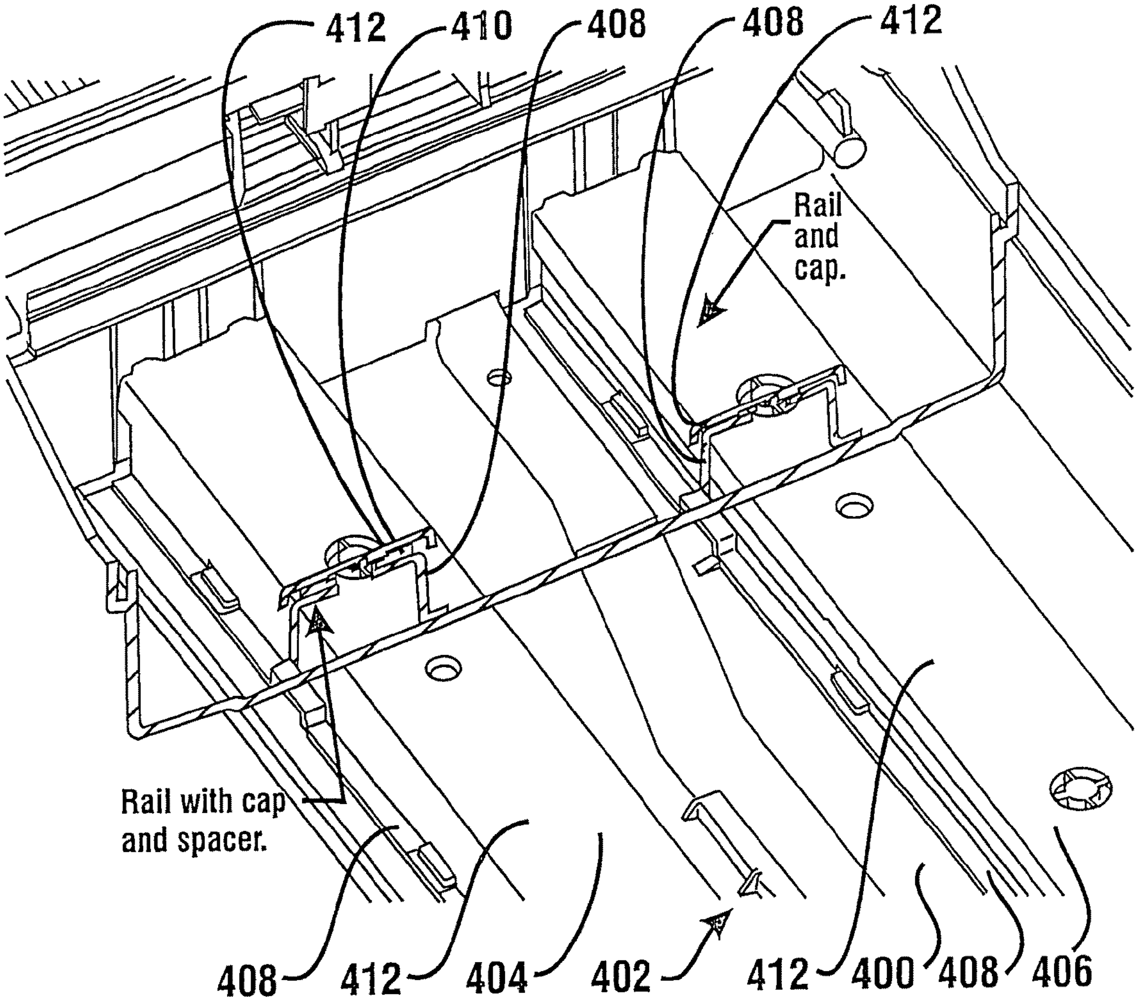
FIG. 40 shows a cassette rail system.

FIG. 40 shows a portion of a cassette lid 400 having a rail system. A rail system can be operatively connected to a cassette lid. FIG. 40 shows a rail system 402 having two rail assemblies 404, 406. However, it should be understood that greater or fewer number of rail assemblies may be used with a cassette. A rail system can be operative to guide, align, direct, engage, position, secure, and/or support media in a cassette. For example, a rail system can be used to prevent media in a stack of media in a cassette from becoming substantially vertically unaligned. That is, a rail system can be used to maintain cassette media in proper position.

A rail assembly can include a rail, cap, and/or spacer. For example, a rail assembly may have only a rail. Another rail assembly may have a rail and a cap (e.g., cover). A further rail assembly may have a rail and a spacer (or spacers) and a cap.

A cap is operative or adapted to be arranged adjacent a rail. A cap can be operatively connected to a rail. A cap can be removably connected to a rail. A cap can be used to extend the (vertically downward) height or distance of a rail assembly. A cap can be arranged to engage the top of media in a cassette. Of course a gap may be left between the media and the cap for play and/or to allow the media to slide (e.g., due to a pusher plate) relative to the cap.

A spacer is operative to be arranged adjacent a rail. A spacer is operative or adapted to be arranged intermediate or between a rail and a cap. A spacer can be operatively connected to both a rail and a cap. A spacer can be removably connected to a rail, or to a cap, or to both a rail and a cap. One or more spacers can be used to extend the (vertical) height of a rail assembly. That is, a rail assembly may have a plurality of spacers removably arranged intermediate a rail and a cap.

A rail can be integrally connected (e.g., fastened or of one-piece) to a cassette lid. A rail may be removably connected to a lid enabling the usage of different sized rails with the same lid. Thus, a rail assembly can be removably connected to a cassette lid.

With a cassette lid in a closed position, a rail assembly may be arranged to engage or abut media in the cassette. For example, a cassette currency note securement arrangement may have a cassette floor portion, currency notes engaging (e.g., resting on) the floor portion, a cap adapted to limit vertical movement of the notes, a spacer connected to the cap, a rail connected to the spacer, and the rail connected to the cassette lid. Of course, a rail assembly may be arranged in other note positioning configurations or combinations. For example, a note securement arrangement may have currency notes resting on a rail assembly.

Respective rails, caps, and spacers can be of different types, materials, shapes, and dimensions. Thus, a large assortment of different rail systems can be arranged in a sole cassette. For example, a rail and a cap may each have a generally U-shaped body with a substantially flat spacer therebetween. Furthermore, a rail/spacer/cap relationship of a first assembly may have a thickness different from a rail/spacer/cap relationship of a second assembly.

FIG. 40 also shows (and in broken lines the outline of) the rail assembly 404 having rail 408, spacer 410, and cap 412. FIG. 40 further shows (and in broken lines the outline of) the rail assembly 406 having rail 408 and cap 412. It should be understood that with equal rail and cap height, then the rail assembly 404 would be adapted to protrude toward a media stack a greater distance than the rail assembly 406.

Figure 41:
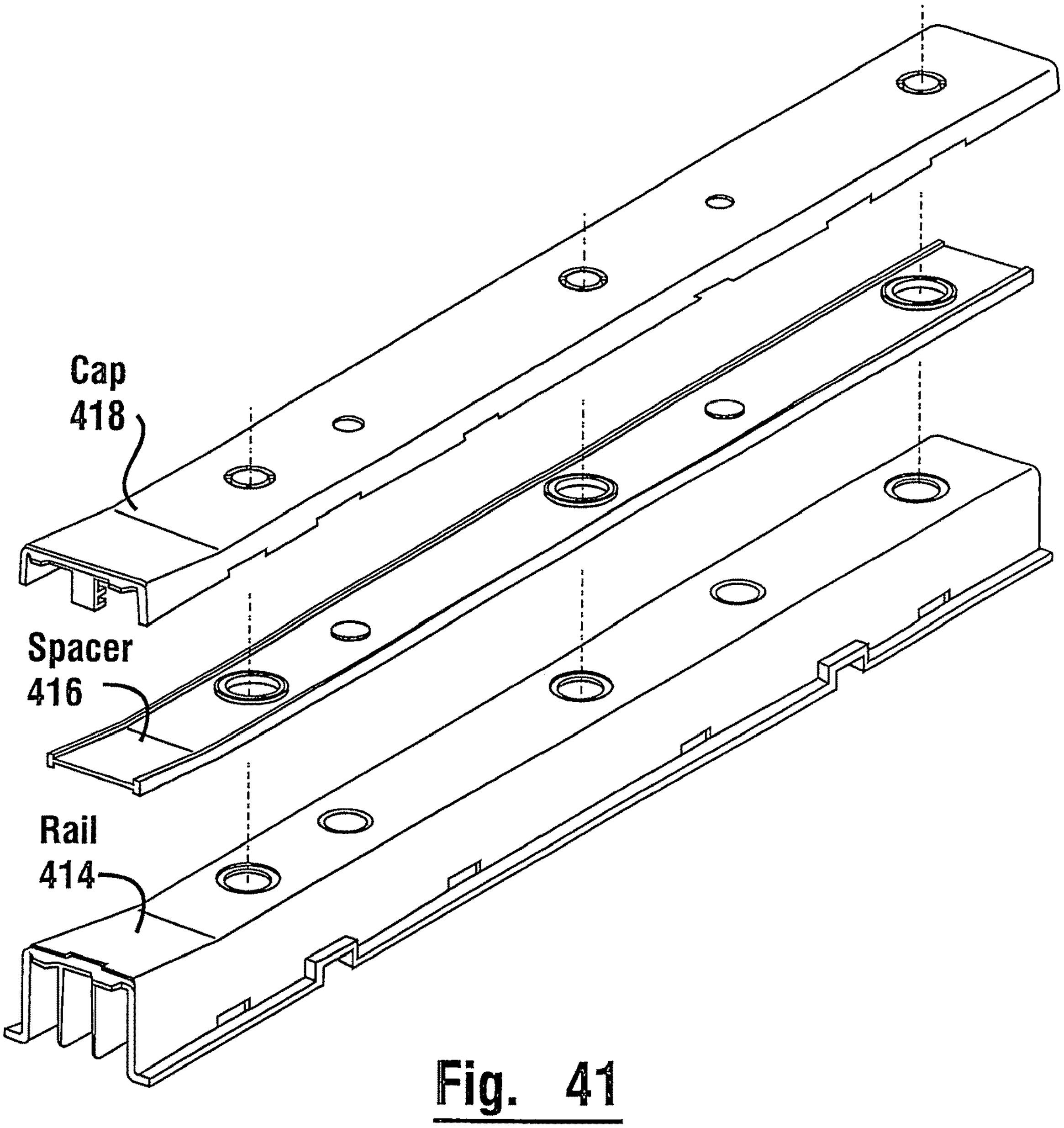
FIG. 41 shows a rail, spacer, and cap of a rail assembly.
Figure 42:
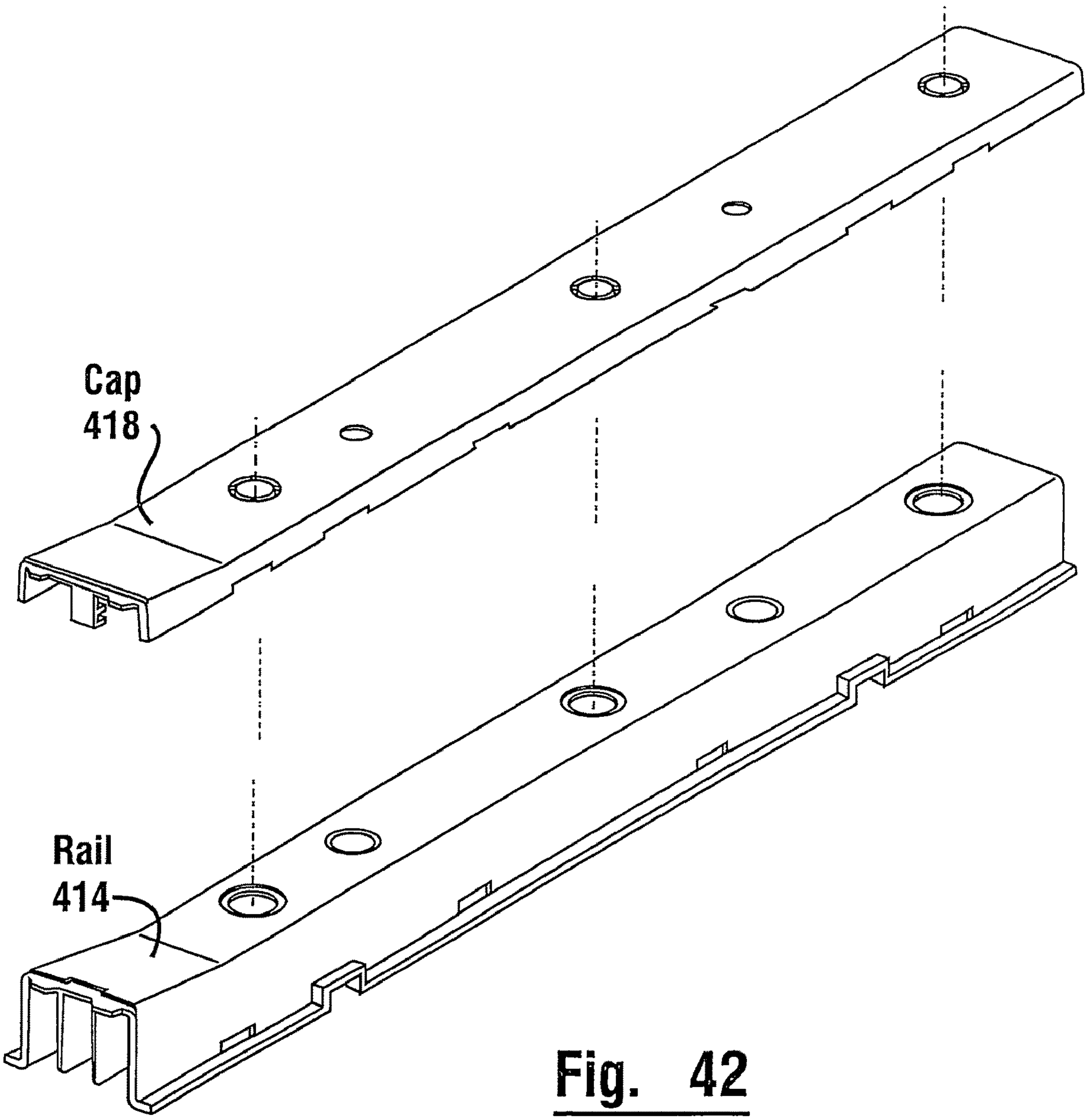
FIG. 42 shows a rail and cap of another rail assembly.

FIG. 41 shows a rail 414, spacer 416, and cap 418 which can be removably fastened together to comprise a rail assembly. FIG. 42 shows that the rail 414 and cap 418 can also be removably fastened together to comprise another rail assembly.

Figure 43:
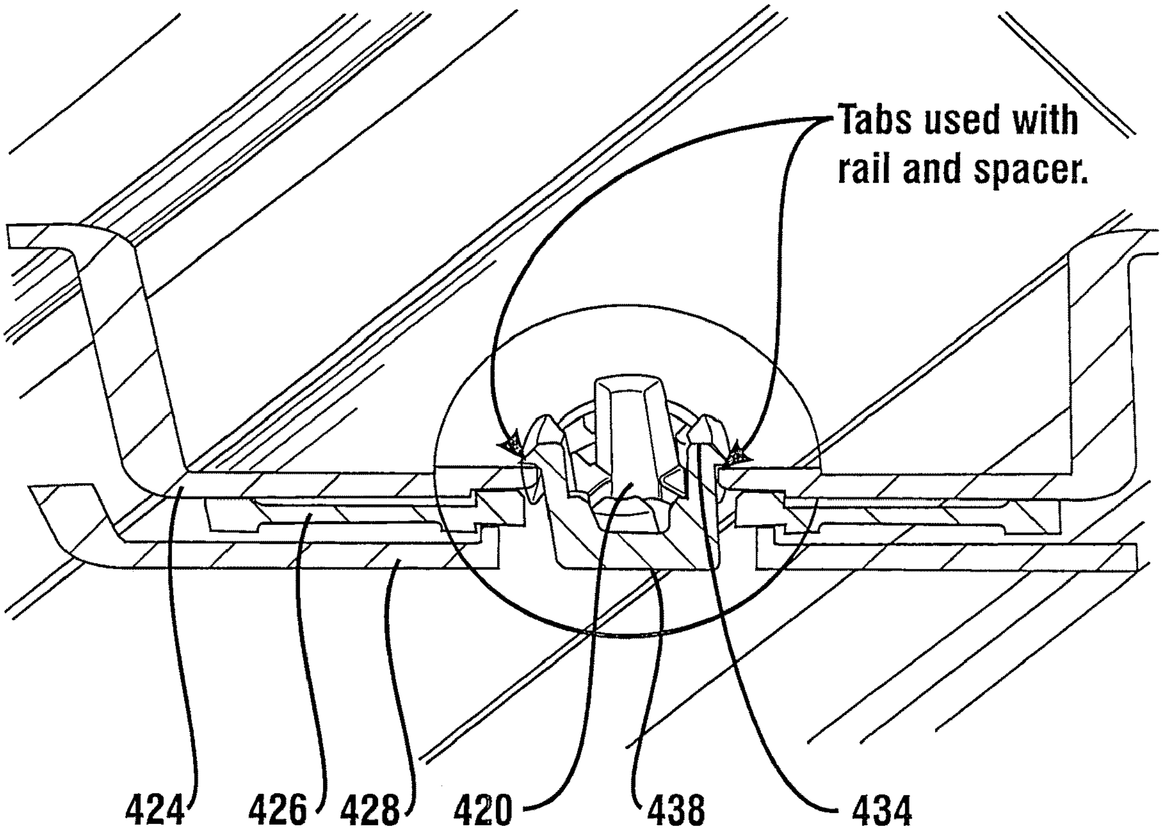
FIG. 43 shows a fastener arrangement securing together a rail, spacer, and cap of a rail assembly.
Figure 44:
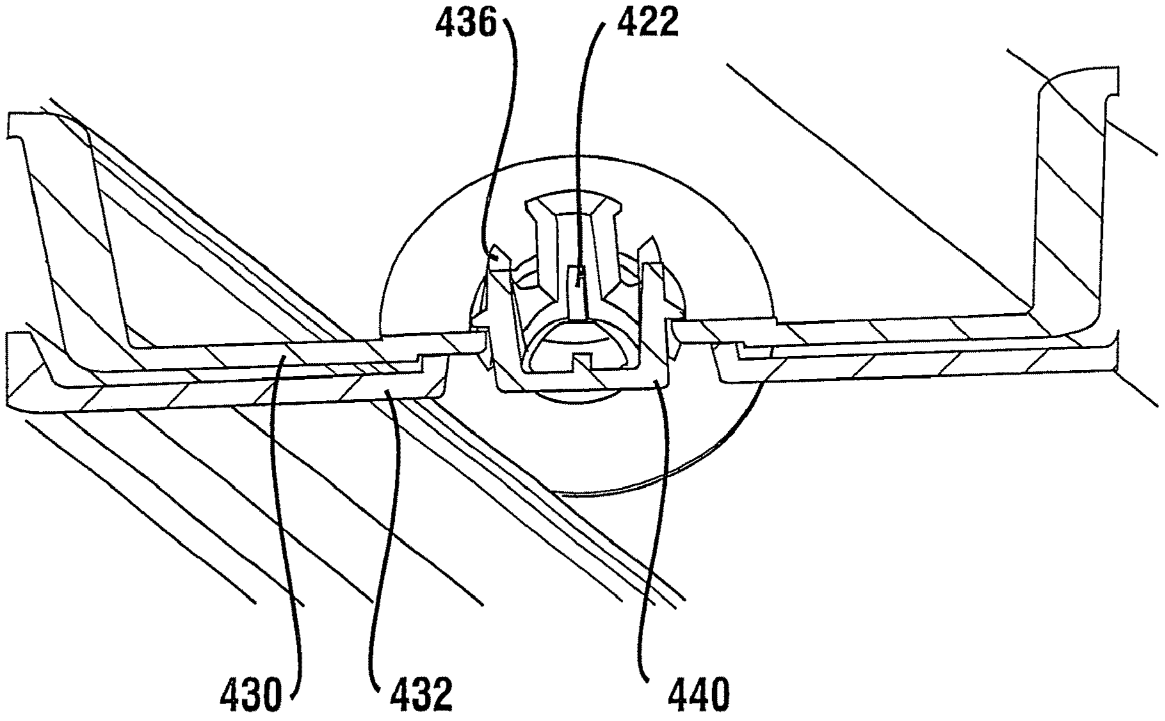
FIG. 44 shows a fastener arrangement securing together a rail and cap of another rail assembly.

A rail assembly may be secured together by a fastener or connector. The fastener may be removable. FIGS. 43 and 44 each show views from the underside of rails. That is, the side of the rail nearest the cassette lid. FIG. 43 shows a fastener 420 adapted to removably secure together rail assembly components (e.g., rail, spacer, and cap). FIG. 44 likewise shows a fastener 422. In FIG. 43 the broken lines represent a rail 424, spacer 426, and cap 428. In FIG. 44 the broken lines represent a rail 430 and a cap 432. Any type of fastener operative to removably connect rail assembly components can be used.

It should also be understood that rail assembly components (e.g., rail, spacer, and cap) may also have corresponding tongue and groove engagements for additional fastening and/or stability. A connection between two rail assembly components may be similar to a LEGO® block type of connection. For example, a spacer may have one or more tongues (or projections) on one side and one or more grooves (or slots) on the opposite side. The tongues of a first spacer could be aligned with the grooves of a second spacer to enable fastening engagement therebetween. Other manners of attachment, connection, or fastening may also be used.

In an exemplary embodiment a fastener may comprise resilient or flexible tabs or fingers (e.g., cantilever tabs). The fastener can be adapted to extend through aligned apertures (or holes or openings) in rail assembly components. The cantilever tabs can snap or expand outwardly into locking relation with the underside of a rail. A fastener may also have a head at an opposite end. The head may be adapted for tool engagement. The head may have a groove or projection to assist in fastener insertion and/or removal. When the fastener is in operative securing or locking position, the head can be flush with or recessed from the surface of a cap.

FIG. 43 shows the fastener 420 with tabs 434 and a head (outline) 438. FIG. 44 shows the fastener 422 with tabs 436 and a head (outline) 440. The engagement arrangement of FIG. 43 has a head to tabs distance longer than that of FIG. 44. This is because the combined thickness of the rail, spacer, and cap of FIG. 43 is greater than the combined thickness of the rail and cap of FIG. 44.

In alternative embodiments a cap may be biased (such as by a spring) toward engagement with a media stack. For example, a spring loaded cap may be in continuous supporting engagement with media.

The ability to create different rail assembly configurations enables the use of a standard or common or universal sized cassette for various sized media stacks. Thus, a universal cassette can be adjusted to fit various sized media. A cassette may be operative to act in a "one size fits all" manner. The same cassette can be reconfigured to hold currency of different sizes.

FIGS. 45-56 show examples of different rail assembly configurations for a universal cassette. The distance between the cassette floor and the cassette lid is the same (i.e., the distance "H") in each of the FIGS. 45-56. A cassette rail system can be configured or adjusted to correspond to media of different heights.

Figure 45:
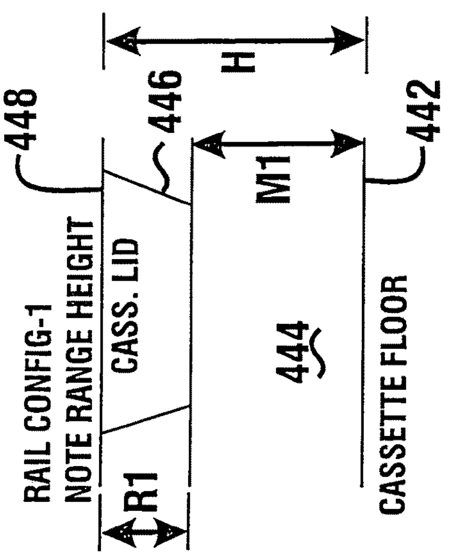
FIGS. 45-56 show examples of different rail assembly configurations for a cassette.

FIG. 45 shows a cassette floor 442, media 444, a rail 446, and a cassette lid 448. The rail assembly comprises only a rail.

Figure 46:
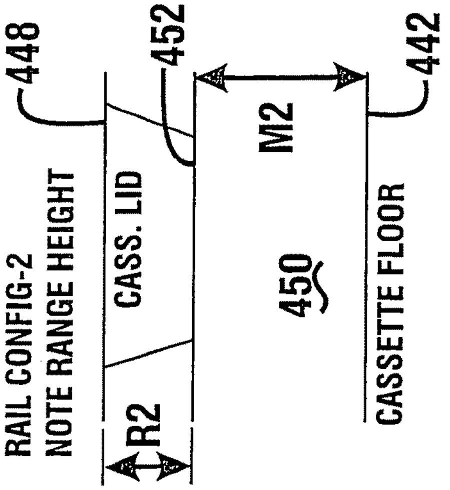

FIG. 46 shows the cassette floor 442, media 450, a rail 452, and the cassette lid 448. The media 450 of FIG. 46 has a height M2 which is less than the height M1 of the media 444 of FIG. 45. Correspondingly, the rail 452 of FIG. 46 has a height R2 which is greater than the height R1 of the rail 446 of FIG. 45.

Figure 47:
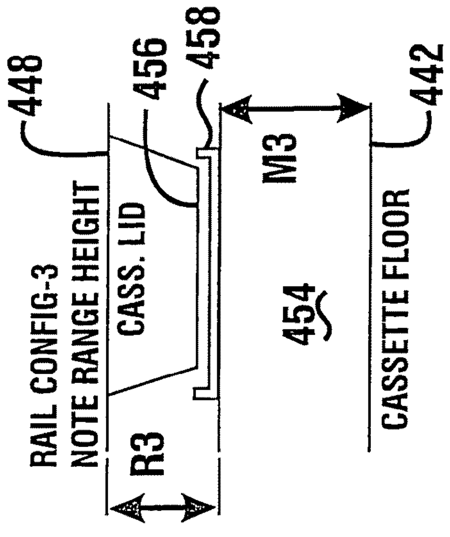
Figure 48:
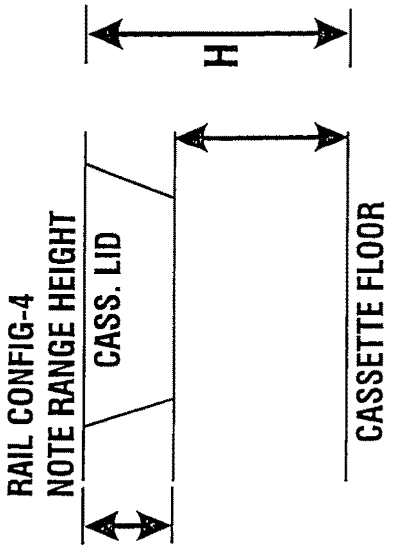
Figure 49:
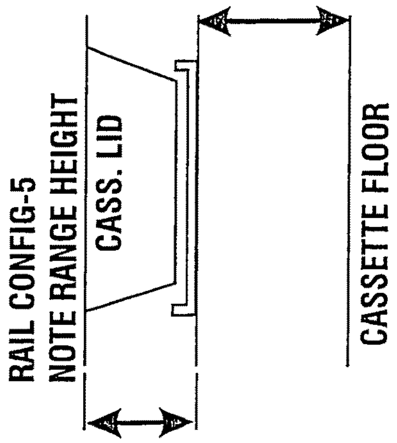
Figure 50:
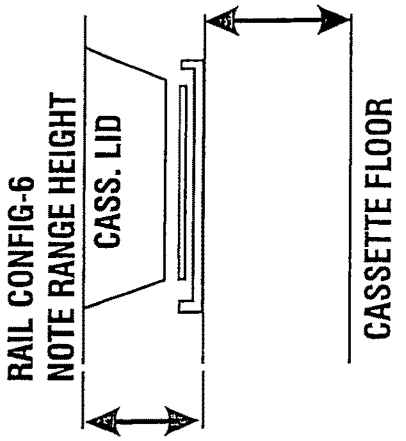
Figure 51:
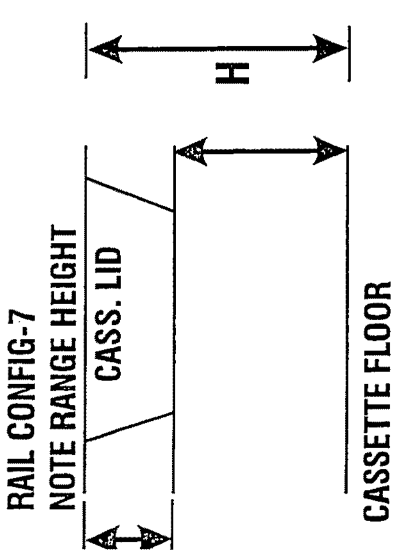
Figure 52:
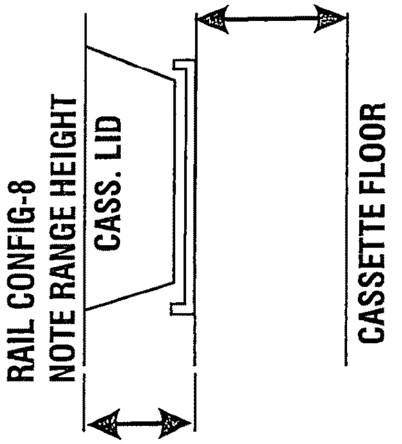
Figure 53:
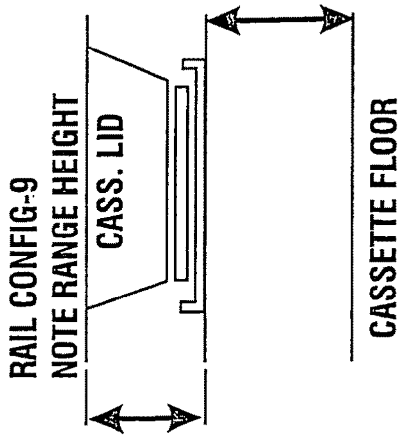

FIG. 47 shows the cassette floor 442, media 454, a rail 456, a cap 458, and the cassette lid 448. In FIG. 47 the media is of a height M3 which is less than the height M2 of the media 450 of FIG. 46. The rail 456 of FIG. 47 has a height R3 which is greater than the height R2 of the rail 452 of FIG. 46. Thus, the cap 458 can be used in the rail assembly of FIG. 47.

Figure 54:
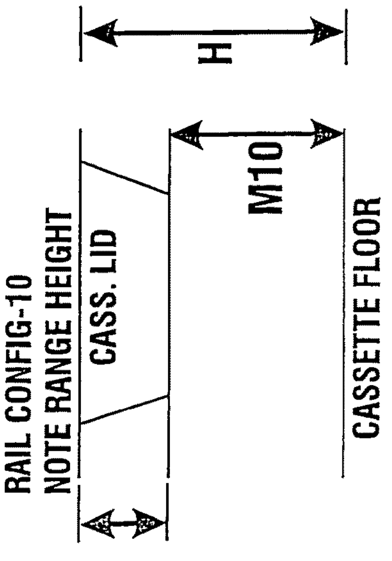
Figure 55:
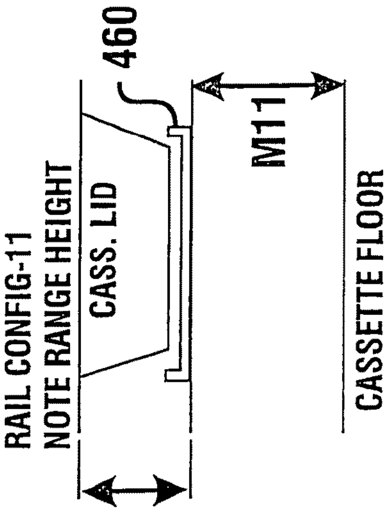
Figure 56:
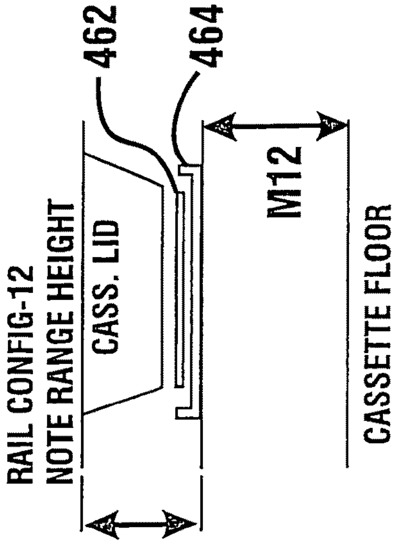

The media height M12 of FIG. 56 is less the media height M11 of FIG. 55 which is less than the media height M10 of FIG. 54. Thus, the rail assembly of FIG. 55 can have a cap 460. Likewise, the rail assembly of FIG. 56 can have both a spacer 462 and a cap 464. The other Figures show additional rail assembly arrangements with the universal cassette.

Of course either the same height rail or rails of differing heights may be used in FIGS. 54-56. Likewise, the same height cap may be used in FIGS. 55-56 or caps of differing heights may be used. That is, the heights of rails, spacers, and caps (and cassette lids) can vary. A rail assembly can be configured responsive to or dependent on the height of media which is to be inserted into the cassette. Of course other universal cassettes can have other lid and floor arrangements. For example, other cassettes may have lids and floors of different sizes and spacings (e.g., heights).

Sometimes a cassette may be overloaded with media. That is, too much media was inserted into a cassette. A media overloaded cassette can lead to problems. For example, note jams, double notes, picking malfunctions, and cassette component wear may be associated with an overloaded cassette.

An exemplary embodiment prevents or reduces the use of a media overloaded (or overstuffed) cassette. In the exemplary embodiment a cassette lid can be prevented from closing if the cassette is overloaded with media.

A member or arm is adapted to be positioned in a cassette adjacent to a media stack. The arm may be resilient. The arm can be operative to bend or flex or tilt responsive to a force caused by the media stack of an overloaded cassette. That is, the arm can be operative to flex responsive to an overloaded media stack. For example, the arm can bend away from the stack.

The arm may be a separate component attached to the cassette. Alternatively, the arm may be attached to or integral (e.g., of one-piece) with a cassette component, such as a media stack push plate. The arm may be a push plate.

A push plate can have a resilient arm or portion extending from a base of the plate. That is, the plate can have a (lower) base portion thicker (and stronger) than an upper (tip) portion as taken in a cross-section view thereof. For example, a push plate taken in cross-section can have a pyramidal shape. Of course other shapes may also be used. The base can be secured in the cassette to resist movement by an overloaded media stack. However, the upper portion (e.g., resilient arm) can be operative to flex due to an overloaded media stack. A pusher plate component (e.g., a pusher plate tip) can flex away from the overloaded media due to the media pressing there against.

A cassette lid can have a rib (engagement portion, projection, tab, ledge, or catch) attached thereto or integral (e.g., of one-piece) therewith. The lid rib can be adapted to engage (or abut) a resilient arm when the arm is in a flexed (and engageable) position or condition. The engagement can prevent the lid from proceeding toward a closed position. Thus, the engagement can prevent the lid from being closed. With the lid prevented from closure, the individual loading or handling the cassette can access the situation and remove excess media. The arrangement can provide overstuff prevention or protection. With the arm in a non-flexed condition, the lid is operative to be closed.

Figure 57A:
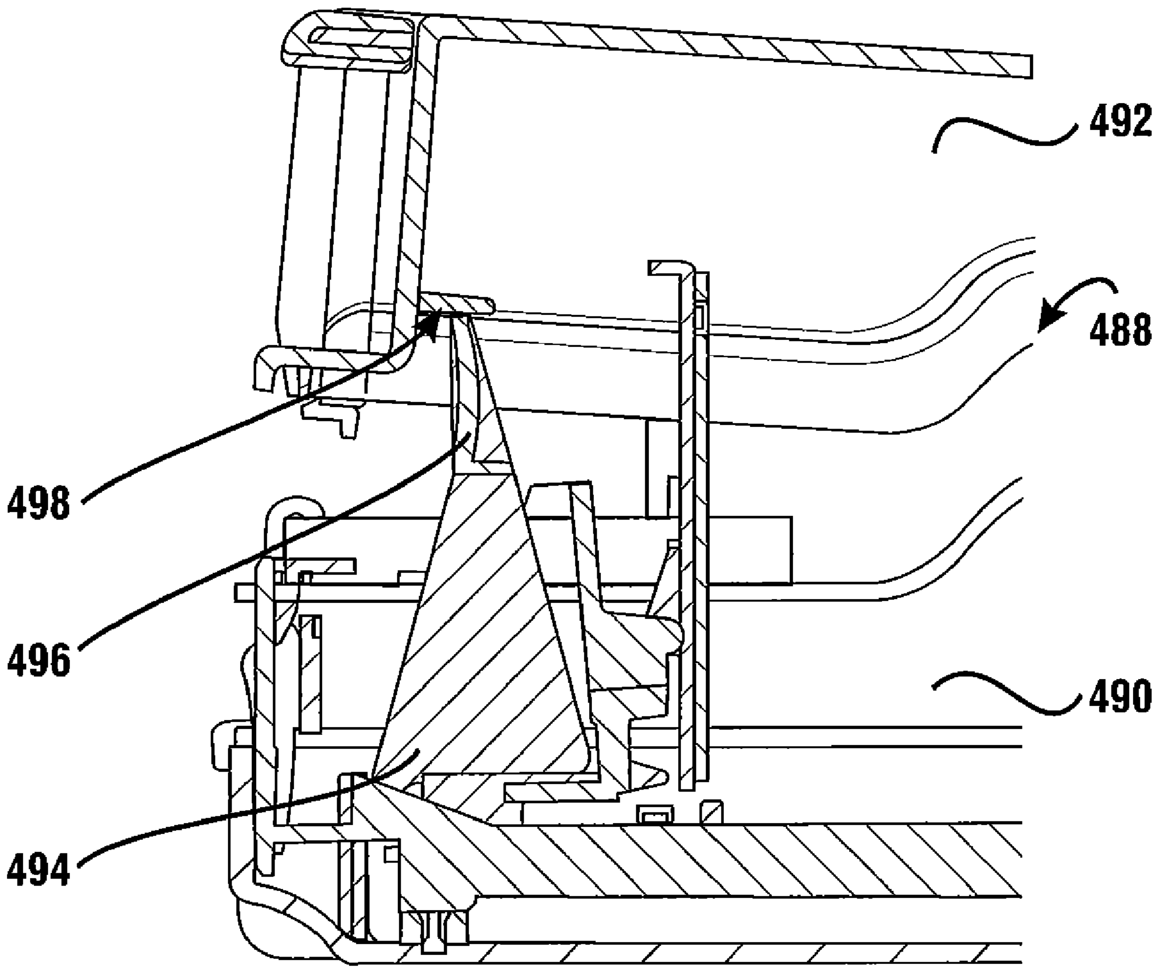
FIG. 57 shows a media stack overload prevention arrangement for a cassette.

FIG. 57 shows a media overload prevention arrangement 488 for a cassette. The arrangement includes a cassette 490, cassette lid 492, push plate base 494 and flexible arm portion 496, and lid rib 498. The arm portion 496 is shown in a flex condition operative to cause engaging contact with the rib 498. Thus, the lid 492 is prevented from closing.

In an alternative cassette overstuff protection arrangement, the contact of a rib with a flexed arm can cause generation of an output signal. For example, the contact can trip an electrical switch. An LED on the cassette or another type of output can be used to indicate to a loader an overloaded condition. In a further alternative arrangement the bending of the flex arm can be detected to cause generation of an output signal. For example, stress may be measurable in the arm. At a predetermined stress level an LED may be operated. The tripping of an LED may also cause information relating to the overloading (e.g., a loader's identification) to be stored in memory, such as in cassette memory.

An exemplary embodiment is directed to increasing security for media cassettes, such as currency cassettes in an automated banking machine. A security system may use biometric features in granting access to the currency cassettes.

In an exemplary embodiment, authorization and/or identification of an individual attempting to service an automated banking machine may be determined based on the individual's appearance and/or voice characteristics and/or other biometric information and/or card information. Hence, biometric features may be used to identify the individual. The use of biometric features may be accomplished in the manner disclosed in U.S. Pat. No. 6,023,688, the disclosure of which is fully incorporated herein by reference. For example, a security system may be configured to identify a user by a biometric input such as facial recognition, thumbprint, iris scan, voice (speech) recognition, or other characteristics or combinations thereof.

A security system may use facial recognition software in combination with a camera. The camera can be mounted to an ATM. The camera may also be used for customers using the ATM for transactions, or the camera may be separate therefrom. The camera can be an internally mounted USB video camera. The camera can be used to capture an image (e.g., digital image) of an individual (or entity) attempting to service or replenish the machine.

An ATM can have a locally held database of individuals or access to a network accessed database of individuals. The individuals in the database are authorized to be granted access to a security container (or area) of the machine. The security container can have the currency cassettes located therein. Facial recognition software can be used to determine or check (e.g., verify or confirm or deny) whether an individual exists in an authorized database. A processor can operate the software to compare a captured image to images in a database. The captured image may be represented by data corresponding thereto. Likewise, the database may include data representative of images. Thus, a comparison may include comparing data which corresponds to images. The software may be operated locally or through the network. That is, the comparison may be carried out locally or at a remote location.

Access to the security container may be controlled by a lock control device. The lock control device can be operatively connected with the facial recognition software. The lock control device can be changed to open the security container under different scenarios. For example, if an individual is positively identified by the facial recognition software, then the lock control device may permit direct access to (e.g., unlock or open) the security container.

Additionally, an ATM may have a dual combination lock (e.g., an electronic lock) associated with the security container. The lock control device may be arranged or programmed to receive two correct combinations or codes in order for the dual combination electronic lock to be placed in an unlocked condition. If an individual is positively identified the facial recognition software, then the lock control device may be arranged to automatically bypass the need for one of the two combinations. That is, a recognized individual may only need to enter only one combination. In such a scenario the servicing individual would still need to enter the second combination in order to gain access to the security container. Nevertheless, such an access arrangement may facilitate or quicken access to a secure area. Thus, the time necessary to replenish an ATM may be reduced.

In addition, a facial image of the service personnel can be recorded and stored in a database by the software application. Other data, such as the time and date of the granted access, may also be stored along with the facial image. The facial image may also be uploaded to a centralized database for centralized storage. A centralized processor may perform auditing functions using the approved facial image. For example, an authorized database may be updated with the approved facial image. That is, the approved new facial image may be used to replace an outdated facial image.

The serial number of a particular cassette may also be recorded and stored in the database along with the facial image of the individual having access to (or servicing) the particular cassette. Likewise, each cassette may have associated therewith a memory data file. A cassette data file may also include the serial number, the facial image data of individuals who were granted access thereto, and the dates and times.

The ability to capture image data of an individual servicing a particular cassette, and the ability to store the image data in correlated relation with other information (e.g., cassette serial number) can further facilitate cassette tracking and minimize fraud. The arrangement permits cradle to grave tracking of a cassette regarding access thereto. The information relating to cassette access can be combined with additional security tracking information (e.g., as previously discussed) regarding a particular cassette. The ability to track and use information for particular cassettes may be accomplished in the manner disclosed in U.S. Pat. No. 6,109,522, the disclosure of which is fully incorporated herein by reference. Furthermore, a system for image capture and delivery functions may be of the type disclosed in U.S. application Ser. No. 09/991,748 filed Nov. 23, 2001, the disclosure of which is fully incorporated herein by reference. The system may include a Diebold AccuTrack™ digital video arrangement which is commercially available from Diebold, Incorporated, the assignee of the present invention.

Furthermore, with an ATM having a dual combination electronic lock, a person not entered in an authorized database can be required to enter both combinations to gain access. A record of such access by unauthorized persons can also be made. The record may include an image of the person along with the time and date, and the unrecognized combination.

A security system can be arranged so that only a small population of approved and registered service personnel can gain immediate access to a security container of an ATM. To further increase security, facially-recognized personnel may be required to also enter a correct combination to gain security container access. To increase security even further, facially-recognized personnel may be required to also correctly enter plural combinations to gain access to a security container. Other biometric features may also be required prior to granting access.

Other access arrangements may also be used. For example, requiring service personnel to provide a combination also allows the service personnel the opportunity to signal a silent alarm. The alarm may be tripped upon entry of a predetermined combination code or alarm password. Of course, a non-combination trip device may also be used.

Also, if the facial recognition software does not recognize an individual attempting to gain access to an automated banking machine (and/or an improper combination is entered), then a silent alarm could be tripped. The facial image of the non-recognized individual may also be stored in a database along with the date and time.

The security arrangement can also provide the ability to track access to a security container. For example, the individual granted access, along with the time and date, can be stored in a data file for future reference. Of course other data may also be stored in the data file, such as the amount of time that the individual had the security container open.

Alternative security systems may use facial recognition (and/or other biometric related) software for other applications. For example, a security system may be arranged for a cassette work station. For example, the camera 366 at the work station 370 of FIG. 39 may be used in capturing a digital image of an individual attempting to service or replenish a currency cassette. The image can be compared to an authorized database (as previously discussed) in determining whether the individual should be permitted access to the cassette interior.

In an exemplary embodiment a media dispenser (or some other component) of an automated banking machine may include a reject bin. The reject bin may comprise a specialized cassette or canister. The specialized cassette is operative to receive and store therein both diverted and retracted media. Diverted media (e.g., currency or notes or bills) can be that which was determined to have some type of problem (e.g., an unacceptable media condition) by the automated banking machine and is not to be presented to a customer (e.g., unpresentable media). Retracted media can be that which was presented to a customer of the automated banking machine but for some reason was not taken by the customer.

The specialized cassette (which may be referred herein as a reject cassette or a divert/retract cassette or a divert cassette) can have more than one compartment for media storage. The compartments can be separated by one or more partitions. Thus, diverted notes can be stored separately from retracted notes. A divert cassette can be inserted into an automated banking machine (e.g., ATM) in an empty condition (e.g., the compartments devoid of media).

Both diverted notes and the retracted notes can enter a divert cassette through a common media receiving opening of the divert cassette. A partition (e.g., compartment guide) is operative to direct or guide media (e.g., notes) to different respective compartments (e.g., media storage areas) as the media enters the divert cassette. A partition can be actuated by a lever or cam associated with the divert cassette. Movement of a partition can be controlled by a machine controller, such as an ATM computer. The machine controller can be operative to keep a record of the notes placed in each compartment. The machine controller can also be operative to correlate retracted notes to a specific user account. Other information (e.g., date, time, transaction number, etc.) concerning storage of notes in a divert cassette can also be stored by the machine controller in memory.

In an exemplary embodiment a divert cassette has two compartments or storage areas separated by a partition. In a first position (e.g., closed position) of the partition, the divert cassette is operative to receive diverted currency notes. For example, a diverted note may have been unidentifiable or detected as a double bill. The machine is operative to store diverted notes in a divert storage area of the divert/retract cassette.

In a second position (e.g., open position) of the partition, the divert cassette is operative to receive retracted currency notes. For example, a note or stack of notes presented to a customer may be retracted by the machine after a predetermined time period. The machine is operative to store retracted notes in a retract storage area of the divert/retract cassette. Thus, a divert/retract cassette can have dual note storage areas separated by a movable partition (or separator).

The separation of note storage areas prevents the mixing of retracted and diverted notes. The note separating arrangement of a divert cassette allows for enhanced reconciling of notes in daily transactions. For example, an allegation by an ATM user as not having received notes during a transaction can be confirmed or denied by reviewing the notes held in the retract storage area. The comparison can be accomplished with a reduction in note handling, e.g., without involving diverted notes. Thus, the resolving of transaction discrepancies can be simplified. The separation of notes can also be used in detecting a malfunctioning machine or component thereof.

The partition can be moved between open and closed positions by movement of a lever (or cam). The lever can be operatively connected to a drive link which in turn is operatively connected to the partition. The lever can be actuated by a drive mechanism in a note dispenser of a machine. The drive mechanism can be operative to engage and move the lever to correspondingly move the partition. A conventional drive mechanism can be used for driving a lever. For example, a drive mechanism may include a drive motor or cylinder or solenoid. In a partition drive arrangement a motor may cause the lever to pivot or rotate which results in movement of the partition. In another partition drive arrangement a cylinder may cause a cam to move in a sliding direction (e.g., axially or horizontally) which also results in movement of the partition. A machine controller can be operative to operate a drive mechanism to move the lever or cam. Thus, a machine controller can be operative to control movement of a partition to keep diverted and retracted notes separated from each other in the same storage container or device.

A separator, such as a plate or sheet (which may be flexible), may also be used to separate note storage areas or compartments. The separator can be fixed or movable. The partition may include the separator. A separator may be attached to the partition. The separator may be flexible and/or retractable. For example, a partition component may be able to pivot relative to a separator. Also, a partition portion may be able to slide relative to a separator and be guided by the separator. A partition can have a separator attached thereto or integral (e.g., of one-piece) therewith.

A separator can be generally horizontally positioned at a vertical level to vertically separate upper and lower compartments. The divert compartment can be an upper compartment (e.g., above the separator) and the retract compartment can be a lower compartment (e.g., below the separator). Of course, it should be understood that the assigned divert and retract compartments may be switched. Additionally, compartments may have guides to assist in guiding, directing, positioning, and/or maintaining media placed therein.

An alternative arrangement may have a separator arranged in a generally vertical position to horizontally separate adjacent compartments (e.g., front and rear compartments). Adjacent compartments may also be offset by different angles. It should also be understood that a divert cassette can have a divert storage area and a retract storage area of different sizes. For example, a retract storage area may be of a larger size than a divert storage area in order to receive retracted stacks of notes (in comparison to individual notes which may be placed in a divert storage area).

Figure 58:
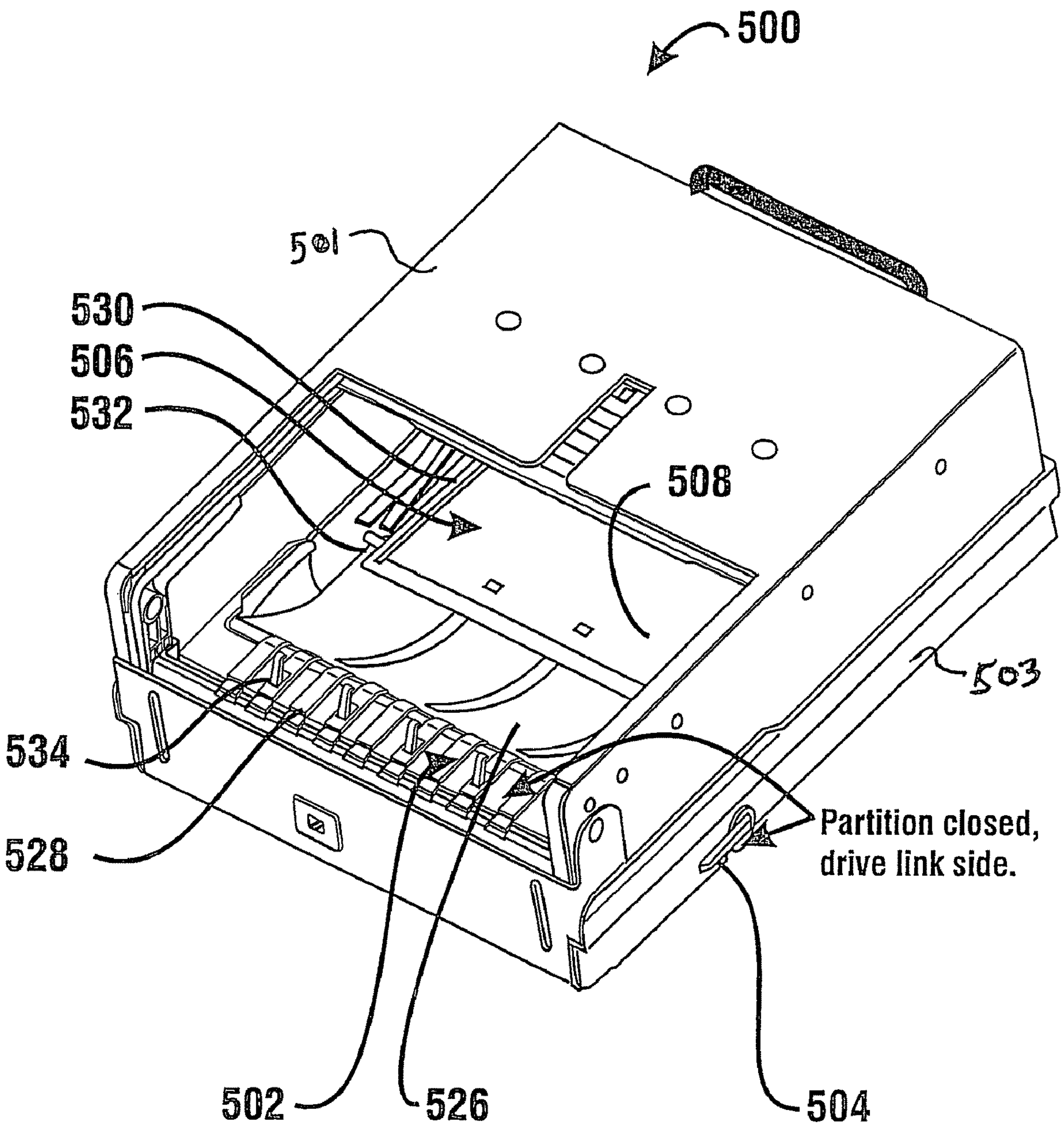
FIG. 58 shows a divert cassette with a partition in a first position.

FIG. 58 shows a divert cassette 500 including a body portion 501 and a lid portion 503. The lid 503 is pivotally connected to the body 501. The divert cassette 500 can comprise metal and/or plastic materials. The plastic material can comprise a polymer. For example, the divert cassette 500 can have a molded (one-piece) body 501 and/or a molded (one-piece) lid 503. Both the body 501 and lid 503 can be molded of flexible polycarbonate materials.

In FIG. 58 the lid 503 is shown having an attached partition 502 therein in a closed position. A partition lever 504 is also shown in a closed (e.g., horizontal) position. The partition lever can be on an outboard drive link side of the divert cassette. Diverted notes can be stored in a divert storage area 506. The partition 502 includes a compartment separator 508, arms 512, flexible guide 526, and bridge 528. The arms are integral with the bridge 528. A first end of the guide is pivotally connected to the arms adjacent the bridge. A second end of the guide is slidably attached to the separator. The separator has one or more slots 530 which permit tabs 532 of guide 526 to slide relative thereto in engaging relationship.

Figure 59:
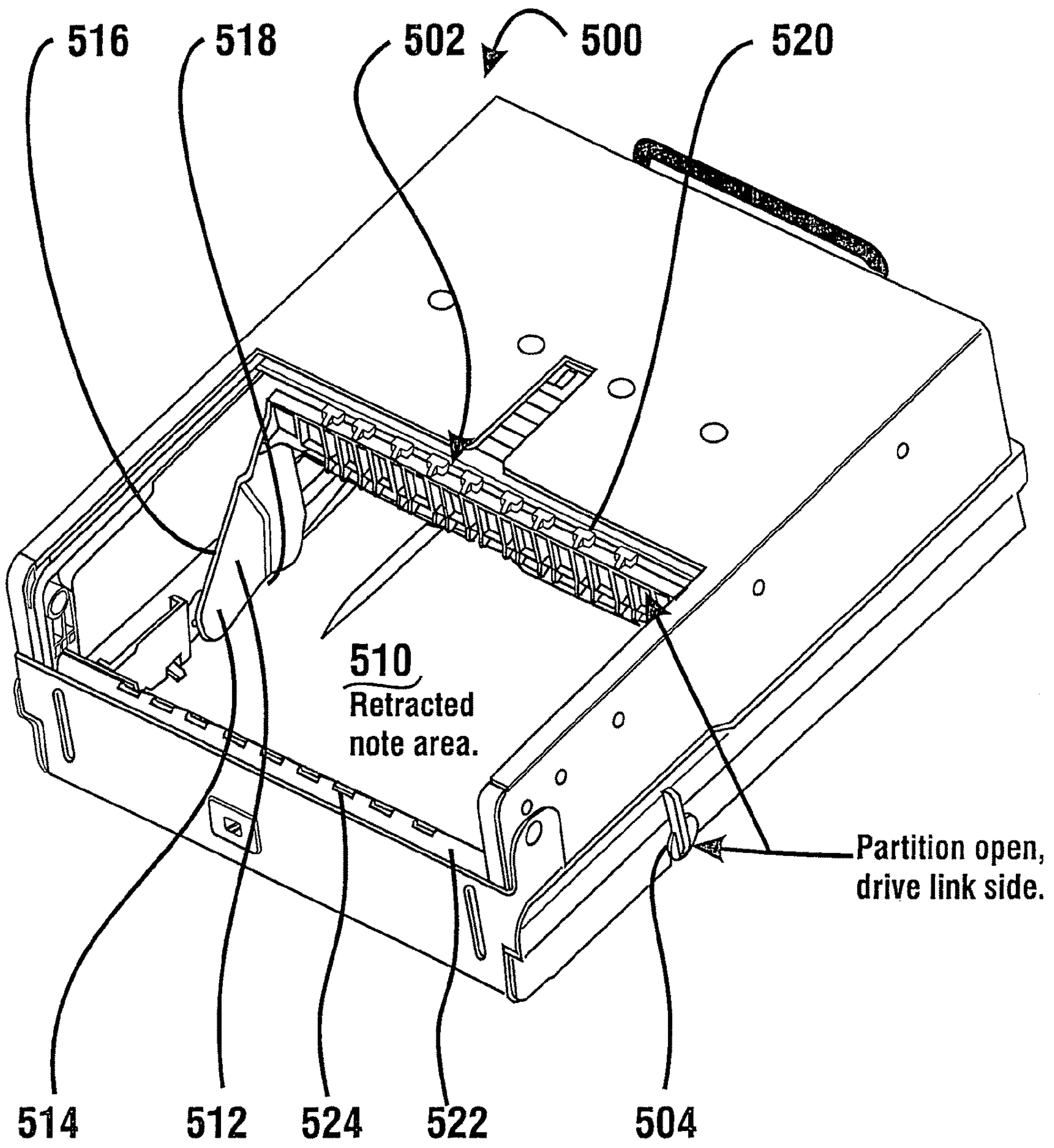
FIG. 59 shows the divert cassette of FIG. 58 with the partition in a second position.

FIG. 59 shows the divert cassette 500 with the partition 502 in an open position. Retracted notes can be stored in a retract storage area 510. The partition lever 504 is shown in its open (e.g., vertical) position.

The lever and a partition arm are connected or linked together about a common axis, such as the axis of an elongated connecting member (e.g., rod or shaft). For example, a common shaft can connect the lever to a partition arm 512. Alternatively, the lever may be integral with an arm. Pivotable rotation of the lever 504 about its axis is operative to axially rotate the arm (connected to the lever). The arms are connected via the bridge. The partition guide is connected to the bridge. Thus, pivotable rotation of the lever is operative to pivot the partition 502 between open and closed positions.

The partition arms can be of a shape (e.g., generally triangular) which assists in support of the partition in both open and closed positions. For example, an arm may have a first edge 516 on one engaging side thereof and a second edge 518 on an opposite engaging side thereof. The arm edges may be arranged to engage a portion (or component) of the cassette to assist in supporting the partition in a respective open or closed position.

The partition bridge 528 has comblike teeth (or forks) 520 which are operative to engage a cassette wall 522 adjacent the media receiving opening of the cassette. The cassette wall has grooves (or slots) 524 which are adapted to receive the teeth in engaging relationship. The slots can guide the teeth (and thus the partition bridge) into a proper open position. The teeth/groove arrangement can be operative to provide alignment or support or stability to the partition bridge when the partition is in the open position. The partition bridge 528 also has teeth (or projections) 534 which are adapted to engage a cassette wall portion when the partition is in a closed position. The projections 534 can likewise provide alignment or support or stability to the partition bridge when the partition is in the closed position.

In the embodiment of FIGS. 58 and 59 the partition separator 508 is fixed. Partition arms 512 are operative to pivot about an axis 514 (which can be the same axis on which the lever pivots) to move the partition toward an open position. Movement of the partition bridge toward an open position causes the partition guide to flex. The guide tab moves in the separator slot to permit the guide to slide (in a direction away from the media receiving opening) underneath the separator. For reasons of clarity the separator is not shown in FIG. 59. However, note FIG. 63.

The lever 504 can be driven to pivot. Pivoting of the lever causes pivoting of the partition arms and the bridge. Pivoting of the bridge causes the partition to move from a closed position (FIG. 58) to an open position (FIG. 59). Contrarily, the lever can also be pivoted to cause pivoting of the partition from the open position (i.e., retracted media receiving position) to the closed position (i.e., diverted media receiving position).

In an exemplary operation an automated banking machine (e.g, an ATM) has at least one divert cassette therein. The divert cassette includes dual storage compartments. The divert cassette includes a diverted currency storage area and a retracted currency storage area. The machine is operative to perform a financial transaction for a customer. For example, the machine may perform a cash withdrawal transaction. The machine can determine whether currency has an acceptable or an unacceptable currency condition. The determination may include a conventional currency bill sensor or reader (e.g., double bill sensor, dirty bill sensor, counterfeit bill sensor, torn bill sensor, unreadable bill sensor, currency validator and/or counterfeit detector, or a combination thereof). Unacceptable currency can be diverted and transported for storage in the diverted media storage area of the divert cassette. Acceptable currency can be transported through the machine and presented to a customer (e.g., the customer requesting the cash withdrawal transaction) at a customer accessible currency outlet. However, the machine is operative to retract any remaining currency previously presented to a customer after a predetermined time period. The machine is operative to transport the retracted currency for storage in the retracted currency storage area of the divert cassette.

Of course, it should be understood that other partition and/or lever drive arrangements may be used. For example, a partition may be operatively connected or linked to a slidable drive cam. A drive arrangement may operate to slide the cam to cause corresponding movement (e.g., pivoting) of the partition. Thus, other drive arrangements, such as a sliding drive arrangement, may be used for moving a partition. Additionally, electrical, magnetic, screw, and mechanical actuation arrangements (or combinations thereof) for driving a partition may also be used.

A machine (e.g., ATM) controller may also be able to determine when a compartment of a divert cassette is full or needs servicing. A divert cassette may have a media-high indicator which is operative to be actuated when the media reaches a predetermined level. A media-high indicator may operate on the principles similar to those of a media-low indicator, which have been previously discussed. A divert cassette may have a media-high indicator for each storage compartment. A machine can be operative to read an actuated or tripped media-high indicator. Upon determining a divert cassette compartment as full, one or more signals may be sent from the machine to authorized personnel indicative of the divert cassette condition or status. Alternatively, if one compartment of a dual compartment cassette is determined as full, then the machine controller may be programmed to feed both divert and retract notes to the other non full compartment. It should also be understood that the embodiments (e.g., RFID tags, etc.) discussed in this application relating to media cassettes may also be applied to divert cassettes.

In an exemplary embodiment a divert cassette includes a self-locking arrangement for a partition. A divert cassette partition can be automatically locked during removal from a machine and unlocked while inserted a machine. A resilient member (e.g., spring) and lock can be located on an outboard non-drive link side of a divert cassette. That is, the spring and lock can be located on a cassette side opposite to the drive link side (which can have the previously discussed partition lever). Thus, the partition drive and the partition locking arrangement can be situated such that they do not interfere with each other.

Figure 60:
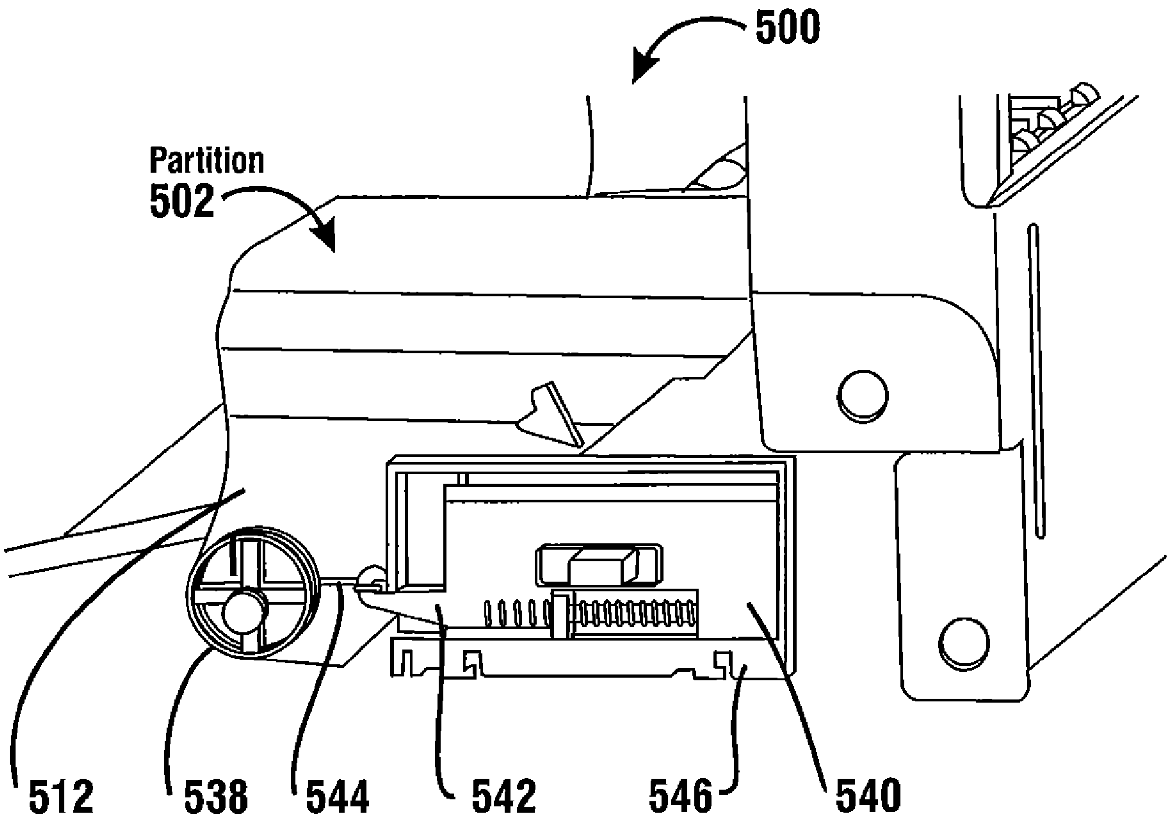
FIG. 60 shows a divert cassette with a self-locking partition.

FIG. 60 shows the divert cassette 500 in which the partition 502 is self-locking. In FIG. 60 the partition is in a locked condition. The shown divert cassette of FIG. 60 can be situated outside of an automated banking machine (or partly positioned in the machine). A partition locking arrangement includes a spring (e.g., torsion spring) 538 and a lock 540. The torsion spring is operatively connected to the partition 502. For example, the torsion spring can be operatively engaged or connected to a partition arm 512. An arm 542 of the lock 540 can be engaged with an arm 544 of the torsion spring 538. Both the lock arm and the torsion spring arm each have an end engaging portion or hook, which may be J-shaped or U-shaped. The lock arm is slidable in a lock housing 546. The lock arm has a hook 552. The torsion spring arm has a hook

554. A locking engagement of the lock arm and spring arm prevents a closed partition from moving to an open position. Other arrangements may use a device other than a torsion spring, such as a projection operative to engage the lock arm hook.

Figure 61:
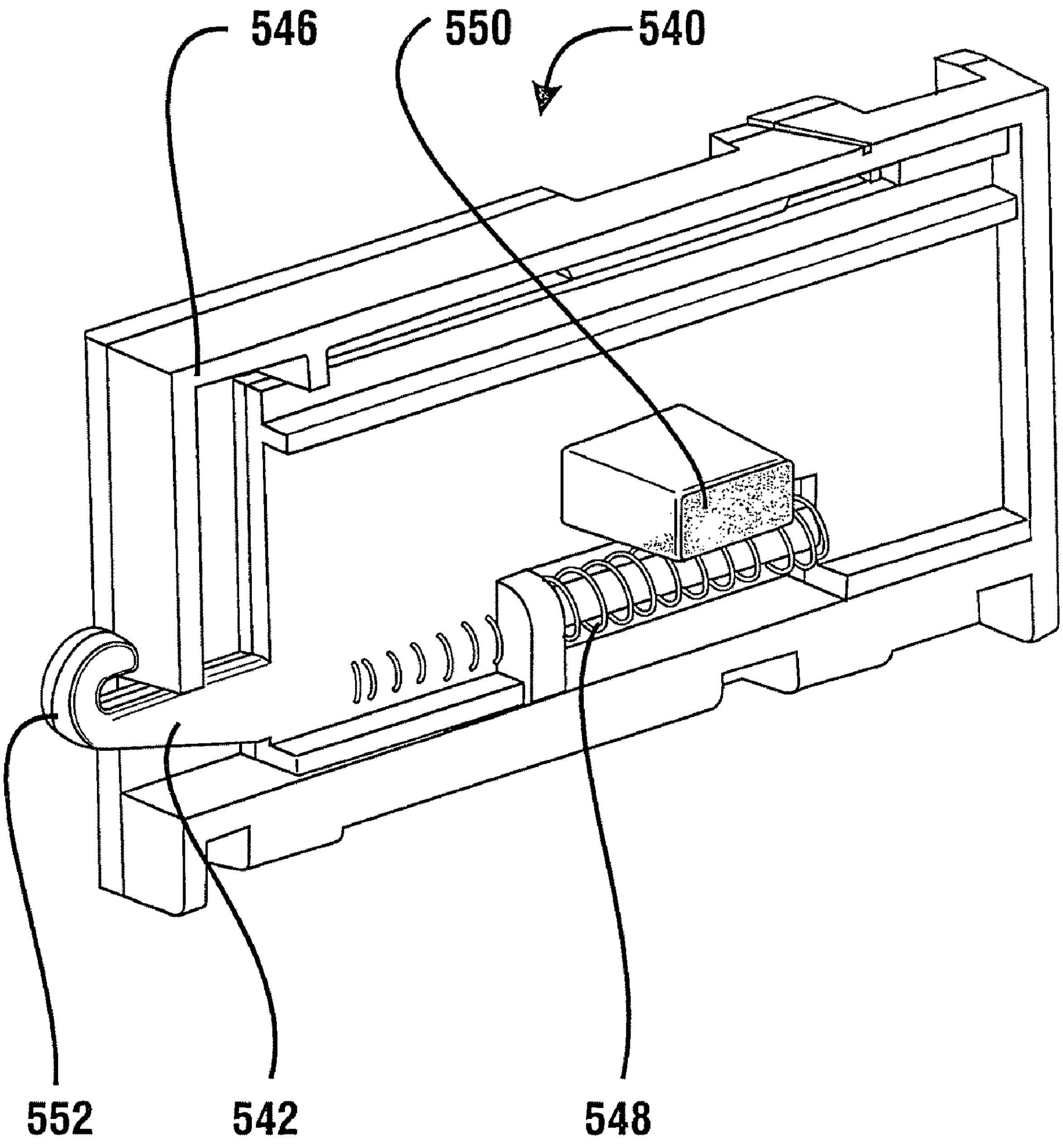
FIG. 61 shows a lock for a partition.

FIG. 61 is an enlarged view of the lock 540 and J-shaped lock arm 542 of FIG. 60. The lock includes a biasing member 548, such as a spring, which provides the lock with a force toward its locking position. That is, the spring attempts to keep the lock arm hook closer to the lock housing. The lock can be a non-user lock in that it can operate automatically without requiring contact by a person. Thus, the locking arrangement can be located inside of a divert cassette and be inaccessible to persons when the cassette is closed. FIG. 61 also shows a projection 550 (e.g., protruding button) on the lock arm. The projection button 550 is operative to engage a dispenser feed channel component, such as a picker mechanism component.

Figure 62:
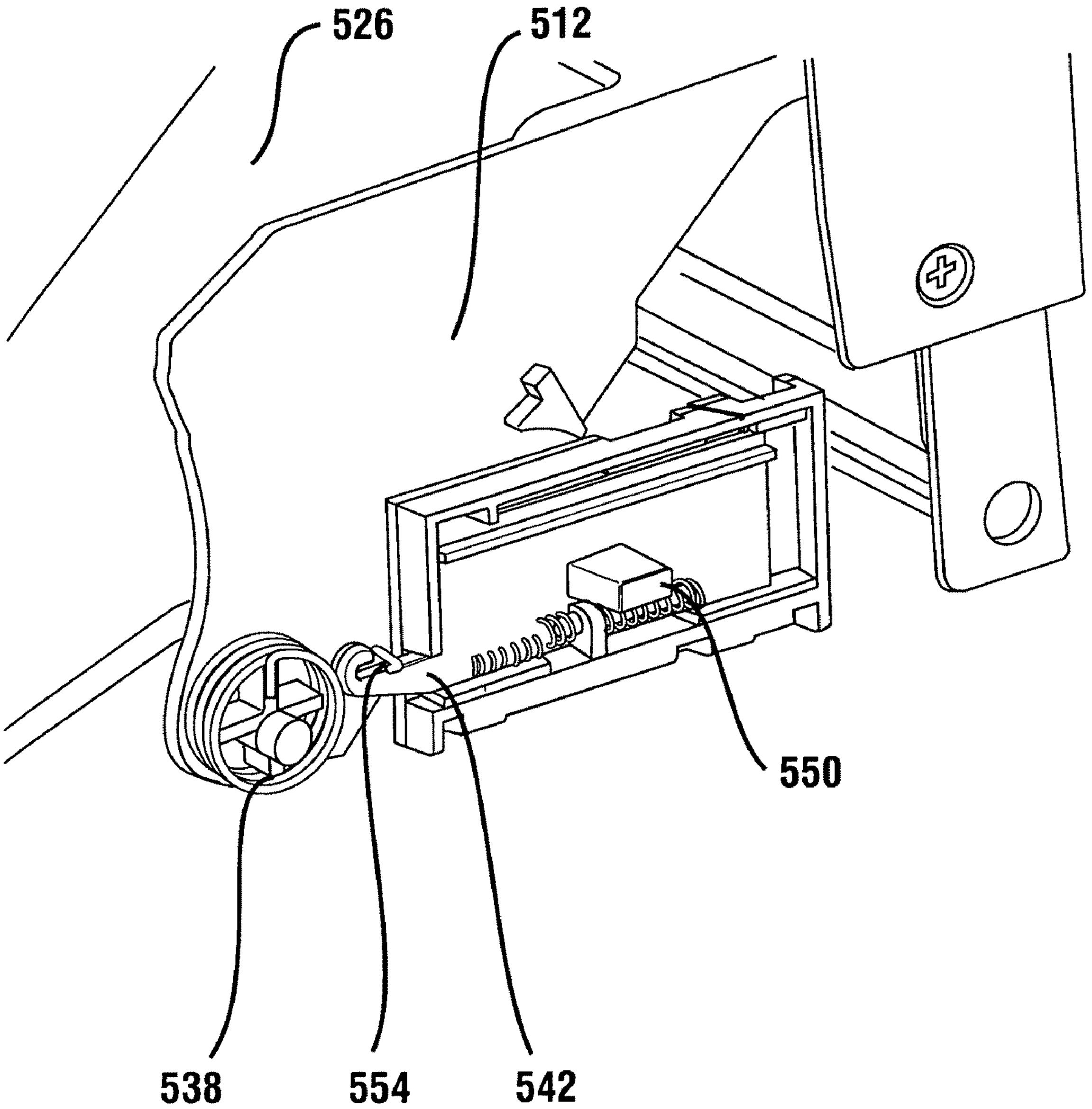
FIG. 62 shows a positioning of a lock arm and a torsion spring.

The torsion spring 538 exerts a biasing force toward having the partition in the closed position. The torsion spring attempts to keep the partition in a closed position. That is, the normal position of the J-shaped arm of the torsion spring is shown in FIG. 62. However, as previously discussed, a partition drive (e.g., engageable with the partition lever) can be operated to overcome (or act against) the force of the torsion spring to move the partition to an open position. When the partition is in the open position (as shown in FIG. 63) the torsion spring is compressed and desires to spring back to the position shown in FIG. 62.

As the divert cassette is inserted into a media dispenser, the projection button 550 engages a dispenser feed channel component. This engagement is operative to move the lock arm 542 relatively toward the torsion spring. Movement of the lock arm a predetermined distance is operative to enable release of the torsion spring from the lock. That is, movement of the lock button 550 is able to overcome the force of the lock spring 548 to move the lock arm 542. During unlocking, the lock arm is moved toward the torsion spring far enough to allow release or disengagement of the torsion spring hook from the lock hook. FIG. 62 shows the lock arm fully moved toward the torsion spring 538.

Figure 63:
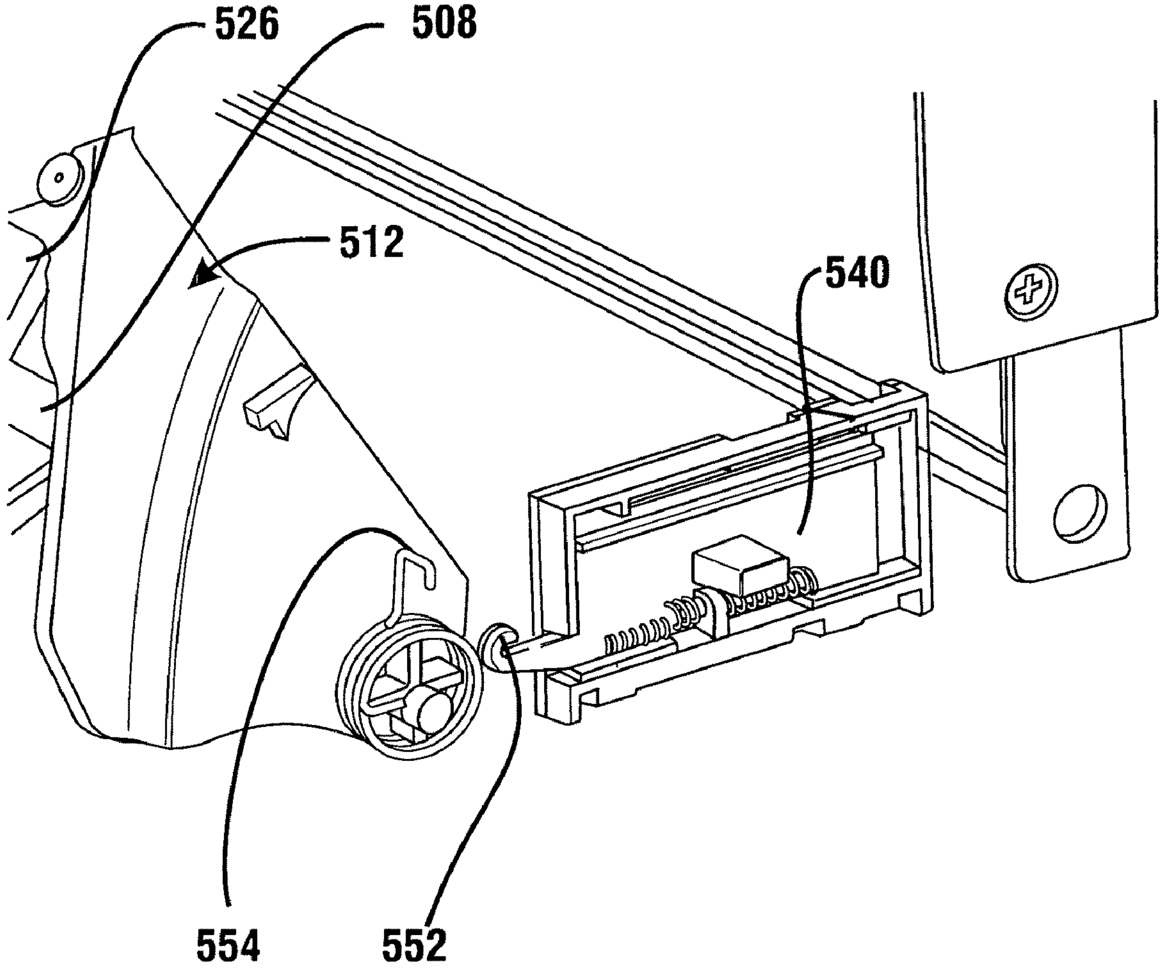
FIG. 63 shows another positioning of the lock arm and the torsion spring.

With the cassette fully inserted into the dispenser, the lock arm is in an unlocked position (FIGS. 62 and 63). With the torsion spring free of the lock arm hook the divert cassette partition is operative to be freely driven (as previously discussed) between closed and open positions. Thus, the torsion spring arm can be rotated relative to (e.g., away from) the lock arm by the partition drive. As shown in FIG. 63, counterclockwise rotational movement of the torsion spring by the partition drive can cause removal of its hook from alignment with the lock hook. That is, the torsion spring arm can be moved (against its spring force) away from the lock arm when the partition is driven toward the open position. Similarly, the torsion spring arm can be moved toward the lock arm when the partition is driven toward the closed position. However, locking engagement between the torsion spring hook and the lock hook will not occur until the lock arm is again moved (or retracted) away from the torsion spring.

During removal of a divert cassette from a dispenser, the outside drive for the partition becomes disengaged from the partition (e.g., becomes disengaged from the partition lever). With the outside drive no longer controlling movement of the partition, the partition is free to pivot. Thus, the torsion spring can move (i.e., spring back) to place the partition in its closed position (as shown in FIG. 62). As the divert cassette is being further removed from the dispenser, the lock button becomes removed from engagement with the picker channel component. With the lock button no longer held by the picker channel component, the lock spring 548 can act to retract the lock arm toward the lock housing. That is, as the cassette is being removed the lock arm (via the force of the lock spring) is also being moved further away from the torsion spring until they are lockingly engaged via their hooked ends (as shown in FIG. 60). The lock spring 548 can be set at a force load strong enough to maintain locking of the partition in the closed position. That is, the lock spring can be operative to prevent unlocking of the engaged lock hook and torsion spring hook when the cassette is completely removed from the dispenser. Thus, a divert cassette partition can be locked during transport.

With the partition in its closed position the lever can be correspondingly in its horizontal position (or alternatively some other corresponding position). Upon extraction of the cassette from a machine the lever is locked in its horizontal position. Thus, when the cassette is again inserted into a machine its lever can be in a proper position (or alignment) to engage with a partition drive. With the divert cassette removed from an automated banking machine, an authorized user can remove notes from the divert and retract storage areas. Notes may be removed after disengaging the partition lock mechanism.

Figure 64:
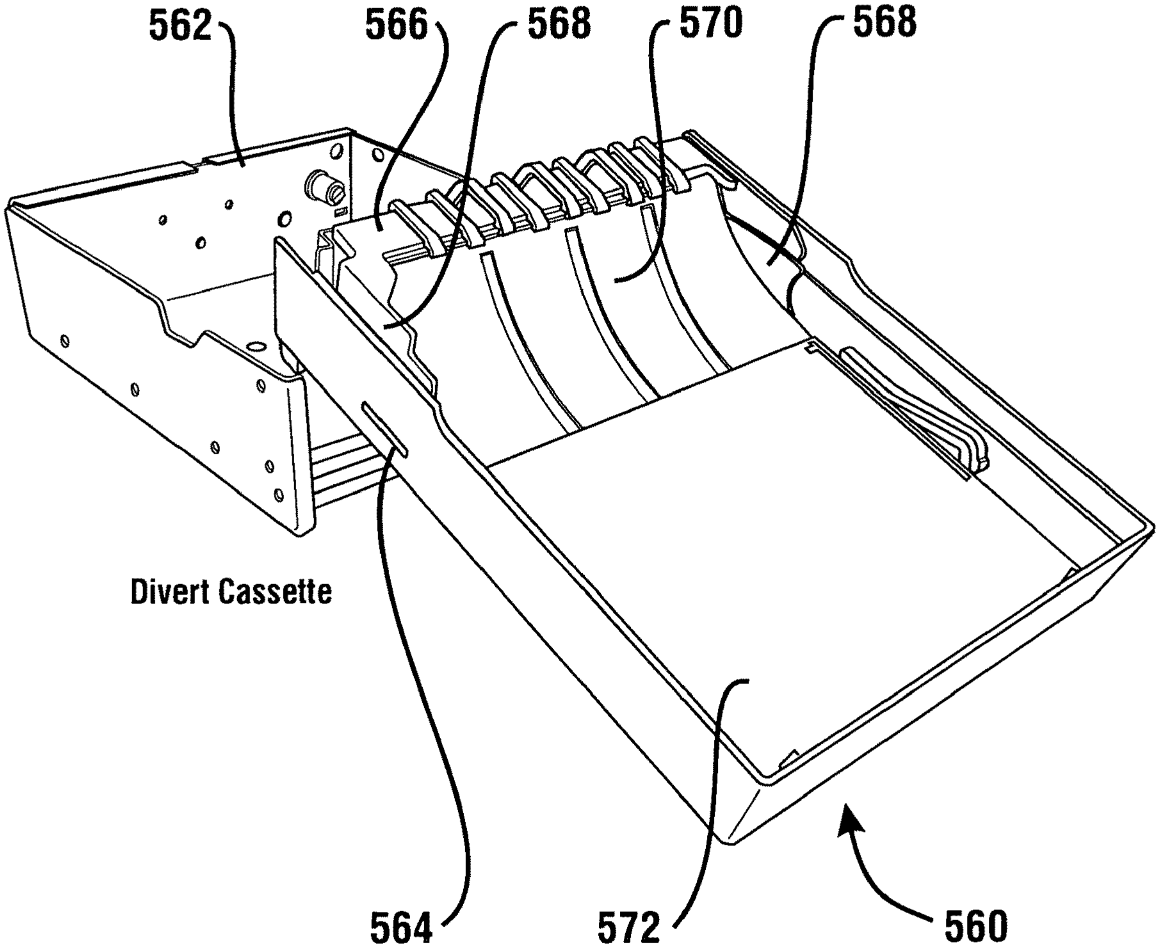
FIG. 64 shows an opened divert cassette.

FIG. 64 shows an opened divert cassette 560 including a body portion 562. A partition lever 564, bridge 566, arms 568, guide 570, and separator 572 are attached to a lid portion as shown in FIG. 64. Of course the partition portion may also be viewed as a "lid" portion.

In an exemplary operation the locking status of a partition (e.g., compartment guide) of an automated banking machine cassette can be automatically changed responsive to movement of the cassette relative to the automated banking machine. That is, the partition is operative to be locked or unlocked. Subsequently, the locking status of the partition can again be automatically changed responsive to opposite movement of the cassette relative to the automated banking machine.

In certain arrangements the notes may be removed with the partition locked in the closed position. For example, the separator may be partly lifted upon removal of the cassette lid. Because the partition is kept in its closed position, a user can be prevented from closing the cassette (i.e., closing the lid) with the partition in the open position (which can be the wrong lever position for lever/drive engagement during insertion into a machine). A divert cassette partition can be locked while out of a machine and unlocked while in a machine. The locking arrangement allows a divert cassette to remain in operable condition.

In an alternative embodiment a partition lever may be arranged with a dispenser (or an outside drive mechanism) such that during removal of the divert cassette from the dispenser the lever is automatically returned to an exit position to place the partition in its closed position. Further removal of the cassette would result in locking of the partition in its closed position. In the embodiment the partition would be free to open and close under no load from a torsion spring.

Figure 65:
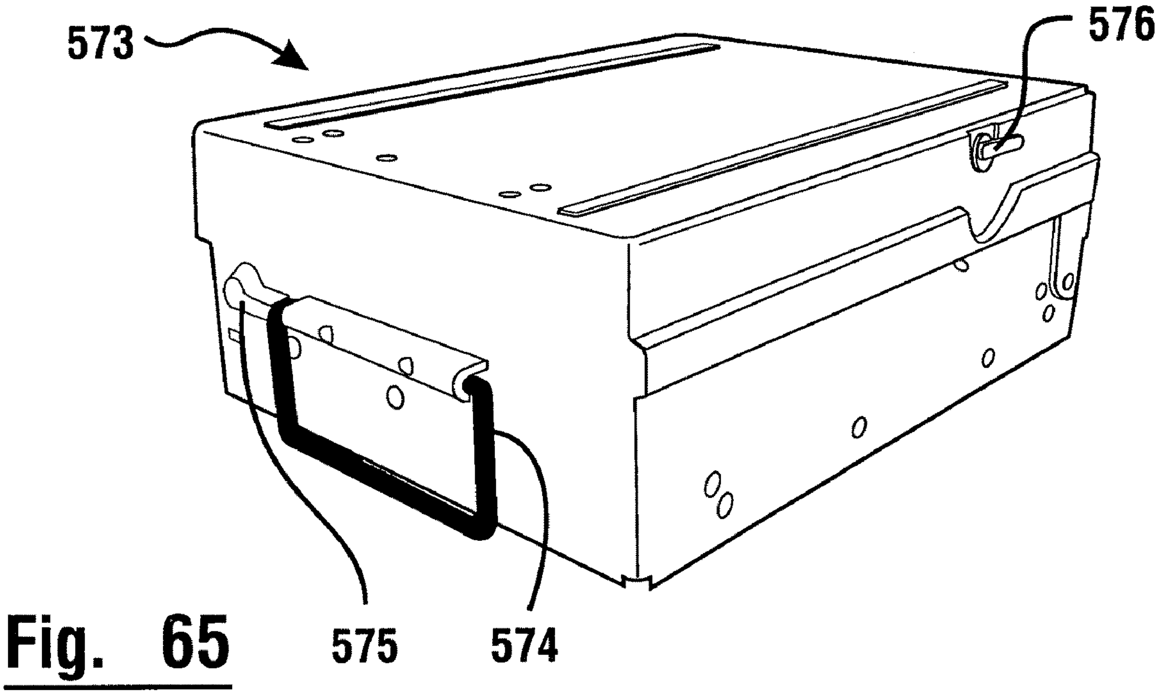
FIG. 65 shows a front perspective view of a divert cassette.
Figure 66:
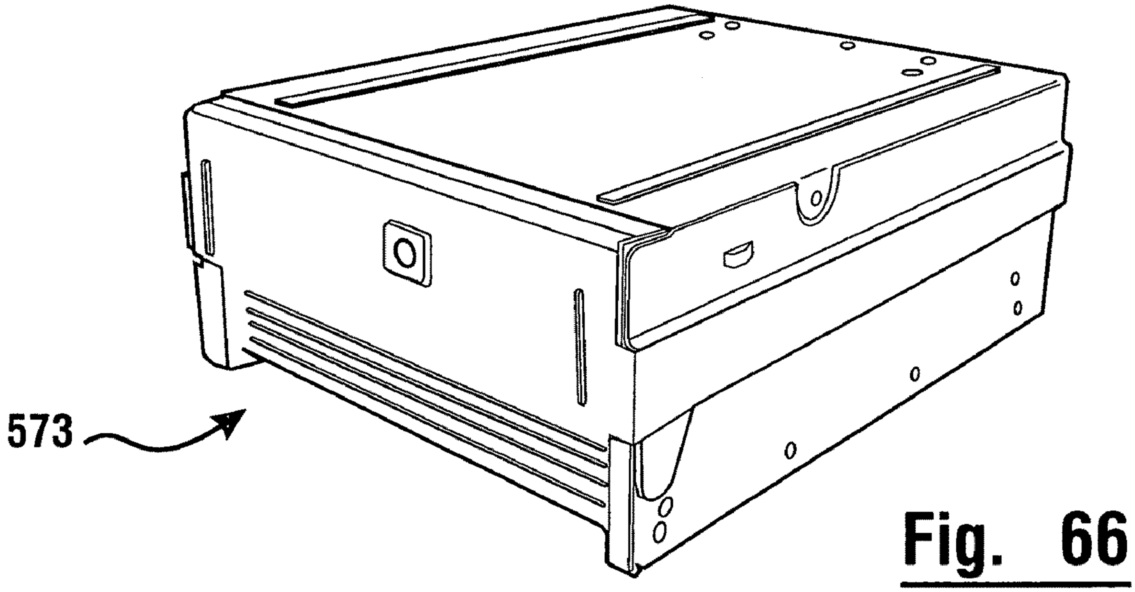
FIG. 66 shows a rear perspective view of the cassette of FIG. 65.

FIGS. 65 and 66 show views of a closed divert cassette 573. FIG. 65 shows a front perspective view of the divert cassette 573 including a carrying handle 574 on the body portion, a locking latch lever 575 on the body portion, and a partition lever 576 on the lid portion. FIG. 66 shows a rear perspective view of the divert cassette 573.

Figure 67:
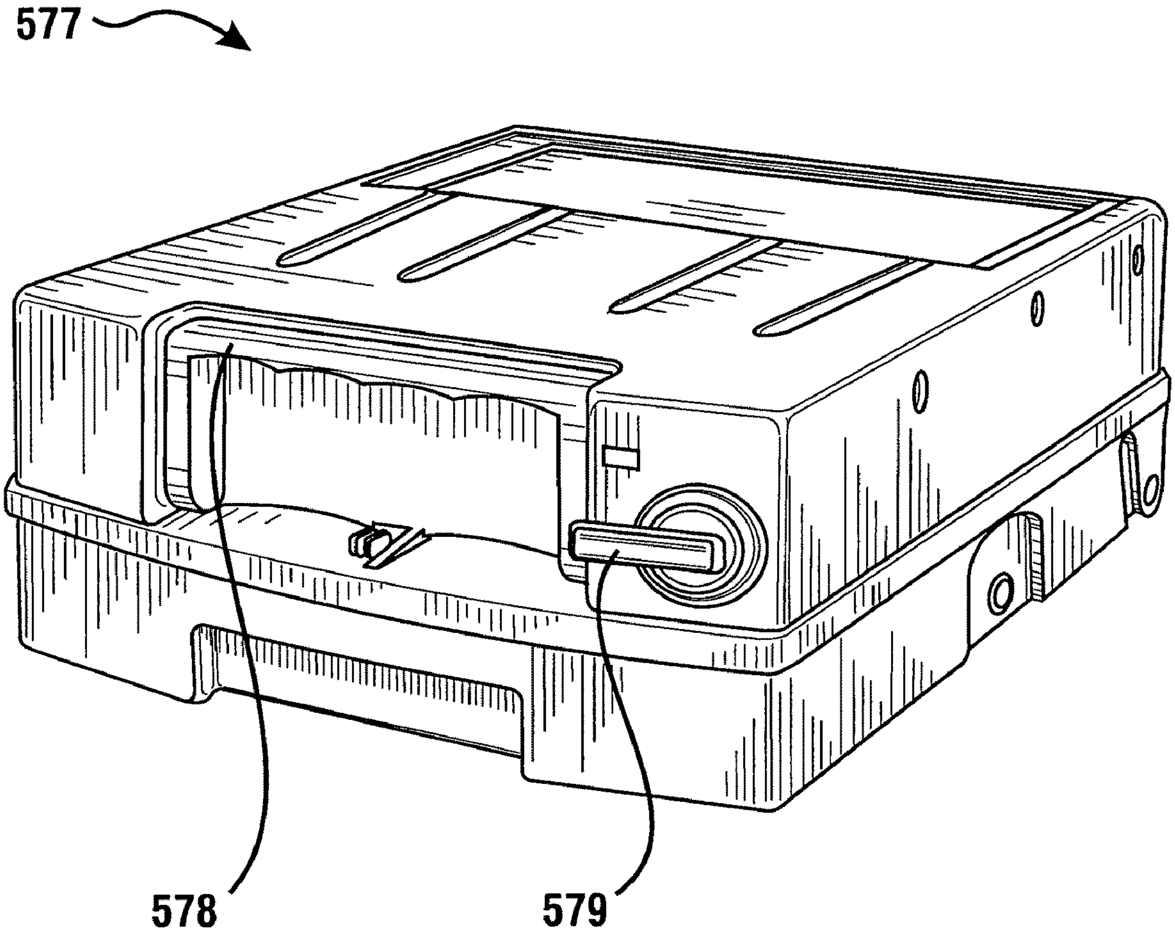
FIG. 67 shows a front perspective view of another divert cassette.

FIG. 67 shows a front perspective view of another divert cassette 577 having a carrying handle 578 and a locking latch lever 579 attached to the cassette body portion.

Figure 68:
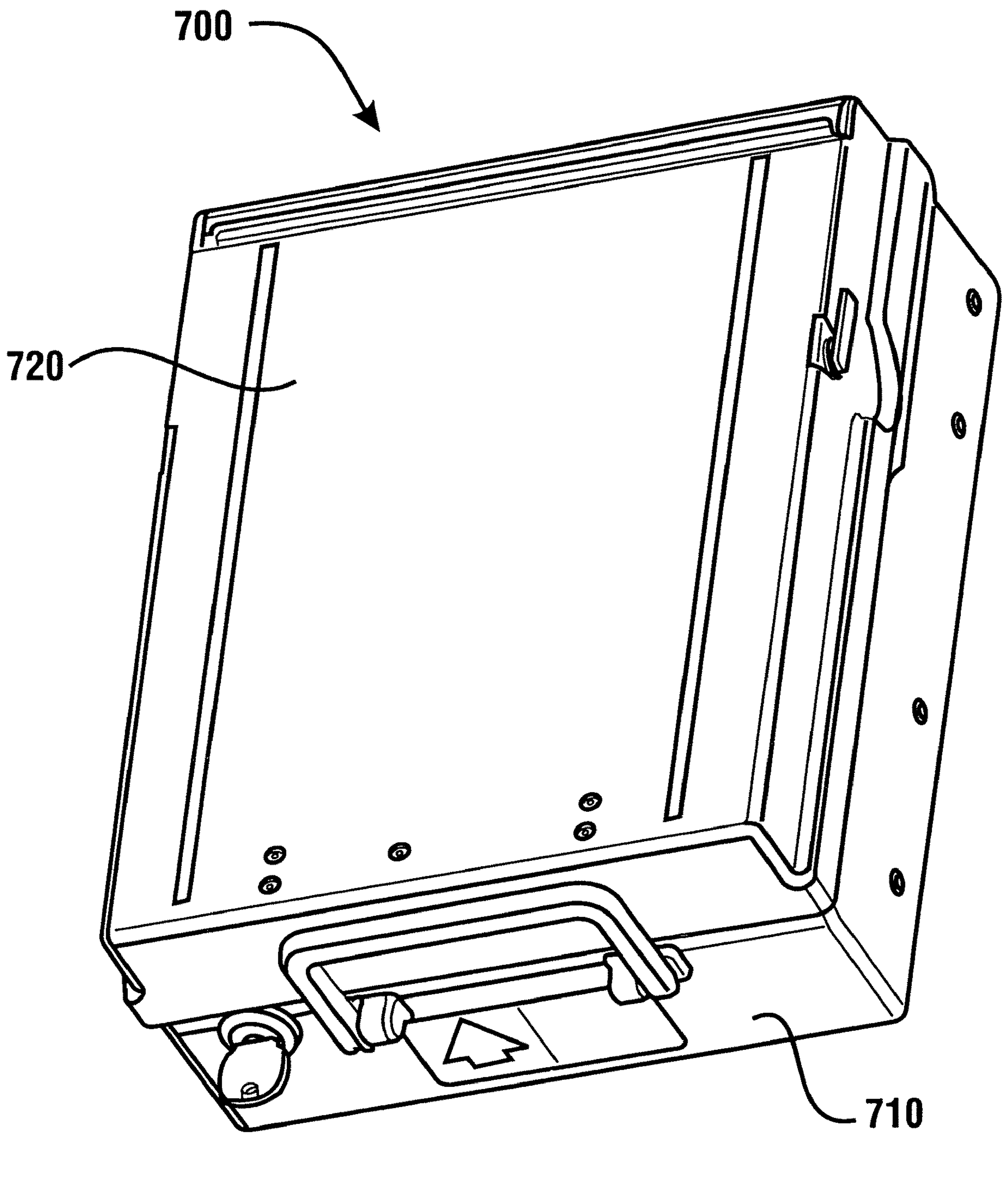
FIG. 68 shows a currency cassette.

FIG. 68 shows another currency cassette 700. In an exemplary embodiment the currency cassette comprises a divert cassette. The divert cassette 700 includes a body portion 710 and a lid portion 720. The lid 720 is pivotally connected or hinged to the body 710. The lid 720 is shown in a closed state. A carrying handle 716 and key lock assembly 718 are also shown.

As previously discussed, a divert cassette can comprise metal and/or plastic materials. Thus, the divert cassette 700 can have both a rigid (one-piece structure) polymer body 710 and a rigid (one-piece structure) polymer lid 720. For example, both the body 710 and lid 720 can be molded of flexible polycarbonate material, resulting in a high strength divert cassette. The body 710 and lid 720 can also be formed of vinyl, such as polyvinylchloride ("PVC").

Figure 69:
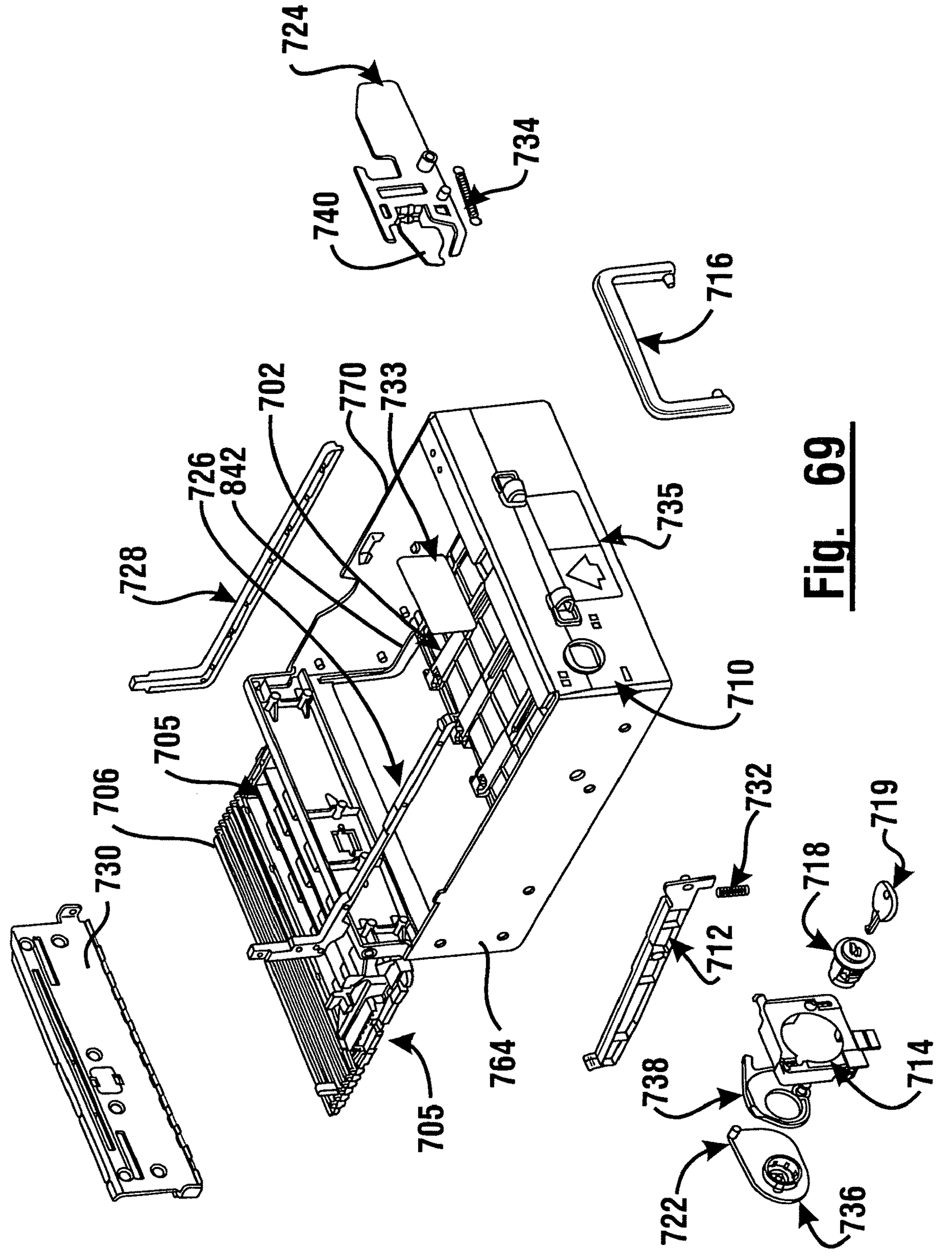
FIG. 69 shows components associated with a cassette body.

FIG. 69 shows a broken view of components associated with the divert cassette body 710. The separated components shown in FIG. 69 include a rigid slide 702, a tambour door assembly 704 including both a flexible tambour door section 706 and a rigid door section 708, a door stiffening rib 705, the body 710, a door lock bar 712, a lock bar actuator 714, a carrying handle portion 716, a key lock assembly 718, key 719, a latch unlocking cam 722, a lid latch 724, left and right side door guides 726, 728 for the tambour door 704, a stop plate 730, a compression spring 732 for the lock bar 712, a return spring 734 for the cam 722 and the lid latch 724, interior and exterior labels 733, 735 for purposes of identification, instruction, etc, and a cover portion 736 and lock portion 738 of the cam 722.

Figure 71:
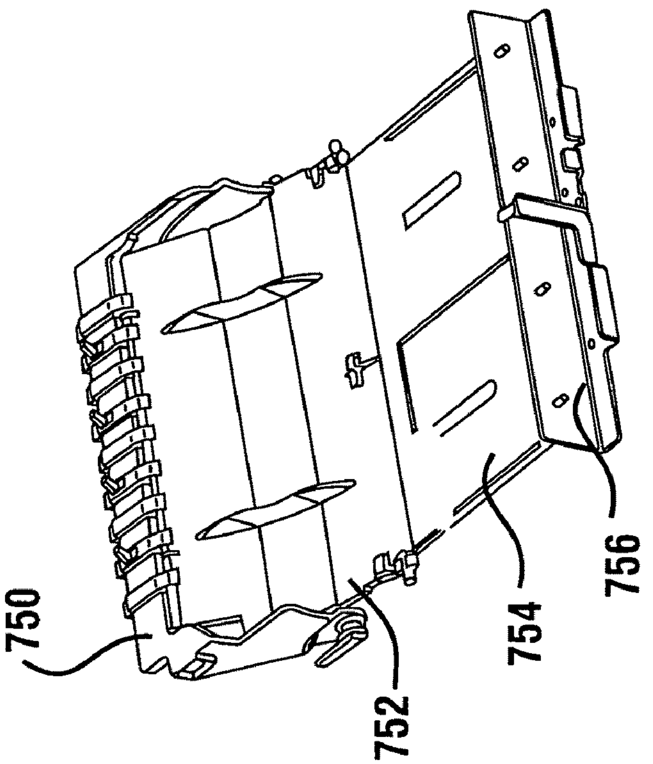
FIG. 71 shows assembled cassette components.
Figure 70:
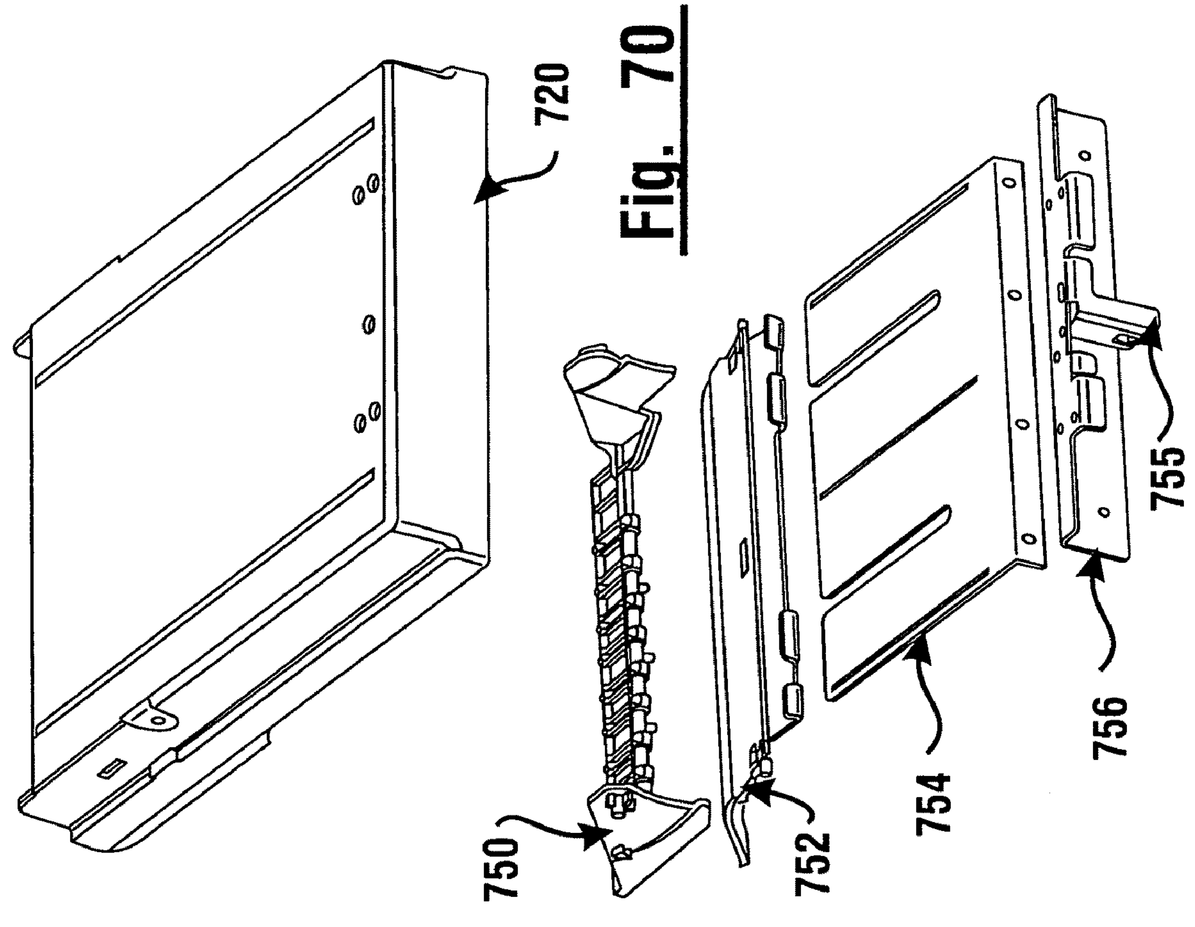
FIG. 70 shows components associated with a cassette lid.

FIG. 70 shows a broken view of components associated with the divert cassette lid 720. FIG. 70 shows a partition 750, partition ramp 752, divider 754, and a lid catch assembly 756 having a catch 755. FIG. 71 shows these components assembled and inverted to reveal their opposite side.

It should be understood that not all of the cassette components are necessarily shown. Certain components such as screws, washers, springs, sleeves, and fasteners have been excluded to improve clarity. Furthermore, certain interior cassette components and their functions have already been discussed. For example, note the previously discussed cassette components directed to a partition lever, a partition arm, a divert note storage area, a retract note storage area, etc. These previously discussed cassette components can similarly be used in the shown divert cassette 700.

The lid latch 724 prevents inadvertent lockouts during lock actuation. The lid latch has an offset tab 740 which retains or traps the latch-opening cam 722. The tab 740 can be integrally formed from (and one-piece with) the lid latch 724. For example, a metal tab may be stamped out from a metal latch. Alternatively, a tab may be molded together with a latch of high strength plastic material.

Figure 73:
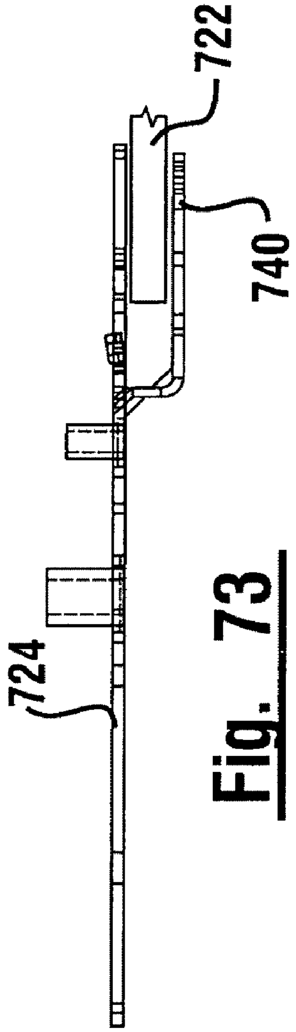
FIG. 73 shows a top view of the lid latch of FIG. 72.
Figure 72:
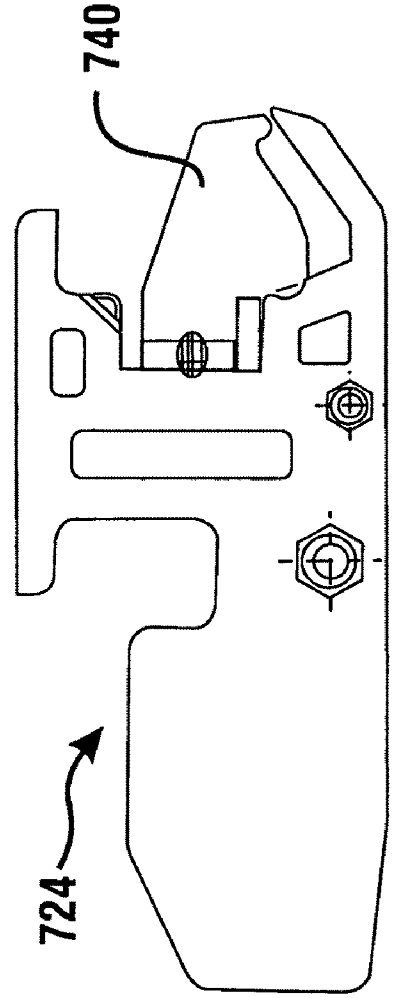
FIG. 72 shows a side view of a cassette body's lid latch.

FIG. 72 shows a side view of the body's lid latch 724 having the offset tab 740. FIG. 73 shows a top view of the lid latch 724 capturing a section of the cam 722. The latch tab 740 is positioned offset from the remainder of the latch body 724 to extend parallel to but spaced therefrom. The offset tab 740 prevents inadvertent lockouts by not allowing the cam 722 to be moved out of alignment with the latch 724. The tab 740 is positioned adjacent to and outside of the cam 722 to prevent axial movement (or slipping) of the cam relative to the latch. Thus, the tab 740 maintains the cam in an operative position to engage the latch. The tab/cam relationship prevents the cam from becoming non-engageable with the latch while the cassette is in a locked state. As a result, the unique lid latch 724 ensures that a locked cassette can be readily unlocked.

The lid latch 724 and cam 722 are attached to the cassette body 710. The latch 724 can be formed of metal or another high strength material. The cam 722 can comprise metal and/or plastic material. The cam may be comprised of one or more cam components. For example, in FIG. 69 the cam 722 comprises a cover portion 736 and a lock portion 738. The return spring 734 is connected to both a spring peg 742 of the cam 722 and a spring peg 744 of the lid latch 724. Thus, the return spring 734 connects the lock portion 738 to the lid latch 724. The loading of the spring 734 enables the cam to return to its radial non-opening position.

The cam 722 can be either key-actuated or hand lever-actuated. The cam 722 also has a latch abutting end peg 746. When the cam is rotated, its end peg 746 engages the latch 724 which in turn causes the latch to also rotate (or pivot) to an open position. When the latch 724 is rotated it is moved free from the latch catch 755 of the lid 720. A rotated latch releases the lid's catch 755 from being held (caught) by the body's latch 724. Thus, with the latch 724 rotated out of its lid locking position, the cassette 700 is in an unlocked state. With the cassette 700 unlocked, the cassette lid 720 can be opened by being pivoted on its hinge in a direction away from the cassette body 710.

Figure 74:
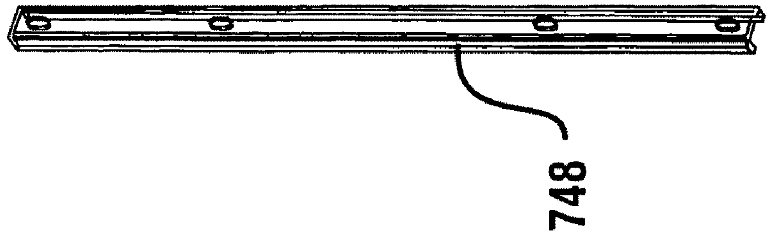
FIG. 74 shows a stiffening rib.

As previously discussed, both the body 710 and the lid 720 of the divert cassette 700 can be molded or formed of polymer material. Stiffening ribs can also be located throughout the cassette 700, including in the body 710, lid 720, door 704, and slide 702. These ribs are provided to enhance the structural strength of the polymer cassette portions with which they are integrally molded (e.g., one-piece structure). Alternatively, ribs may be mechanically attached. The ribs assist in strengthening the structural integrity of the cassette. Thus, the ribs assist in preventing a successful attempt at gaining unauthorized access to the cassette interior. FIG. 74 shows a stiffening rib 748. Additional stiffening ribs 705 of various sizes are shown in the drawings.

Figures 75, 76, 77, 78:
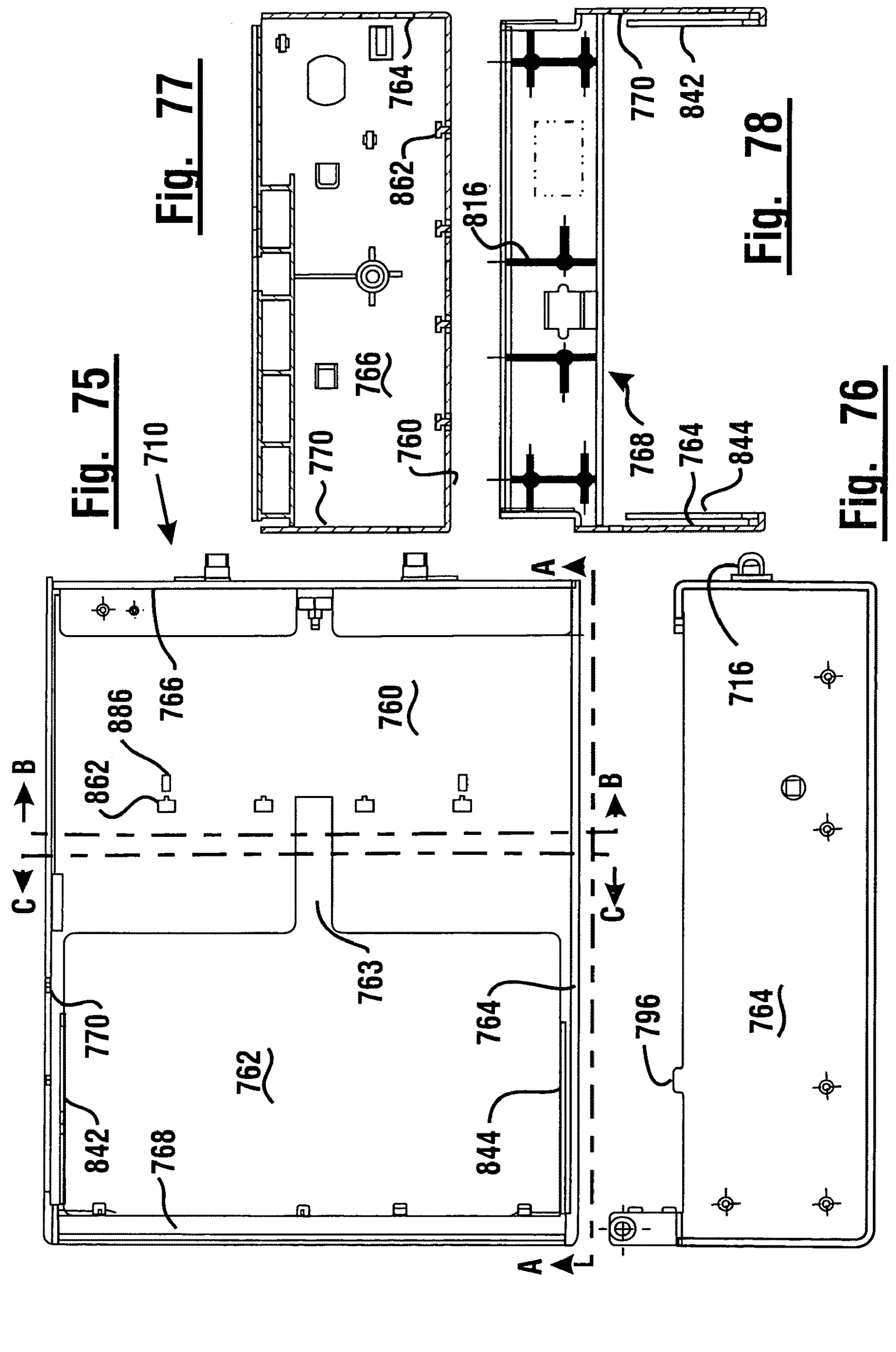
FIG. 75 shows a view of the interior floor a cassette.
FIG. 76 shows a view along line A-A in FIG. 75.
FIG. 77 shows a view along line B-B in FIG. 75.
FIG. 78 shows a view along line C-C in FIG. 75.

FIG. 75 is a view looking toward the interior side the floor 760 of the cassette body 720. Front 766, rear 768, and side walls 764, 770 are also shown. The floor 760 has an opening 762 which can be covered by the combined door 704 and slide 702. The floor opening 762 has a center extending portion 763. FIG. 76 is a cross sectional view of FIG. 75 across line A-A. FIG. 76 looks toward the exterior side of the body side wall 764. FIGS. 75 and 76 are in alignment. FIG. 77 is a cross sectional view of FIG. 75 across line B-B. FIG. 77 is a view looking toward the interior side of the body front wall 766. FIG. 78 is a cross sectional view of FIG. 75 across line C-C. FIG. 78 is a view looking toward the interior side of the body rear wall 768. FIGS. 77 and 78 are in alignment.

Figure 79:
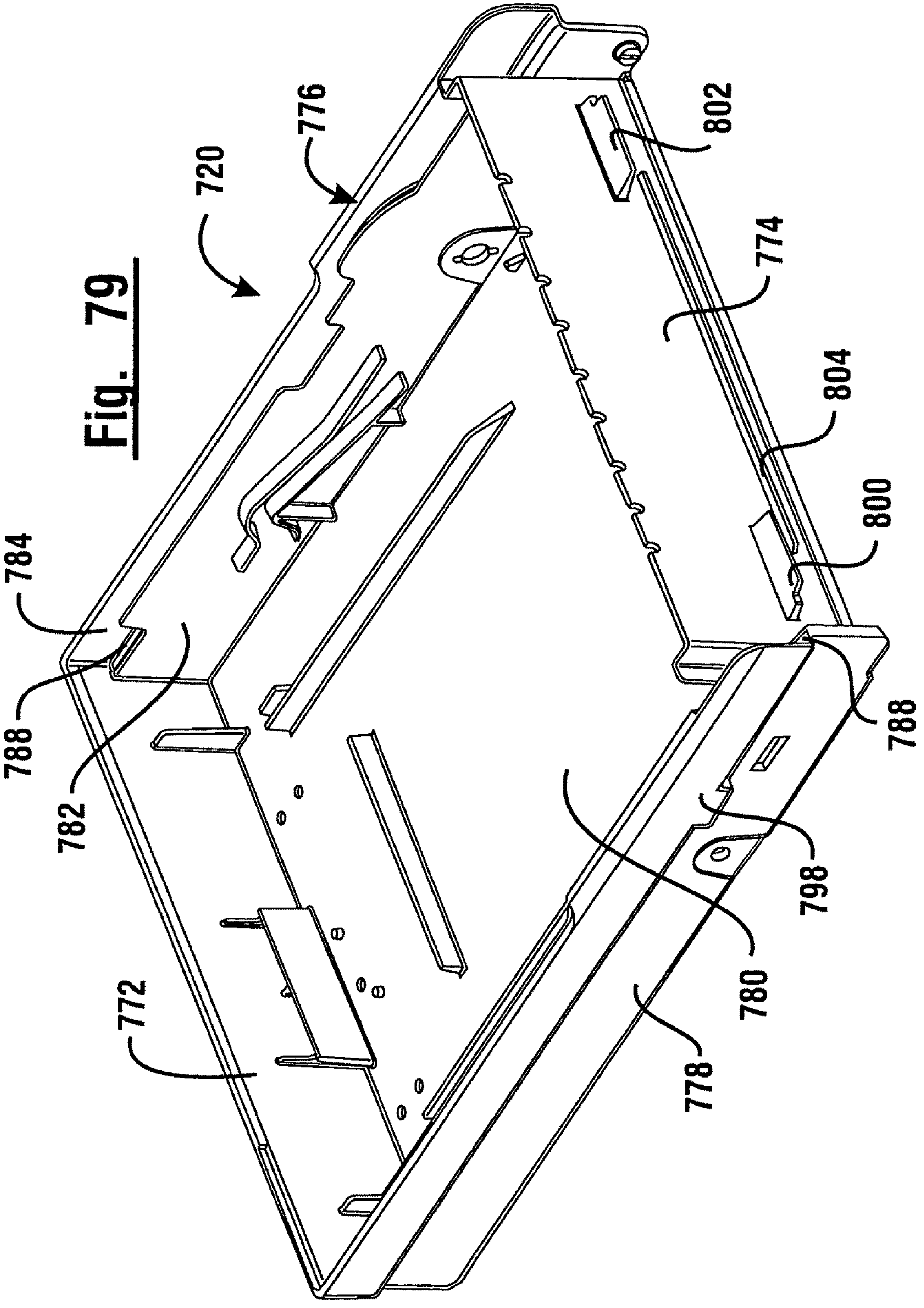
FIG. 79 shows a view of the interior of a cassette lid.

FIG. 79 shows an interior view of the cassette lid 720. Front 772, rear 774, side 776, 778, and top (ceiling) 780 walls of the lid 720 are also shown. The side walls of the cassette lid 720 are similarly structured to assist in impeding prying the lid away from the body 710 when the lid is in a fully closed position. The lid side walls 776, 778 each comprise a double wall.

Figure 80:
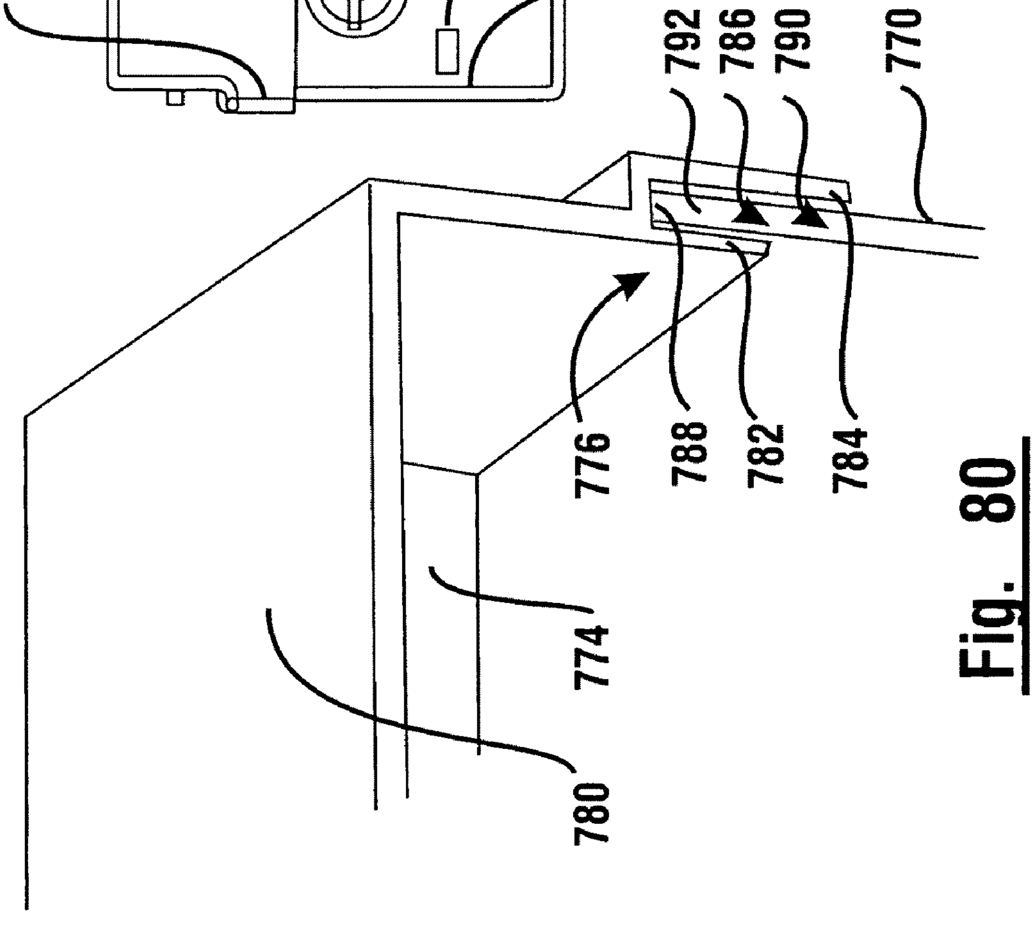
FIG. 80 shows an interlocking arrangement between a lid's double side wall and a body's side wall.

FIG. 80 is an angled view of a segment of the lid side wall 776 adjacent a segment of the body side wall 770. The side wall 776 is a double wall comprising both a vertically extending inner wall 782 positioned adjacent to a vertically extending outer wall 784. The internal wall 782 extends in a substantially parallel direction to the lid side external wall 784. The inner wall 782 can be an extension of a lid rib molded unitarily (one-piece structure) with the lid 720. The sub walls 782, 784 form an elongated gap 786 (or recess or receding cavity) therebetween and there along. The gap 786 (or spaced area) separates the walls 782, 784 along a substantial length of thereof. This spaced area 786 is bounded on three facets by a base or lip 788 and the walls 782, 784. The gap 786 includes an open face 790 (or end) opposite the base end 788. This open face 790 is sized to receive therethrough an upper section 792 (or top edge portion) of the body side wall 770, as shown. Thus, when the lid is closed, the portion 792 of the body side wall 770 is securely positioned (or trapped) intermediate both the inner 782 and outer 784 sections of the lid side wall 776.

The cassette body 710 and lid 720 are arranged relative to each other so that each body side wall 764, 770 is aligned with a wall-receiving gap 786 in the lid. Thus, when the divert cassette 700 is closed, an upper portion of each body side wall 764, 770 is extended through an open face 790 and into a lid gap 786. Hence, each body side wall is overlapped on two sides by a lid side wall.

The lid's inner side wall 782 is shown shorter than its corresponding outer side wall 784. However, it should be understood that the inner and outer side walls 782, 784 can be of various lengths relative to each other. For example, the innermost side wall 782 can extend an equal or greater (vertical) distance than the outermost side wall 784. Likewise, the side walls 782, 784 can have various thicknesses relative to each other.

Although only one corresponding body side wall and lid side wall have been shown arranged relative to each other, it should be understood that the lid's other side wall 778 and the body's other side wall 764 are similarly arranged relative to each other in intermediate/surrounding relationship.

In an exemplary arrangement, the lid/body spacing is such that when the cassette lid is moved sideways relative to the cassette body, one body side wall engages a lid inner wall while the other body side wall simultaneously engages a lid outer wall. Thus, the cassette simultaneously uses the strength of both cassette sides to resist an attempt to force a lid side away from the body.

Figure 81:
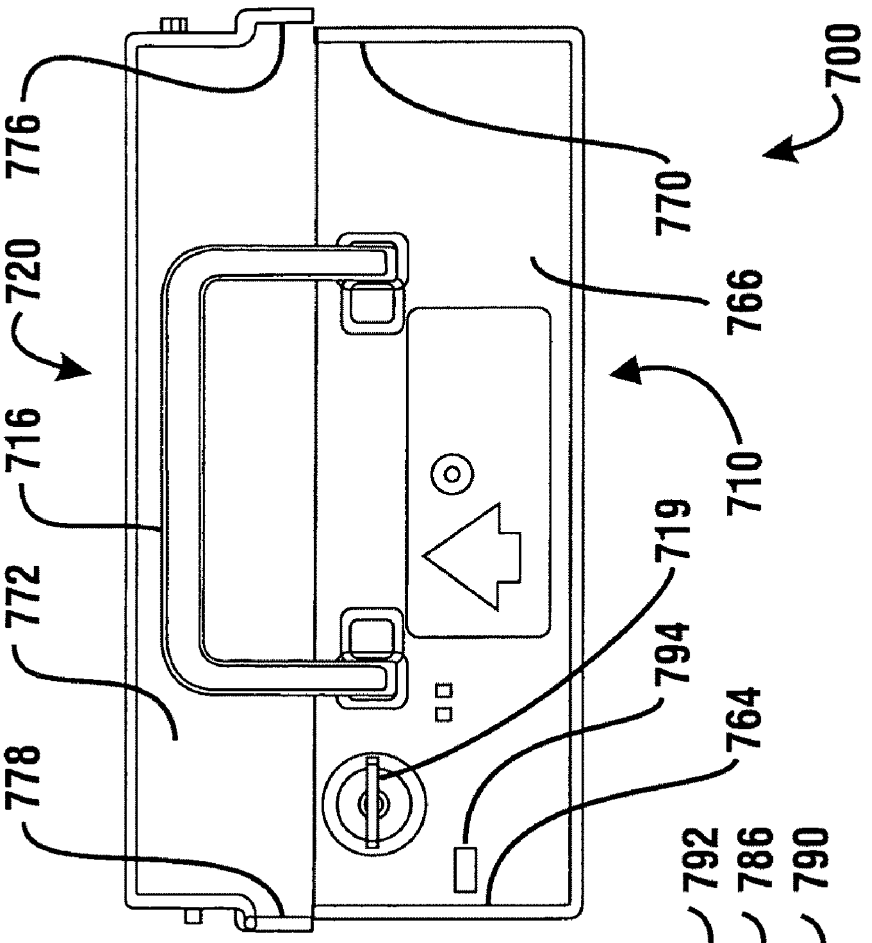
FIG. 81 shows a front view of a closed cassette.

FIG. 81 is an exterior view looking toward the front of a closed and locked cassette 700. The front wall 766 and side walls 764, 770 of the cassette body 710 are shown. The front wall 772 and side walls 776, 778 of the cassette lid 720 are also shown. A clear plastic window 794 is also shown. Different colored indicia (e.g., green, orange, red), used to indicate tampering, can be visible to service personnel through the window 794. The color displayed in the window is linked to the tambour door locking mechanism. The color can change due to unauthorized (yet minor) movement of the tambour door. A color change can be taken as a sign or indication of cassette tampering. The tamper indicating features previously discussed in application Ser. No. 10/797,331 are incorporated herein by reference.

Thus, on each side of the divert cassette 700, the lid 720 can substantially overlappingly surround a side wall of the body 710. The relationship of the body side walls and lid side walls enables the lid to be interlocked with the body substantially along both sides of the cassette. This interlocking deters removal of the lid relative to the body in a sideways direction (or direction perpendicular to the cassette sides).

The cassette 700 has additional securement features. At least one body side wall 764 includes a (vertically) extending or projecting tab 796, as shown in FIGS. 76 and 69. The tab 796 can be molded in one piece with the side wall 764. The base end 788 of the lid gap 786 includes a recessed cavity or slot 798, as shown in FIG. 79. The tab 796 is sized to (vertically) reside in the slot 798. The dimensions of the slot 798 can be slightly larger than the tab's width, length, and depth. Thus, the male tab 796 can tightly fit in the female recess 798. When the lid is closed, the tab 796 mates and interlocks with the tab receiving slot 798 to deter movement of the lid 720 relative to the body 710. The movement is deterred in at least two perpendicular directions (e.g., side-to-side and front-to-back).

Additionally, the cassette has mating tabs and slots to provide further protection against breach. The lid 720 has at least three horizontal projecting tabs 800, 802, 804 in its rear wall 774, as shown in FIG. 79. The tabs project outward from the inner face of the lid rear wall 774. The lid rear wall 774 can be molded together with the remainder of the lid 720 as a one-piece structure.

Figure 82:
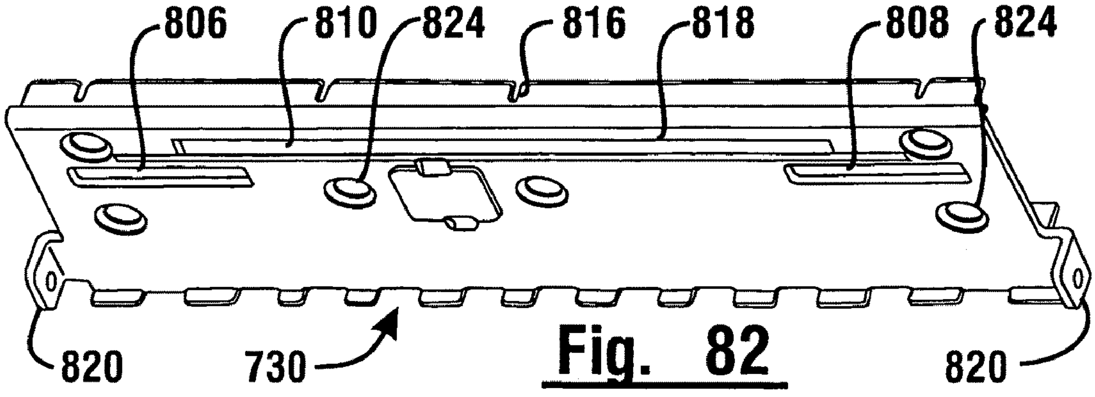
FIG. 82 shows an angled view of a stop plate.

FIG. 82 shows an angled interior view of the stop plate 730 of the body portion 710. The stop plate 730 has horizontal openings or slots 806, 808, 810. The slots are recessed inward from the inner face of the body stop plate 730. The slots 806, 808, 810 are arranged to align with and corresponding match the projecting tabs 800, 802, 804 when the lid is rotated closed. That is, each lid tab 800, 802, 804 is sized to matingly project into a respective body slot 806, 808, 810. The center tab 804 mates with the center slot 810.

The tab-to-slot interfitting matings provide lid-to-body interlocking, and thus further cassette security. As the lid 720 is being rotated toward a closed position, the lid tabs become aligned with the body slots and then protrude therein to cause interlocking engagement between the lid and body. The tabs 800, 802, 804 assist in preventing removal of the rear portion of the lid when it is locked to the cassette body. As can be seen, the tab-to-slot arrangement hinders the lid from being removed relative to the body in at least side-to-side and up/down directions.

As shown in FIG. 79, the end tabs 800 and 802 are similarly dimensioned, spaced from each other, and extend in parallel alignment along a common horizontal plane. The tab 804 extends parallel to but spaced from the horizontal plane in a direction closer to the lid's pivot point (i.e., the lid hinge). The central tab 804 is located substantially intermediate the tabs 800, 802 in the horizontal direction. The end portions of the central tab 804 horizontally overlap a respective end portion of each end tab 800, 802. Thus, the entire horizontal length of the lid rear wall 774 extending between the end tabs 800, 802 also includes interlocking tab coverage 804. Each end tab 800, 802 is also tapered or ramped to assist its entry into a body slot. The tapering can substantially form a triangle (in cross section) that has its thicker base adjacent the rear wall 774.

In FIG. 79 the central tab 804 is shown thinner, longer, and projecting outward away from the lid rear wall 774 less than the other tabs 800, 802. However, it should be understood that the tabs 800, 802, 804 can be of various projecting lengths, horizontal lengths, and thicknesses relative to each other to correspondingly mate with similar sized slots in the body stop plate 730.

Figure 87:
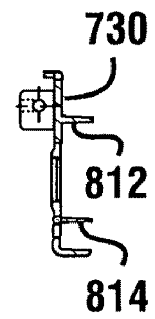
FIG. 87 shows a view along line A-A in FIG. 86.
Figure 86:
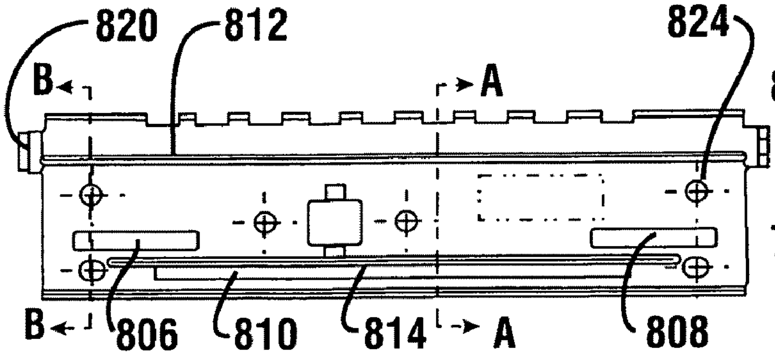
FIG. 86 shows an exterior side of a stop plate.
Figure 88:
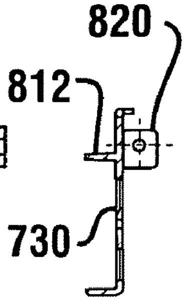
FIG. 88 shows a view along line B-B in FIG. 86.
Figure 85:
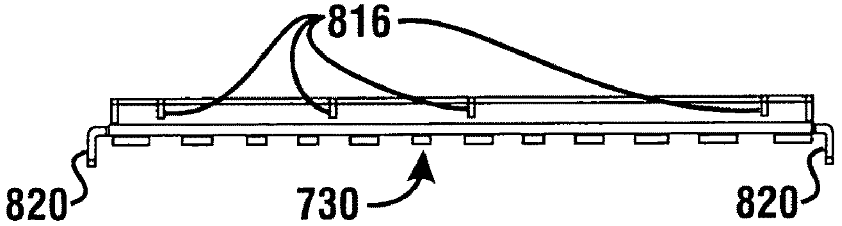
FIG. 85 shows a view of a cut away lower section of a stop plate.
Figure 84:
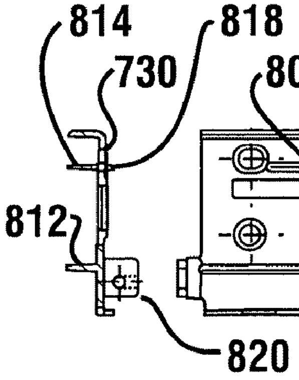
FIG. 84 shows a view along line A-A in FIG. 83.
Figure 83:
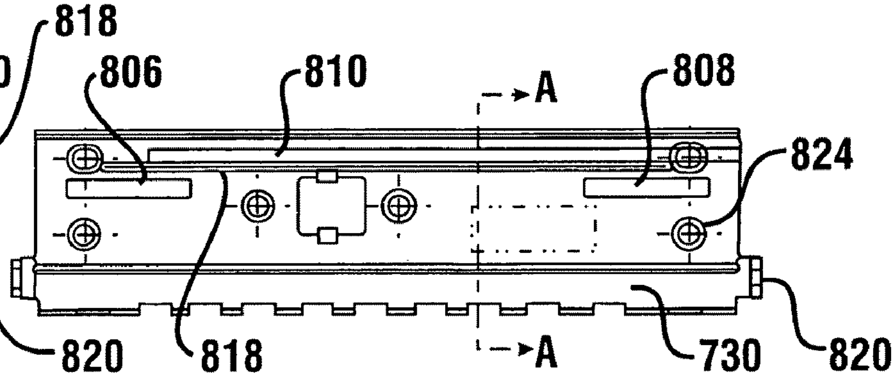
FIG. 83 shows an interior side of a stop plate.

FIGS. 83-88 show additional views of the body stop plate 730. FIG. 83 is similar to FIG. 82. FIG. 83 shows the interior side of the stop plate 730. FIG. 84 is a cross sectional view of FIG. 83 taken across line A-A. FIG. 85 is a downward view of the cut away lower section of the stop plate of FIG. 83. FIG. 86 shows the exterior side of the stop plate 730. FIG. 86 shows the stop plate of FIG. 83 after it was flipped or pivoted 180 degrees about its upper/lower edge. FIG. 87 is a cross sectional view of FIG. 86 taken across line A-A. FIG. 88 is a cross sectional view of FIG. 86 taken across line B-B.

The stop plate 730 is adapted to stop or deter entry to the cassette interior therethrough. As shown in FIGS. 83-88, the exterior (rear) side of the stop plate 730 has at least two horizontally elongated stiffening ribs 812, 814 and at least four vertically elongated stiffening ribs 816. The ribs, the stop plate 730, and the body rear wall 768 can be integrally molded together as a unitary one-piece plastic structure.

In an alternative arrangement the ribs can be integrally molded together with only the remainder of the stop plate 730. Likewise, the ribs can be integrally formed with only the body rear wall 768 as a one-piece structure. After the separate moldings, the stop plate and body rear wall can then be fastened to each other.

The interior (front) side of the stop plate 730 has a viewable tamper indicating crush rib 818. The crush rib is viewable by a service person when the lid is in an open position. The crush rib 818 is intended to be easily damaged (such as when the stop plate is flexed) to show evidence of an unauthorized attempt to access the cassette interior. For example, although there may be no visible exterior signs of attempted entry, upon opening the lid the crush rib 818 can then be seen and noted as cracked. This cracking may be indicative of other unseen cassette damage, such as rib damage or lowered rib strength. Hence, the crush rib 818 can be used as an indicator that the stop plate may need to be replaced (or action taken) to prevent using a cassette that may have a structural integrity (and security) that is compromised.

The stop plate 730 can be integrally molded together with the body side walls 764, 770 as a unitary one-piece structure. Alternatively or in addition thereto, the stop plate 730 can be securely fastened to the body side walls 764, 770 via one or more connectors passing through openings in the two stop plate end support arms 820 and into a respective body side wall. Additional plural openings 824 through the face of the stop plate 730 can be used receive fasteners to provide additional securement of the stop plate to the body rear wall 768. It should be understood that various types of known fasteners and fastening techniques can be used to attach or connect the polymer lid to the polymer body, which both can be made of similar or the same material. For example, but not limited thereto, the fastening may be achieved using any of heating, bonding, welding, fusing, expansion joints, temperature difference in materials, adhesives, snap fitting engagement, reinforcing elements, additional mechanical structure such as metal/plastic screws and pins, etc.

As previously discussed with regard to FIG. 69, the divert cassette 700 has a molded one-piece tambour door assembly 704. The door assembly 704 includes a flexible tambour door section 706 and a rigid door section 708. Further description and operation of a tambour door can be found in application Ser. No. 10/797,331, which is incorporated herein by reference.

Figure 89:
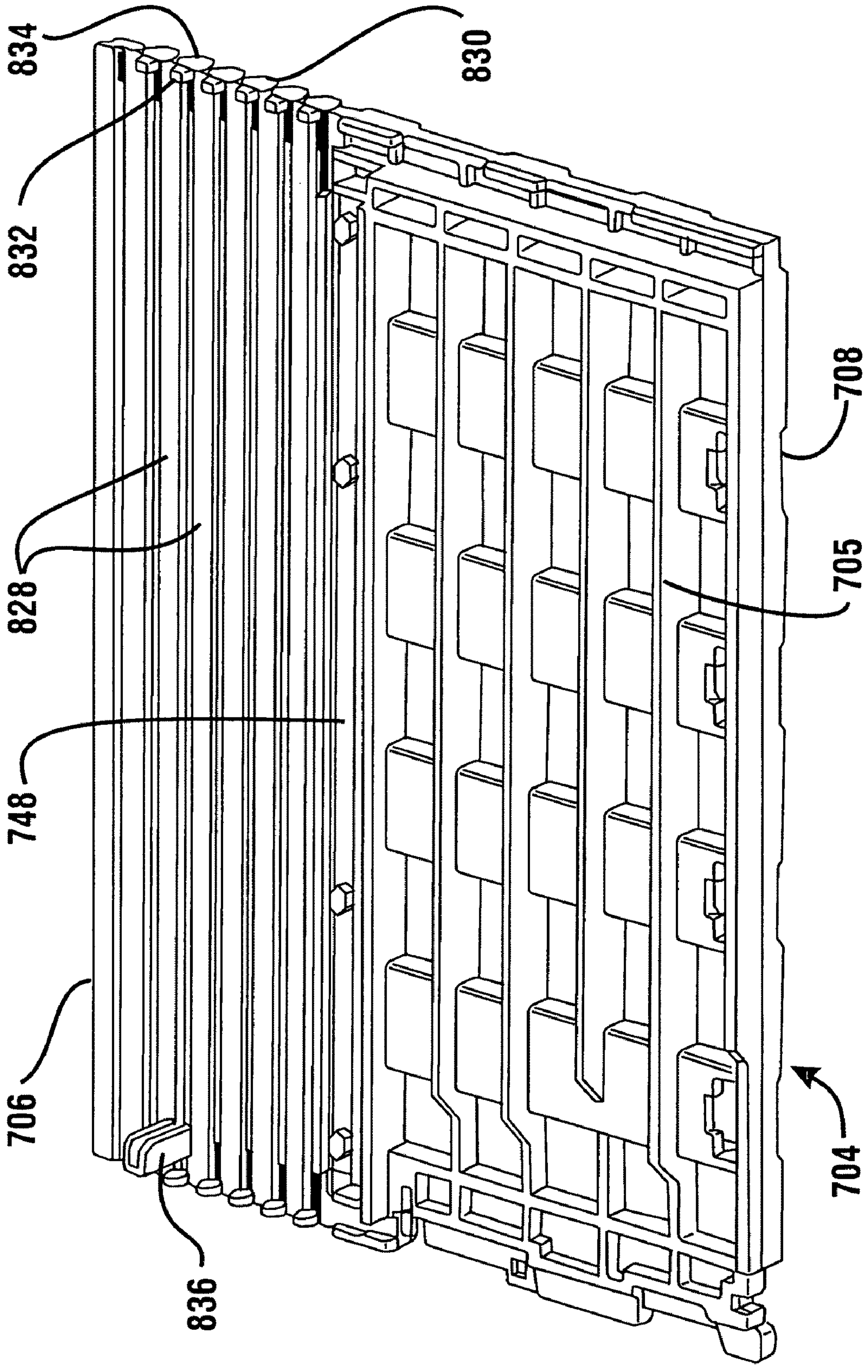
FIG. 89 shows an angled view of a cassette tambour door assembly.

FIG. 89 shows the interior side of the cassette tambour door assembly 704 in more detail. The tambour portion or flexible section 706 of the door comprises integrally attached rigid shutter segments 828. The shutter segments 828 are flexibly attached to each other to permit the tambour section 706 to bend or be curved during movement. The segments 828 can be attached to each other along their elongated length by an intermediate thinner plastic portion which is pliable or bendable.

FIG. 89 also shows strengthening rib structure, such as previously discussed ribs 705 (FIG. 69) and 748 (FIG. 74). The stiffening ribs 705 may be molded integral with the plastic rigid door section 708. The stiffening rib 748 is located at the joining of the flexible tambour door section 706 and the rigid door section 708. The rib 748 can likewise be formed of plastic. Alternatively, the rib 748 can include or be formed of metal material for additional strength. As previously discussed, the flexible section 706 and the rigid section 708 can be integrally molded as a one-piece unitary structure. The location of the rib 748 assists in preventing the separation of the pliable section 706 from the stiff section 708.

Both the door 704 and cassette body 710 have corresponding structure relative to each other enabling the door to be securely guided during opening and closing functions. Most (if not all) of the shutter segments 828 have an end tab 830 at each segment end. As shown in FIG. 89, an end tab 830 projects perpendicular away from the face of its segment 828 in opposite (parallel) directions. Thus, each end tab 830 has two extending portions, i.e., an interior extending portion 832 and an exterior extending portion 834. As discussed in more detail later, the flexible section tab portions 832, 834 have different dimensions. A door guide peg 836 is also shown.

Figure 92:
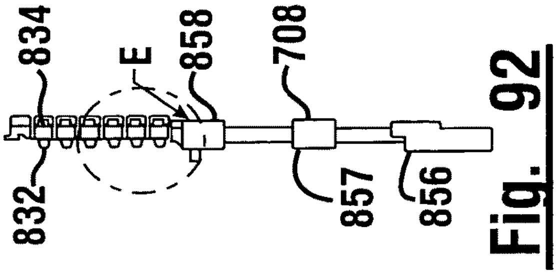
FIG. 92 shows a view along line B-B in FIG. 90.
Figure 93:
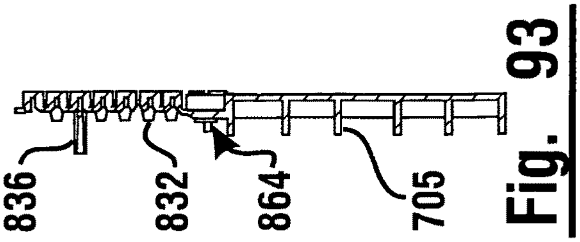
FIG. 93 shows a view along line C-C in FIG. 90.
Figure 90:
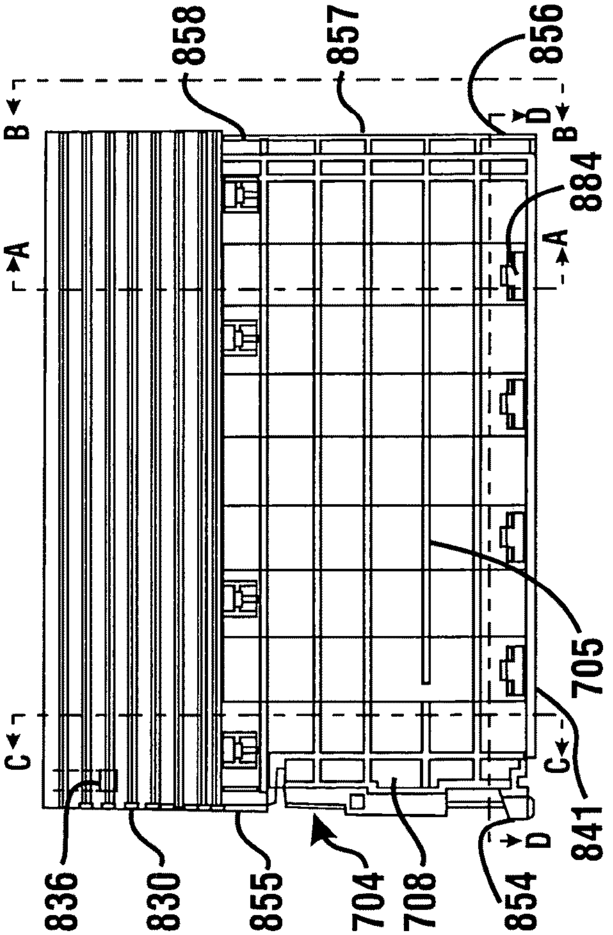
FIG. 90 shows the inner side of a cassette tambour door.
Figure 94:
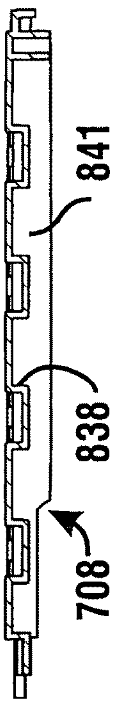
FIG. 94 shows guide slots in an exterior side of a rigid section of a tambour door.
Figure 91:
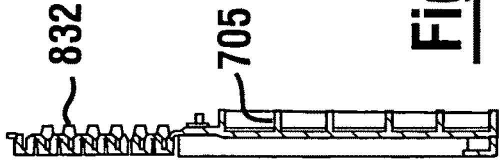
FIG. 91 shows a view along line A-A in FIG. 90.
Figure 95:
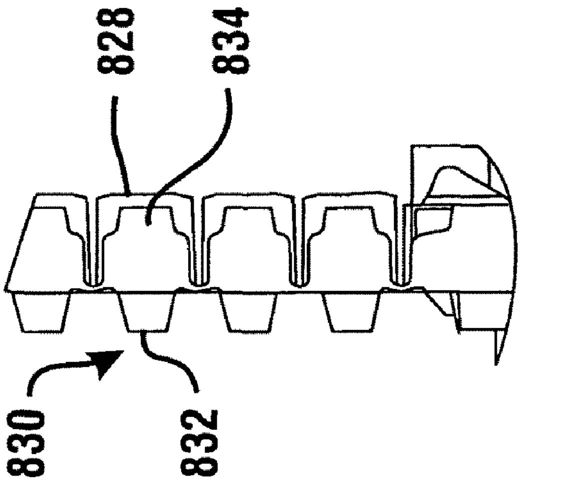
FIG. 95 shows an enlargement of the encircled section E in FIG. 92.
Figure 96:
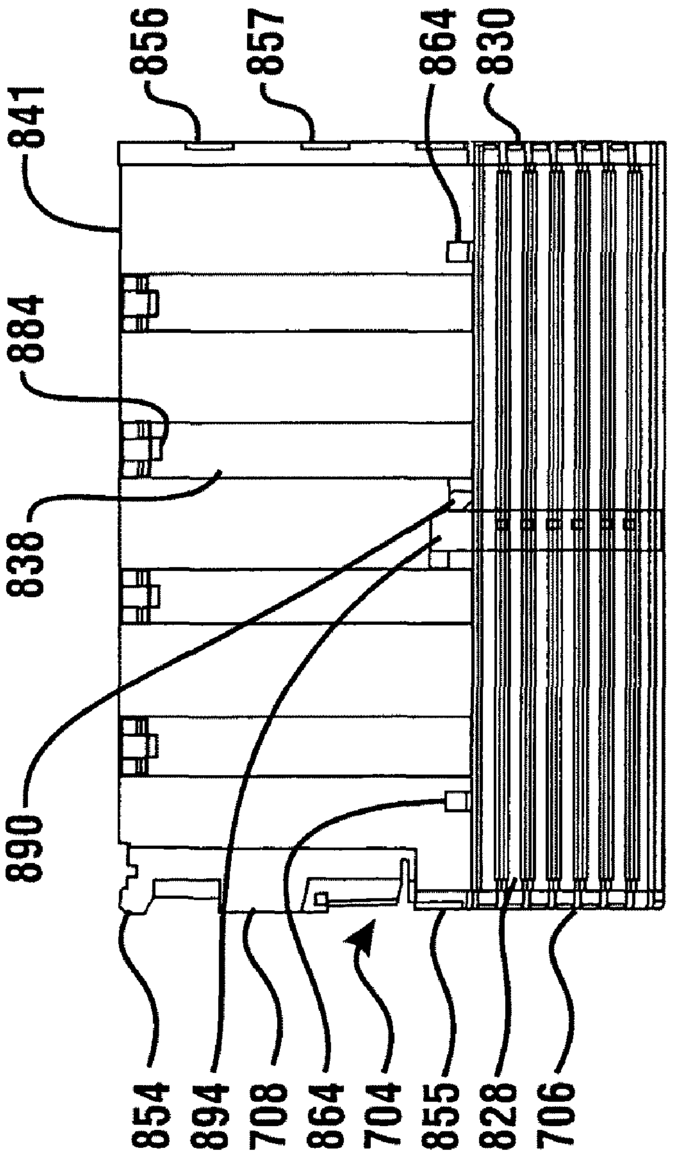
FIG. 96 shows the outer side of a cassette tambour door assembly.

FIGS. 90-96 show additional views of the cassette tambour door assembly 704. FIG. 90 shows the inner side of the cassette door 704 when straight in a manner similar to that shown in FIG. 89. FIG. 91 shows a cross section of the door 704 taken along line A-A of FIG. 90. FIG. 92 shows the very edge of the door 704 in the direction along line B-B of FIG. 90. FIG. 93 is a view taken along line C-C of FIG. 90. FIG. 94 is a view taken along line D-D of FIG. 89. FIG. 94 shows spaced alternating guide slots 838 recessed in the exterior side of the rigid section 708. FIG. 95 is an enlargement of encircled section E in FIG. 92. FIG. 96 shows the outer side of the cassette tambour door assembly 704, which is the side opposite of that shown in FIG. 90.

The shutter segment end tabs 830 are sized to travel internally within corresponding tracks 840. Each side wall 764, 770 of the cassette body 710 has a guide track 840 in which the door 704 rides. Each track 840 is formed by an upper guide rail 726, 728 and a lower guide rail 842, 844. The gap or space 850 between the upper and lower track rails is sized so that the end tabs 830 are captured between the upper and lower rails. Thus, the end tabs 830 interlock the door 704 to the body 710. This interlocking provides resistance to attempts to separate the door (at its ends) from the body.

Each guide track 840 (comprising upper and lower track rails) can be formed in one-piece with a body side wall 764, 770. Alternatively, to assist insertion of the door 704 onto the tracks 840, one of the rails (e.g., lower rail) can be molded simultaneously with (and to) a cassette side wall. After the door is set in position on the lower rail, then the other rail (e.g., upper rail) can be fastened (e.g., via screws) at its interior position on that wall to capture the end tabs 830 between the lower and upper track rails.

Figure 97:
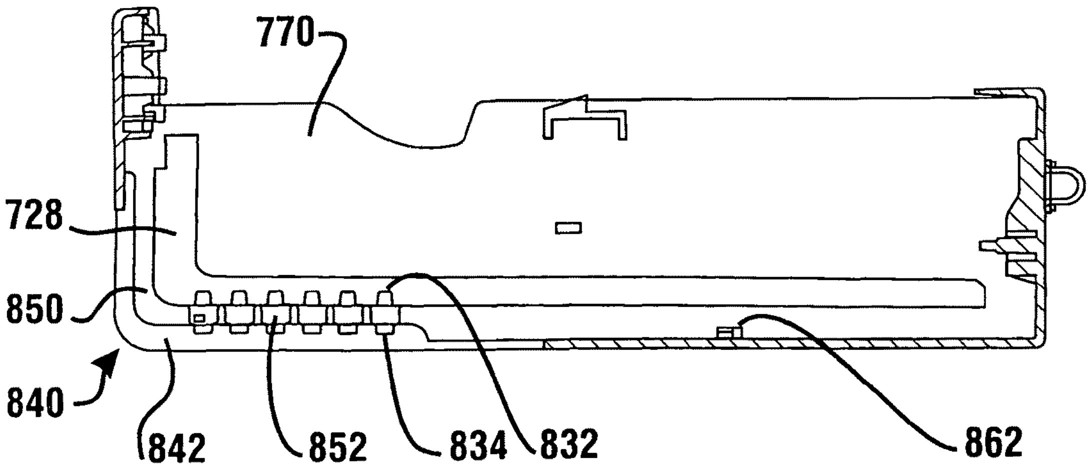
FIG. 97 shows an interior side of a cassette body side wall.

FIG. 97 shows the interior side of the cassette body side wall 770. The lower guide rail 842 is molded in one-piece with the cassette side wall 770. Each cassette side wall 764, 770 can have a respective integral lower rail 842, 844 as also shown in FIG. 78. In FIG. 97 the upper guide rail 728 and the lower guide rail 842 are positioned adjacent to each other to create the door track 840 on the cassette side wall 770. A portion 852 of the flexible door section 706 is shown captured by the track 840. The interior extending end tab portions 832 are captured by the upper rail 728. The exterior extending end tab portions 834 are captured by the lower rail 842.

Figure 98:
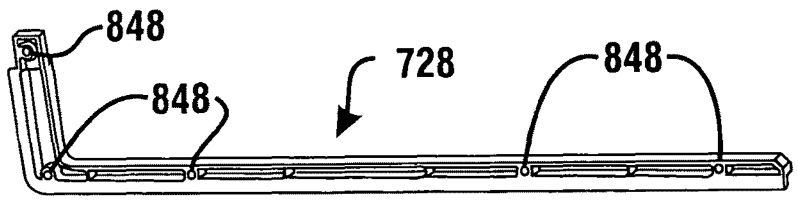
FIG. 98 shows an upper guide rail of a body side wall track.

FIG. 98 shows an isolated view of the upper guide rail 728 that is in FIG. 97. This upper rail 728 has screw holes 848 for use in mechanically fastening it to the body side wall 770. The holes 848 are arranged so that they can be respectively aligned with matching screw holes in the body side wall.

Figure 99:
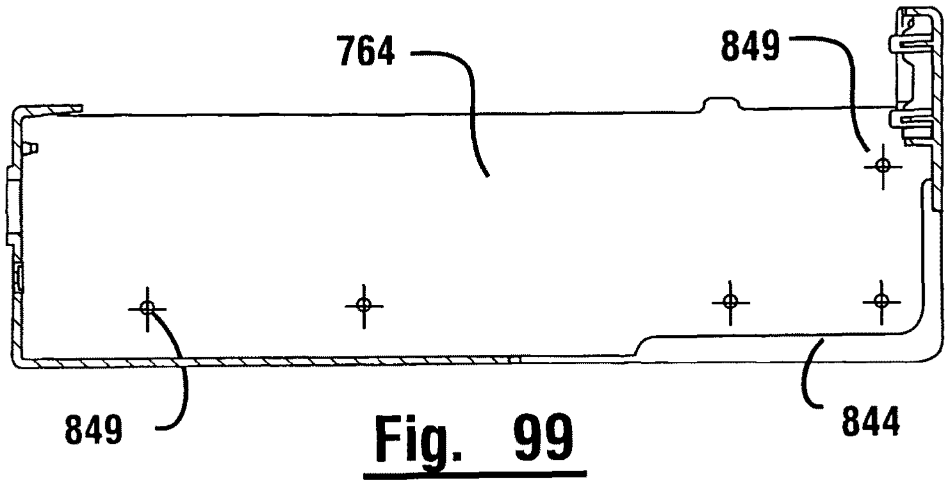
FIG. 99 shows a body side wall having screw holes.

FIG. 99 shows an embodiment of a body side wall 764 having screw holes 849. It should be understood that a lower rail can likewise be similarly mechanically fastened to a body side wall. FIG. 99 also shows the body side wall 764 being formed integral with a lower rail 844. The lower rail 844 can be of similar structure, shape, and material as the lower rail 842 shown in FIG. 97. Additional views of the side wall 764, 770, the lower rails 842, 844 and the upper rails 726, 728 can be seen in FIGS. 69, 75, and 78.

As previously discussed, one, some, or all of the lower and upper rails can be integrally formed unitarily with a respective body side wall. Such one-piece structure comprising the body side wall and the lower and upper track rails eliminates the need for additional fastening therebetween.

It should be understood that other portions of the tambour door can have further retaining tabs that correspondingly fit within respective slots in the body. For example, as shown in FIGS. 90 and 92, the tambour door's rigid (e.g., non-flexible) section 708 can have one or more side guide tabs 854, 855, 856, 857, 858 that also align with and ride in a guide track 840 (or other structure). Guide tab 854 extends outward from the rigid section 708 in a direction parallel to the segments 828. Guide tabs 855, 856, 857, 858 extend in similar directions as the flexible section tab portions 832, 834, but are wider relative thereto. These rigid section guide tabs function to keep the rigid section 708 of the door 704 aligned in the cassette body 710 during movement of the door. These rigid section guide tabs also function to interlock the door to the body. The interlocking assists in preventing removal of the door from the body.

As shown in FIG. 69, the divert cassette 700 also has a rigid slide 702. The rigid slide 702 is distinct from the tambour door 704, but can be removably engaged therewith during at least a portion of the door's movement. The rigid slide 702 operates to prevent unauthorized access to the cassette interior through the body's floor opening 762 (FIG. 75) when the tambour door 704 is closed. When the tambour door 704 is fully closed, then the rigid slide 702 is positioned to close or cover the center opening 763 (FIG. 75) in the cassette floor 760 that would be left open by movement of the door to its fully closed position. Thus, the door 704 and slide 702 act in conjunction to close a picker device opening 762 in the cassette body. The rigid slide 702 can be comprised of a one-piece hard plastic material, including integral strengthening ribs.

Figure 100:
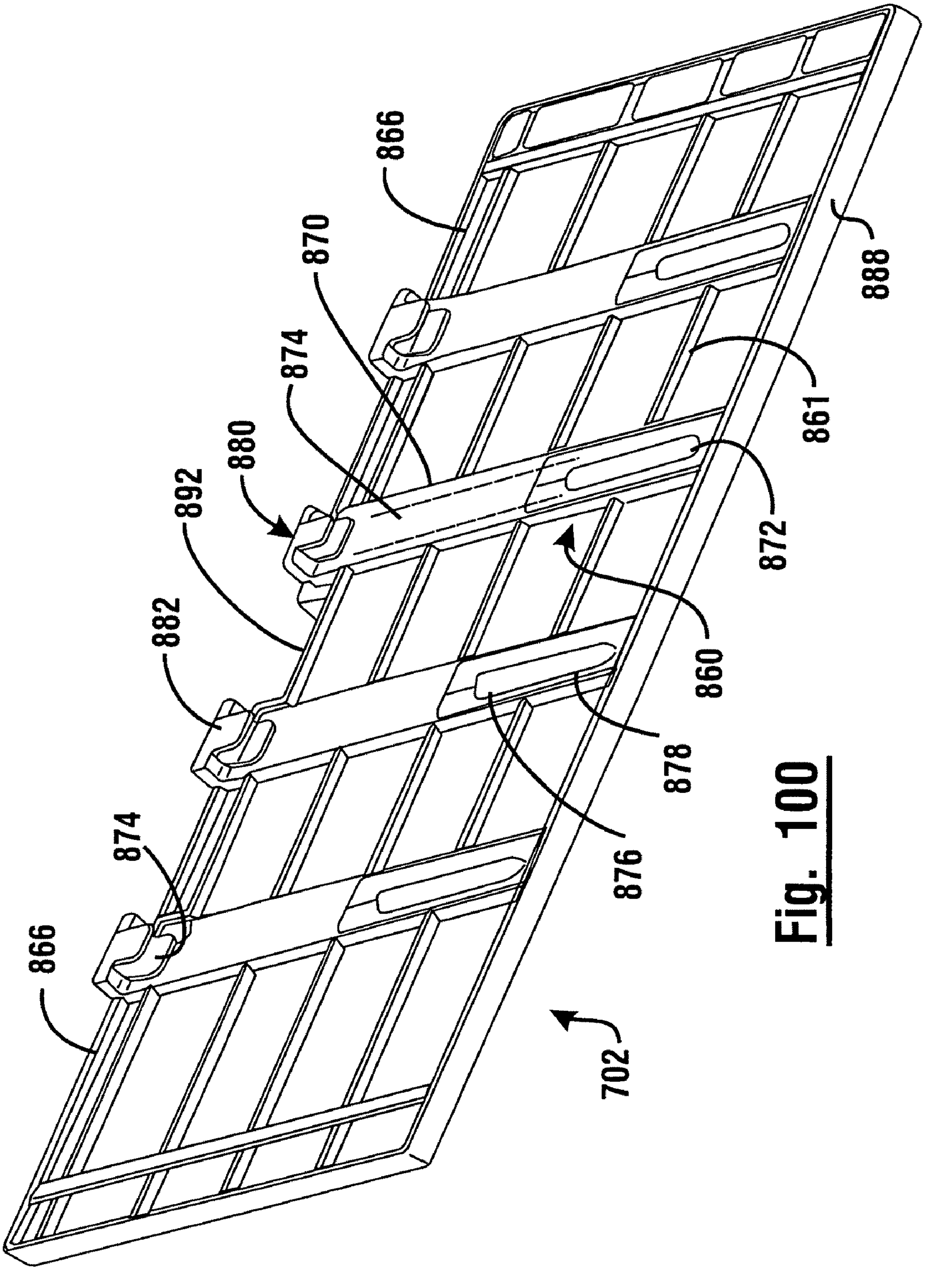
FIG. 100 shows an interior side of a cassette slide.

FIG. 100 shows the interior side of the rigid slide 702. The slide 702 has plural elongated slide slots 860. The slots are elongated in a direction parallel to door movement. The slots are evenly spaced from each other in a direction perpendicular to the parallel direction. The slots can be identically sized. Stiffening ribs 861 are also shown.

Each continuous slot 860 comprises a narrow rear portion 872 and a wider front portion 874. The slots 860 extend along substantially the entire length of the outer surface of the slide (in the slide moving direction). On the slide's inner surface, the front portion 874 of each slot 860 is covered by slide support structure 870. Thus, at their rear portion 872 the slots pass entirely through the slide. The rear narrow portion 872 of each slot has a front end 876 and a closed rear end 878. The front end 876 is openly connected to the front portion 874.

FIG. 100 shows the larger slot portion 874 in broken lines. In FIG. 100 the slot's wider portion 874 is located under the slide support structure 870. As can be seen, the parallel lines defining slot portion 874 are further spaced from each other than those lines defining slot portion 872.

In the exemplary embodiment, the rigid slide 702 is slidably positioned intermediate (in between) the door and the floor 760 of the cassette body. Projection guide pegs 862 extend perpendicular interiorly upward from the floor 760 of the cassette body, as shown in FIGS. 75, 77, and 97. The floor pegs 862 are slidable in the slide slots 860.

The floor pegs 862 can be identically sized. The floor pegs 862 can be molded unitarily with the floor 760. The floor pegs 862 act to guide the rigid slide as it slides in a door moving direction. The floor pegs 862 and slide slots 860 also function in combination to prevent movement of the slide in a direction perpendicular to the door moving direction.

The floor pegs 862 limit the maximum movement of the slide 702 in the door/slide closing direction. When each floor peg abuts a corresponding rear end 878 of a slide slot 860 then the rigid slide 702 is fully closed. In an exemplary arrangement there are four matching pairs of pegs 862 and slots 860.

The rigid slide 702 can be moved while engaged with the tambour door 704 to act as an extension of the door in closing the cassette floor's opening 762. Because of this engagement, the divert cassette can use the tambour door 704 to ensure that the rigid slide 702 is moved to its closed position.

In an exemplary embodiment, raised ramps or bumps are used to ensure that proper sequencing of the rigid slide and tambour door occurs as the cassette is inserted and removed from a dispenser module. For example, the tambour door's rigid section 708 has outwardly extending engagement ramps 864 on its exterior side (FIGS. 93 and 96). These door ramps 864 are located on the rigid section 708 at an end adjacent the tambour section 706. The door ramps 864 are molded unitarily one-piece with the door's rigid section. In the exemplary embodiment at least two door ramps 864 are used.

The door ramps 864 are each located on the side of the rigid door section 708 that faces the rigid slide 702. These door ramps 864 are configured to removably engage a lip portion 866 on the rigid slide. The door ramps can be triangular shaped in cross section, having a flat base surface, a ramped surface reaching an apex, and a substantially perpendicular surface.

When the door 704 has reached its fully open location, each slide lip 866 has been relatively slid over the top of a door ramp 866 (i.e., over the door ramp's apex). Thus, when a rigid slide's lip 866 extends over a door ramp's apex it becomes interlocked with that door ramp. The abutment between a door ramp's 864 perpendicular surface and a slide lip's 866 surface assists in maintaining engagement between the door 704 and slide 702 while the door is later moved in a closing direction. As the door slides toward its closed position, the door ramp engagement causes the rigid slide to be pulled along by the door.

The door and slide are interlocked until the slide reaches its fully closed position. After the slide has reached its fully closed position, each floor peg 862 substantially abuts a corresponding rear end 868 of a rigid slide slot 860. The engagement with the floor pegs 862 prevents the rigid slide 702 from being pulled any further by the door. That is, the force of the floor pegs 862 acting against slide movement is greater than the force of the door ramps 864 acting to pull the slide. Thus, as the door continues to be closed, the slide becomes released therefrom and remains in its fully closed position. This arrangement enables the rigid slide to be fully closed before the door is fully closed. Hence, an additional level of protection is afforded to the cassette.

The structural relationship between the door 704 and rigid slide 702 also includes an additional interlocking arrangement therebetween to ensure that the slide becomes fully closed by closing movement of the door. The rigid slide 702 further has engagement arms 880 as shown in FIG. 100. Each slide arm 880 is located at a front end of the slide. Each slide arm 880 is adjacent to and aligned with a rigid slide slot 860. The arms 880 extend away from the inner face of the slide. The arms extend perpendicular (vertically) away from the slide slots. Each slide arm 880 has a finger or lip 882 that extends along a (horizontal) direction parallel to its respective slide slot 860.

The exterior facing surface of the tambour door's rigid rear section 708 has spaced elongated door slots 838 (FIGS. 94 and 96) that run parallel to the direction of door movement. The slide's arms 880 protrude into and are slidingly guided by these door slots 838. The length of the door slots 838 substantially matches or corresponds to the length of the slide slots 860.

The rigid door section 708 has a rear end wall 841 (i.e., the end opposite the tambour section). Each door slot 838 at its rear end includes a stop lip 884 (FIGS. 90 and 96). Each stop lip 884 can be abutted by a slide arm 880. When the door is in its fully closed position, the slide arms 880 respectively abut the door stop lips 884. The engagement stops the door from being further moved in a door closing direction.

Thus, the floor peg 862 to slide slot 860 engagement stops the slide from further closing, and the slide arm 880 to door lip 884 engagement stops the door from further closing. It follows that the floor pegs 862 set the closing limit for both the slide and the door.

When the door is closed the (horizontal extending) door's stop lips 884 are each located under a respective (horizontal extending) slide arm finger 882. This arrangement prevents the slide and door from being (vertically) moved relative to each other in directions (e.g., up and down) perpendicular to the door movement. Thus, the door stops 884 and the slide fingers 882 are interlocked with each other.

The door ramps 864 are adapted to interlock with and move the rigid slide 702 to its closed position, as previously discussed. However, should the door's ramps 864 somehow fail to interlock with the slide, the door stop lips 884 are adapted to still cause the slide to be moved to its closed position. That is, the exemplary arrangement has built in redundancy to ensure that the slide will be closed. When the door and slide are both in their fully opened positions, should the door be moved in its closing direction without being interlocked with the slide via the ramps 864, the movement of the door substantially the length of its rigid section 708 will eventually cause the door's stop lips 884 (which are located at the rear end of the door) to engage the slide's fingers 882 (which are located at the front end of the slide). With the door's stop lips 884 engaged to respective aligned slide arm fingers 882, the slide is interlocked with the door and will be moved together with the door toward its closed position. As the door/slide continue their travel in their closing direction, their movement substantially the length of the slide causes the rear end 878 of the slide's slots 860 (which are located at the rear end of the slide) to engage the floor pegs 862. As previously discussed, at this point the slide and door are both fully closed and are both prevented by the pegs from further movement in a door closing direction. Thus, the relationship between the door's stop lips 884 and the slide's fingers 882 ensures that when the door is fully closed the rigid slide is likewise fully closed, whether or not the door ramps 864 engaged the slide's lip portions 866.

Other raised ramps or bumps can be used in the movement sequencing of the rigid slide and tambour door. These additional ramps 886 project or extend interior from the body floor, as shown in FIG. 75. These body floor ramps 886 are molded unitarily one-piece with the cassette body. The floor ramps 886 act to assist in preventing unwanted movement of the slide from its fully closed position toward an open position. In the exemplary embodiment at least two floor ramps are used. The floor ramps 886 have a ramped surface and a substantially perpendicular surface. As shown in FIG. 75, the floor ramps 886 are aligned with the floor pegs 862. Thus, the ramps 886, like the pegs 862, can extend in the slide slot 860 during slide movement.

The slide has a rear edge wall 888 (or slide structure located rear of the slots 860) that is sized to engagingly abut the perpendicular surface of each floor ramp. As the slide nears its closed position, its rear edge wall 888 slides up and over the floor ramps (i.e., over the ramp apexes). The floor ramps are no longer in the slide slot 860. The entire slide has become positioned on one side of the floor ramps 886. Unwanted movement of the slide in a direction away from its closed position will be blocked by engagement between the edge wall 888 and the perpendicular side of the floor ramps 886.

As explained in further detail later, when the door is being opened the force of the door pushing against the slide is greater than the force of the floor ramps 886 acting against the slide's rear edge wall 888. The resultant force causes the slide's rear edge wall to move over the floor ramps 886. The floor ramps 886 are then in the slide slots 860. With the slide no longer blocked by the floor ramps 886 it is now able to be pushed by the door to its fully open position.

As discussed in application Ser. No. 10/797,331, a cassette tambour door can be moved to its open position by abutting a dispenser module's fixed push pin during insertion of a cassette into the module. The manually applied force pushing the cassette into its operating position in the ATM also causes the door and slide to be fully opened.

In an exemplary embodiment of the invention, the door when being opened from its closed position initially moves relative to the rigid slide. The door movement eventually causes a projecting peg 890 (FIG. 96) molded on the door to engage the slide at a slide cavity 892 (FIG. 100). The projecting peg 890 (like the door ramps 864) projects outward from the exterior face of the door's rigid section 708. The slide's cavity 892 is sized to receive the door's peg 890 for engagement therewith. The depth of the cavity 892 is substantially equal to the length of the peg 890 in the door moving direction. The top surface of the peg 890 extends outward and is substantially flush with the outer surface of the slide.

The slide's cavity 892 is aligned and coincident with a door cavity 894 (FIG. 96) when both the door and slide are closed. The door's push/pull peg 890 projects outward from the door cavity 894. The door cavity 894 is sized to receive a dispenser module's push pin. The slide's cavity 892 is sized to simultaneously receive both the door peg 890 and a dispenser module's push pin.

The force of the door peg 890 (via the dispenser module push pin force) pushing against the slide (when the cassette is being inserted in an ATM) is greater than the force of the floor ramps 886 acting against opening of the slide. Thus, the overcoming force causes the slide to move over the blocking floor ramps 886 toward its open position.

The relationship between the door and slide ensures that the slide is not unlocked from its closed position until door is being opened. The relationship further ensures that the slide is not fully opened until door is fully opened. The door ramps and floor ramps assist in achieving proper sequencing of movement among the rigid slide and tambour door during insertion and removal of the divert cassette from the ATM dispenser module.

An exemplary door opening operational sequence will now be described. The divert cassette 700 is manually inserted (pushed) into a currency dispenser module of an ATM. In an exemplary dispenser module arrangement, the cassette is inserted (upside down) into the dispenser module with the door 704 positioned at the top of the cassette and the cassette lid 720 positioned below the cassette's body 710. It should be understood that the divert cassette is also usable with other dispenser module arrangements and orientations.

As the cassette is being inserted it abuts a fixed push pin of the dispenser module. The push pin abuts the door cavity 894 to relatively push the door in a door opening direction. Actually, the push pin and door remain relatively stationary while the cassette is further inserted into the dispenser module. As the door's tambour section opens it moves from a curved state to an opened flattened state. In its flattened state the door's tambour section is substantially parallel with the door's rigid section. As the tambour section flattens, a tambour strip blocks exit of the dispenser module push pin from the door opening. Thus, moved into its flattened state by the dispenser module push pin, the flattened tambour section traps or locks the push pin in the door cavity 894. Further discussion of a push pin and tambour section relationship can be found in application Ser. No. 10/797,331.

Continuing with the exemplary door opening, even though the door 704 is moving in the door opening direction, the slide 702 remains substantially stationary due to the blocking action of the floor ramps 886.

Upon further opening movement of the door, the slide is caused to engage and ride over the door's ramps 864. The slide is now interlocked with the door via the door's interlocking ramps 864. This interlocking enables the slide to be begin movement together with the door in the door closing direction. The interlocking of the door to the slide via the door ramps occurs during the door opening operation. However, in an exemplary arrangement this interlocking has no part in the opening of the door and slide. At this point in the sequence, the slide is blocked by the floor ramps 886 yet is interlocked with the door ramps 864. The door peg 890 has reached and abuts against the slide cavity 892. The dispenser module push pin can push against the door cavity 894 to cause the door peg 890 to in turn push against the slide cavity 892. In alternative arrangements, the dispenser module push pin can abut and push against both door cavity and the slide cavity.

With further opening movement of the door, the slide blocking resistance from the floor ramps 886 is overcome. As previously discussed, the force opening the slide is greater than the force of the floor ramps opposing movement of the slide in the door opening direction. Thus, the slide rides over the floor ramps and is moved by the door in the door opening direction. At this point in the door/slide opening sequence, a first end of the slide has moved past the fixed floor ramps, the other end of the slide is both interlocked with the door ramps 864 and engaged by the door peg 890, and the door and slide are simultaneously moved together. Also, during the movement together, the slide's rear edge wall 888 is adjacent to (or substantially aligned with) the rear end wall 841 of the rigid door section 708.

As previously mentioned, the door ramp to slide interlocking has no part in the door/slide opening. Therefore, although the exemplary door opening operation has the door peg engaging the slide after interlocking of the door ramps with the slide has occurred, it should be understood that other door opening operations can have the door ramp interlocking occur after or simultaneously with the door peg engagement.

The slide is then moved interlocked with the door along a length in the door/slide opening direction that is substantially equal to the length of the slide. The combined movement of the door and slide brings the slide's rear wall 888 and the door's rear wall 841 adjacent to (and/or engagement with) the interior side of the front wall 766 of the cassette body 710. At this point in the door/slide opening sequence the door and slide can travel no further in the opening direction. Both the door and slide are in their fully opened positions. The divert cassette is now fully inserted into the dispenser module, the tambour door is fully open, the slide cover is fully open, and the cassette is ready to receive both diverted and retracted media such as currency notes.

An exemplary door closing operational sequence will now be described. The divert cassette is manually pulled out of the ATM. Thus, the cassette is pulled relative to the ATM currency dispenser module in the door closing direction. Because of the cassette's exiting movement, the dispenser module push pin trapped in the door cavity 894 causes the door to remain stationary relatively the remainder of the cassette. As the cassette is initially removed from the ATM, the door and slide are interlocked due to the door ramps 864 engaging the slide. Thus, initially the door and slide move together as a combined unit away from their fully opened positions and toward their closed positions.

Further movement causes the slide's rear edge wall 888 to pass up and over the floor ramps 886. Thus, the slide (via engagement with the door ramps) is brought by the door to its fully closed position. At this point in the sequence, the floor pegs 862 engage the slide to prevent any further substantial movement of the slide in the door closing direction. Thus, the slide is trapped in its closed position between the floor ramps 886 and floor pegs 862. It should be understood that the slide may have limited movement (or play) between the blocking ramps 886 and the stoppage pegs 862.

The force of the floor pegs 862 holding the slide in its closed position is greater than the engagement force of the door's interlocking ramps 864 acting to pull the slide along with the door. Therefore, further movement of the door in the door closing direction causes the (stationary) slide to become disengaged from the door's ramps 864. At this point in the sequence, the door and slide are no longer interlocked. The door alone can continue to be moved in its closing direction while the separated slide remains locked in its closed position.

The door is further moved until it reaches its fully closed position. The distance of this movement is substantially equal to length of the slide. As previously discussed, when the door is in its fully closed position, then the door's stop lips 884 respectively substantially abut the slide's fingers 882. The fingers 882 and stop lips 884 are respectively interlocked with each other.

With the door fully closed, its tambour section 706 is in its closed curved state. That is, the door's tambour section 706 is no longer substantially parallel with the door's rigid section 708 but is rather substantially perpendicular thereto. This curved state enables the dispenser module push pin to exit the door cavity 894. That is, the push pin is no longer trapped in the door cavity 894 by a tambour strip 828. As the cassette is further removed from the dispenser module, the push pin is removed from the door cavity 894. With the cassette fully disconnected from the dispenser module, it can then be fully removed from the ATM.

It should be understood that many of the features attributed herein to a divert cassette are equally applicable to a currency cassette. For example, a currency cassette can likewise comprise metal and/or plastic materials, including a one-piece polymer body and a one-piece polymer lid.

Figure 101:
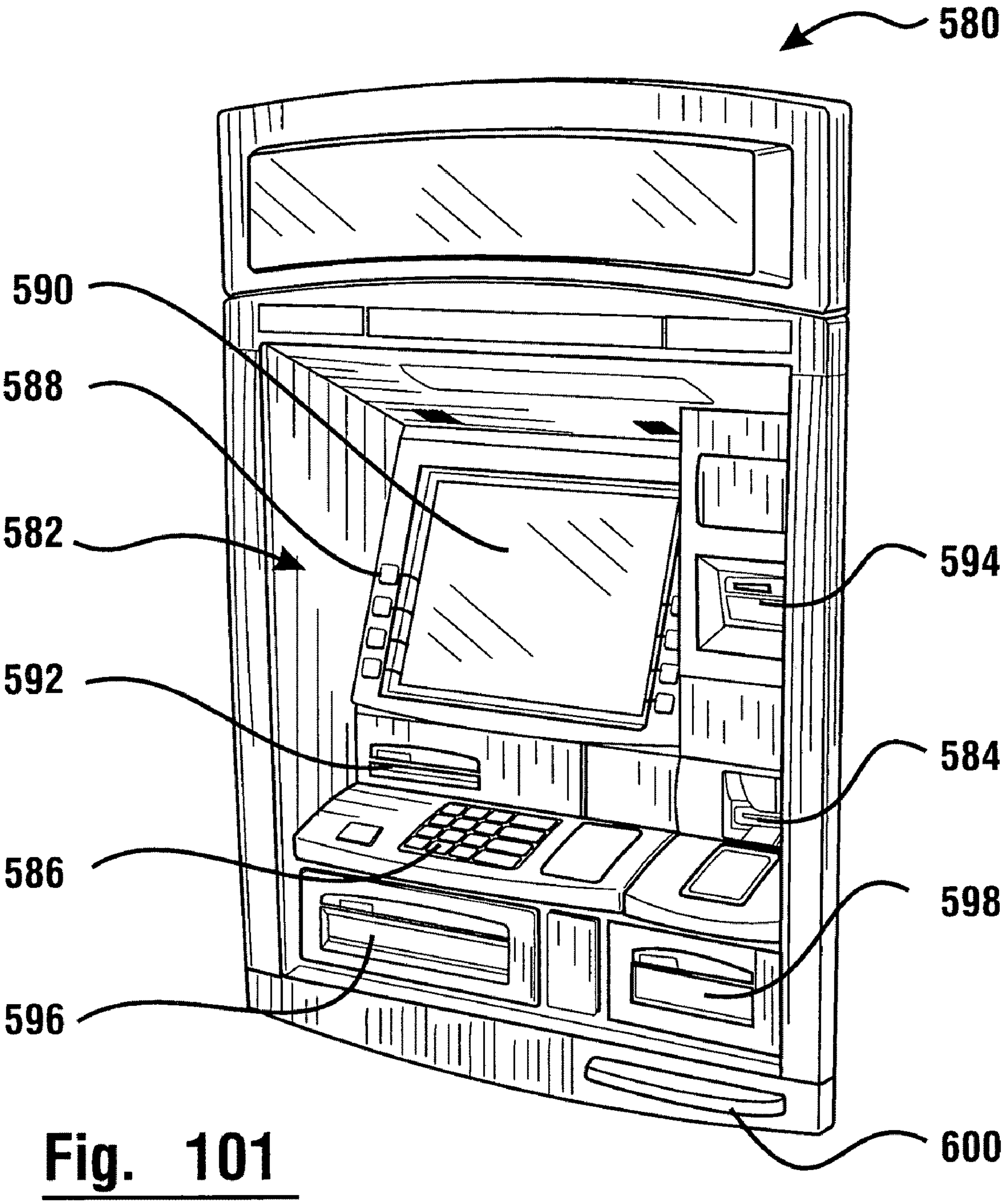
FIG. 101 shows a perspective of an automated banking machine.

FIG. 101 shows another embodiment of an automated banking machine generally indicated 580. The automated banking machine can be an ATM. However, other embodiments may use other types of automated banking machines. ATM 580 includes a fascia 582 which serves as a user or customer interface. The fascia includes a card slot 584, keypad 586, function keys 588, display 590, receipt outlet slot 592, mini statement outlet 594, document (cash) withdrawal opening 596, document deposit opening 598, and a writing shelf 600. The ATM is operative to use the media cassettes and the divert cassettes discussed herein.

Card slot 584 is used to input a card with encoded data thereon that is usable to identify the customer and/or the customer's account information. Card slot 584 is connected to a card reader input device for reading data encoded on the card. The machine may also include other input devices such as biometric readers that may be operative to receive customer identifying inputs such as fingerprints, iris scans, retina scans, face topography data, voice data, or other inputs that provide data that is usable to identify a user. An example of an ATM that uses biometric input devices and other types of input devices is shown in U.S. Pat. No. 6,023,688 the disclosure of which has been fully incorporated herein by reference.

Keypad 586 includes a plurality of keys which may be actuated by a customer to provide inputs to the machine. Function keys 588 permit a customer to respond to screen prompts. The display 590 may be a touch screen display which enables outputs through displays on the screen and enables customers to provide inputs by placing a finger adjacent to areas of the screen. Outlet 594 can also be used to receive other items from ticket printing mechanisms, check printing mechanisms, and other devices that operate to apply indicia to media in the course of performing transactions carried out with the machine. It should be understood that these features of the described ATM user interface are exemplary and in other embodiments the user interface may include different components and/or features and/or arrangements. For example, a different arrangement may have the locations of the receipt outlet slot and the mini statement outlet switched. Likewise with switching the card slot and the receipt outlet slot.

Figure 103:
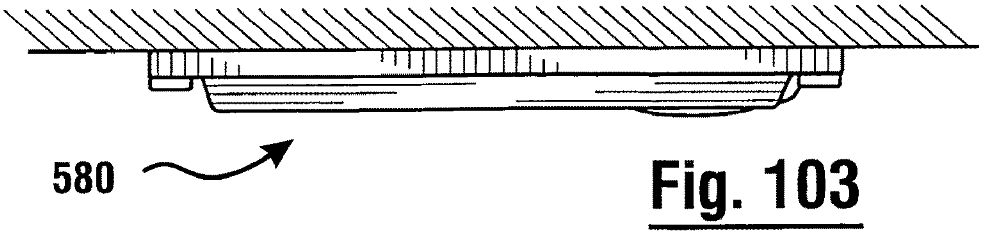
FIG. 103 shows a top view of the machine of FIG. 101.
Figure 104:
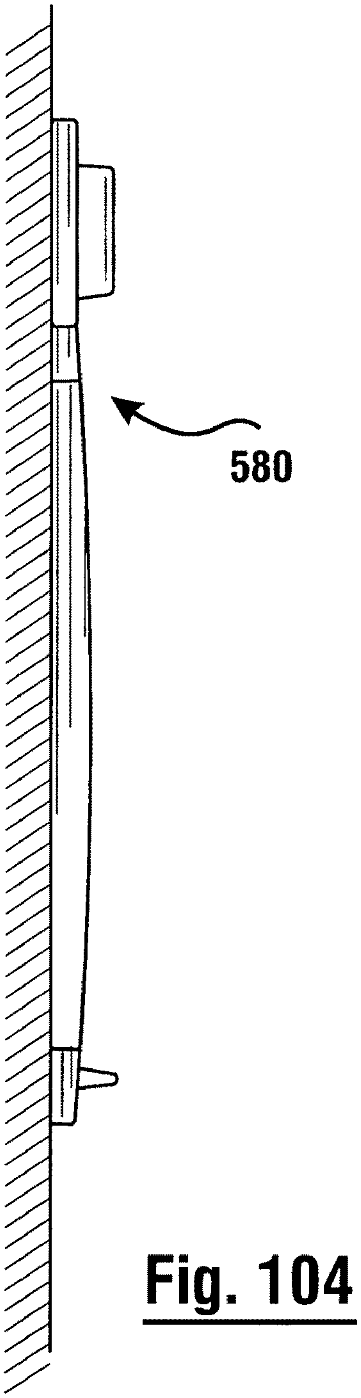
FIG. 104 shows a side view of the machine of FIG. 101.
Figure 102:
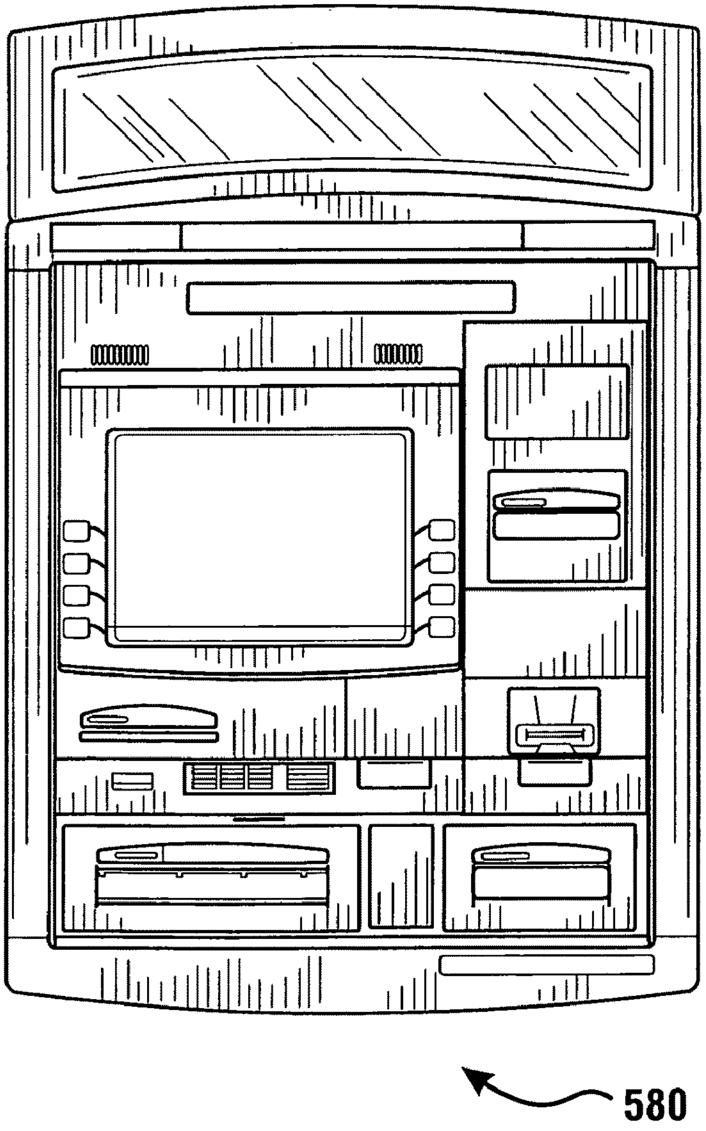
FIG. 102 shows a front view of the machine of FIG. 101.

FIGS. 102, 103, and 104 show respective front, top, and side views of the ATM 580 of FIG. 101.

Figure 106:
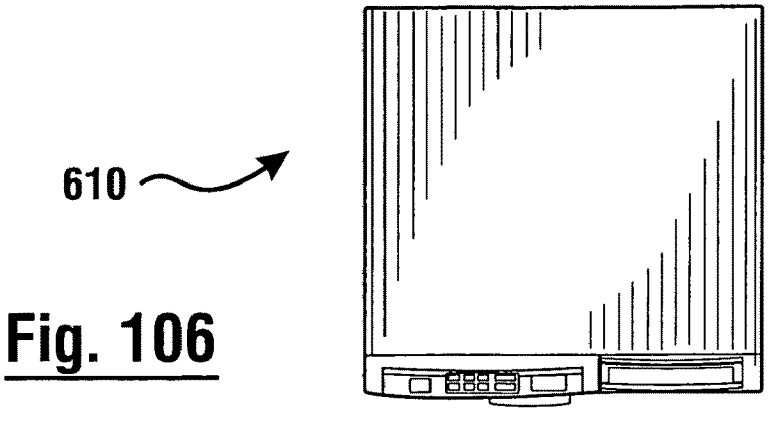
FIG. 106 shows a top view of the machine of FIG. 105.
Figure 107:
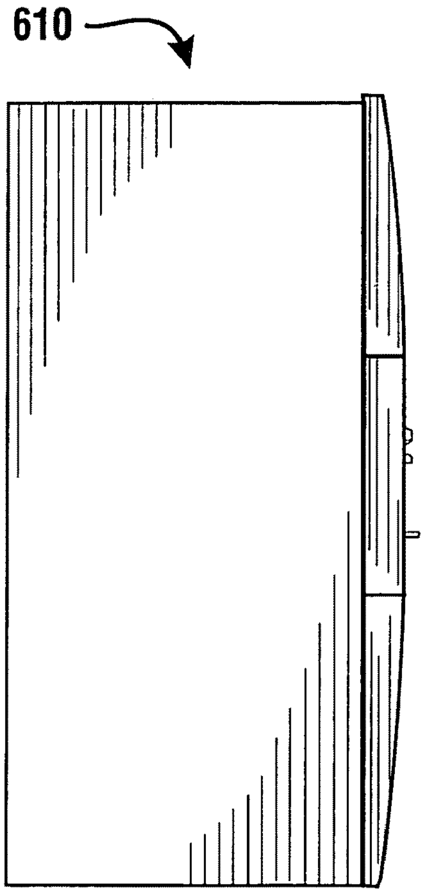
FIG. 107 shows a side view of the machine of FIG. 105.
Figure 105:
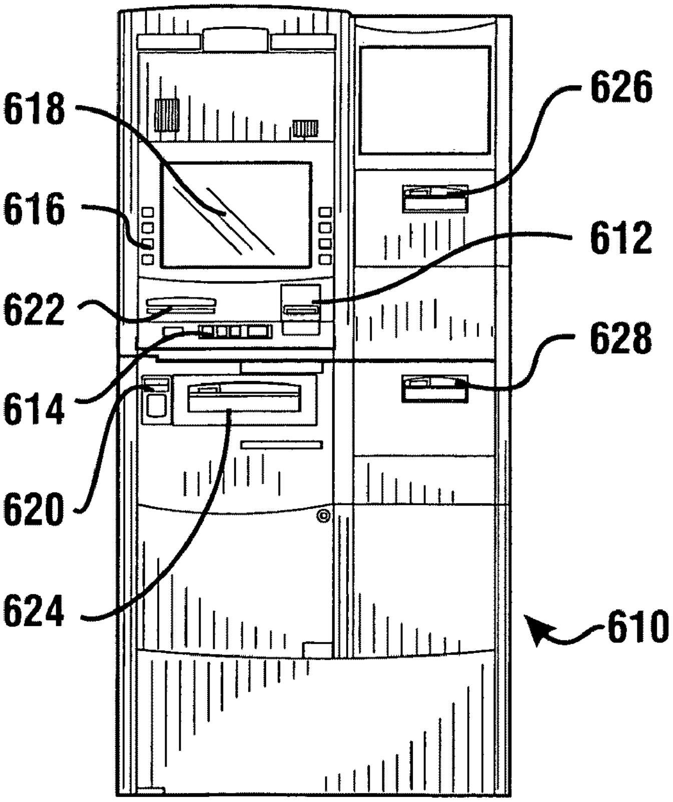
FIG. 105 shows a perspective of another automated banking machine.

FIG. 105 shows another embodiment of an automated banking machine generally indicated 610. The automated banking machine has a customer interface which includes a card slot 612, keypad 614, function keys 616, display 618, receipt outlet slot 620, mini statement outlet 622, document (cash) withdrawal opening 624, document deposit opening 626, and a bulk document deposit opening 628. FIGS. 106 and 107 show respective top and side views of the automated banking machine 610 of FIG. 105. The automated banking machine is operative to use the media cassettes and the divert cassettes discussed herein.

Thus the new and improved automated banking machine features achieve at least one of the above stated objectives, eliminate difficulties encountered in the use of prior devices and systems, solve problems, and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. A method comprising:

(a) moving a media stack in a stack presenter of a banking system automated banking machine toward an outlet of the presenter,
 wherein the presenter includes a gate,
  wherein the gate in a closed position prevents passage of the media stack through the outlet,
  wherein the gate in an open position permits passage of the media stack through the outlet,
 wherein the presenter includes at least one lever,
 wherein the presenter includes at least one cam arm,
 wherein the automated banking machine includes at least one user identification information reader,
  wherein the at least one user identification information reader is operative to read user identification information provided by a machine user,
   wherein a machine user is authorized to use the automated banking machine in carrying out a transaction responsive at least in part to computer-determined correspondence between user identification information read by the at least one user identification information reader and user identification information stored in at least one data store,
 wherein the automated banking machine includes at least one removable media cassette configured to hold media,
  wherein the presenter is arranged to receive media delivered from the at least one removable media cassette,
 wherein the automated banking machine includes at least one of a card reader and a biometric reader,
  wherein the at least one of a card reader and a biometric reader is operative to read user identification data provided by a machine user,
 wherein the automated banking machine includes at least one cash dispenser operative to cause stored cash to be dispensed,
 wherein the automated banking machine includes at least one machine computer,
  wherein the at least one machine computer is operative to authorized a user to request a cash dispense transaction responsive at least in part to computer-determined correspondence between
   user identification data read by the at least one of a card reader and a biometric reader and
   user identification information stored in a user identification data store,
  wherein the at least one machine computer is operative to cause a financial account to be assessed a value associated with cash dispensed;

(b) actuating the at least one lever to provide cam movement to the at least one cam arm to cause the gate to move upward toward the open position; and (c) moving the media stack through the outlet, wherein movement of the media stack through the outlet causes the media stack to be manually accessible to a customer of the automated banking machine.

2. A method comprising:

(a) moving a media stack in a stack presenter of an automated banking machine toward an outlet of the presenter, wherein the presenter includes a gate, wherein the gate in a closed position prevents passage of the media stack through the outlet, wherein the gate in an open position permits passage of the media stack through the outlet, wherein the presenter includes at least one lever, wherein the presenter includes at least one cam arm, wherein the automated banking machine includes at least one user identification information reader, wherein the at least one user identification information reader is operative to read user identification information provided by a machine user, wherein a machine user is authorized to use the automated banking machine in carrying out a transaction responsive at least in part to computer-determined correspondence between user identification information read by the at least one user identification information reader and user identification information stored in at least one data store, wherein the automated banking machine includes at least one removable media cassette configured to hold media, wherein the presenter is arranged to receive media delivered from the at least one removable media cassette;

(b) actuating the at least one lever to provide cam movement to the at least one cam arm to cause the gate to move upward toward the open position; and (c) moving the media stack through the outlet, wherein movement of the media stack through the outlet causes the media stack to be manually accessible to a customer of the automated banking machine.

3. The method according to claim 2 wherein the automated banking machine comprises a first automated banking machine, and further comprising a banking system, wherein the banking system includes a plurality of automated banking machines, wherein the automated banking machines include the first automated banking machine, wherein each automated banking machine is operative to cause financial transfers responsive to data read from user cards, wherein each automated banking machine includes:

at least one biometric reader, wherein the at least one biometric reader is operative to read from a machine user, biometric data corresponding to user identification data, at least one card reader, wherein the at least one card reader is operative to read from a card of a machine user, card data corresponding to user identification data, at least one cash dispenser, wherein the at least one cash dispenser is operative to cause stored cash to be dispensed, at least one machine computer, wherein the at least one machine computer is in operative connection with the at least one card reader, the at least one biometric reader, and the at least one cash dispenser, wherein the at least one machine computer is operative during a cash dispense transaction to cause biometric data to be read from a user through operation of the at least one biometric reader, cause read biometric data to be compared with biometric information stored in a user identification data store, and cause card data to be read from a user card through operation of the at least one card reader, cause read card data to be compared with card information stored in the user identification data store, authorized a customer to request a cash dispense transaction responsive at least in part to at least one of computer-determined correspondence between read biometric data and stored biometric information, and computer-determined correspondence between read card data and stored card information, cause cash to be dispensed to an authorized customer through operation of the at least one cash dispenser, wherein the at least one machine computer is operative to cause a financial account to be assessed a value associated with cash dispensed, and further comprising (d) operating at least one of the at least one biometric reader and the at least one card reader to read data corresponding to user identification data.

4. The method according to claim 2 wherein the at least one removable media cassette includes a unitary one-piece polymer body portion, wherein the body portion includes at least one side wall having at least one guide rail integrally formed therewith, wherein the at least one removable media cassette includes a unitary one-piece polymer lid portion, wherein the lid portion is rotatably attached to the body portion, wherein the at least one removable media cassette includes a polymer door guidable along the at least one guide rail, and further comprising (d) moving the polymer door along the at least one guide rail to one of an open door position and a closed door position.

5. The method to claim 2 wherein the at least one cam arm is connected to the gate, wherein movement of the at least one cam arm causes direct movement of the gate, wherein the at least one lever is movable to cause movement of the at least one cam arm, wherein step (b) includes moving the at least one lever to cause movement of the gate.

6. The method to claim 2 wherein each cam arm includes a first arm end and a second arm end, wherein the first arm end is connected to the gate, wherein the second arm end includes a pivot axis, wherein step (b) includes causing each respective cam arm to pivot about a respective pivot axis.

7. The method to claim 2 wherein the at least one lever includes at least one slot, wherein the at least one cam arm includes at least one pin, wherein each respective pin is configured to slide in a respective slot, wherein step (b) includes sliding each respective pin in a respective slot.

8. The method to claim 7 wherein each lever includes a respective slot, wherein each slot is angled upward, wherein each cam arm includes a respective pin, wherein step (b) includes sliding each respective pin relatively upward in a respective slot, and further comprising (d) sliding each respective pin relatively downward in a respective slot to cause the gate to move downward toward the closed position.

9. The method to claim 2 and further comprising (d) prior to step (a), moving media including at least one currency note from the at least one removable media cassette to the presenter;

(e) prior to step (a), forming the media stack, wherein the media stack includes the at least one currency note moved in step (d).

10. The method to claim 2 wherein the media stack includes currency notes, wherein step (c) includes moving currency notes through the outlet.

11. The method to claim 2 wherein the automated banking machine includes a currency note dispenser, wherein the media stack comprises a currency note stack, wherein steps (a), (b), (c) occur during carrying out a currency note dispensing transaction involving the currency note dispenser.

12. A method comprising:

(a) operating an automated banking machine presenter to move a currency note stack toward an outlet of the presenter, wherein a gate of the presenter in a closed position prevents stack passage through the outlet, wherein the automated banking machine includes at least one removable currency cassette configured to hold currency notes, wherein the presenter is arranged to receive currency notes delivered from the at least one removable currency cassette;

(b) operating the presenter to cause at least one cam arm pin to respectively move in an upward direction along a respective lever slot to cause the gate to correspondingly move in an opening direction, wherein the gate in an open position permits passage of the currency note stack through the outlet; and (c) operating the presenter to move the currency note stack through the outlet, wherein movement of the currency note stack through the outlet causes the currency note stack to be manually accessible to a customer of the automated banking machine.

13. The method to claim 12 wherein each respective cam arm pin is part of a respective cam arm, wherein each respective lever slot is part of a respective lever, wherein each cam arm pin is configured to slide along a respective lever slot, wherein step (b) includes actuating each respective lever to cause each respective cam arm pin to slide along a respective lever slot.

14. The method to claim 13 wherein each lever slot is angled upwardly, wherein step (b) includes actuating each respective lever to cause each respective cam arm pin to slide upwardly along a respective lever slot.

15. The method to claim 13 wherein the presenter comprises two cam arms and two levers, wherein both cam arms are connected to the gate, wherein in step (b) movement of the two cam arms causes movement of the gate.

16. The method to claim 12 wherein step (b) includes moving the gate upwardly in the opening direction toward an open position, and wherein step (c) includes moving the currency note stack through the outlet while the gate is in the open position.

17. The method to claim 16 wherein step (b) includes sliding each respective cam arm pin upwardly along a respective lever slot, and further comprising (d) sliding each respective cam arm pin downwardly along a respective lever slot to cause the gate to move downward toward the closed position.

18. The method to claim 12 wherein the presenter is in an automated banking machine, wherein the automated banking machine includes a currency note dispenser, wherein steps (a), (b), (c) occur during carrying out a currency note dispensing transaction involving the currency note dispenser.

19. A method comprising:

(a) operating an automated banking machine presenter that is configured to receive sheets delivered from at least one removable sheet cassette, to move a stack of sheets toward an outlet opening of the presenter, wherein the presenter is sized to hold sheets comprising currency notes, wherein the stack includes at least one currency note, wherein the presenter includes a movable gate, wherein the gate in a closed position prevents passage of the stack through the outlet opening, wherein the gate in an open position permits passage of the stack through the outlet opening, wherein the presenter includes at least one cam arm, wherein the at least one cam arm is in operative connection with the gate, wherein movement of the at least one cam arm causes movement of the gate, wherein movement of the at least one earn arm in a gate opening direction causes the gate to move upward toward the open position, wherein movement of the at least one cam arm in a gate closing direction causes the gate to move downward toward the closed position, wherein the presenter includes at least one lever, wherein the at least one lever is movable to cause movement of the at least one cam arm;

(b) operating the presenter to cause movement of the at least one lever, wherein the movement of the at least one lever causes the at least one cam arm to be moved in the gate opening direction, wherein the movement of the at least one cam arm in the gate opening direction causes the gate to be moved to the open position; and (c) subsequent to (b), operating the presenter to cause the stack to be moved through the outlet opening while the gate remains in the open position, wherein movement of the stack through the outlet opening allows the stack to be manually accessed by a customer.

20. The method to claim 19 wherein the presenter is located in an automated banking machine, wherein the automated banking machine includes a currency note dispenser and at least one removable currency cassette, wherein the stack includes currency notes delivered from the at least one removable currency cassette, wherein (a), (b), and (c) occur during a cash dispensing transaction that involves the currency note dispenser.

* * * * *